United States Patent
Bauer et al.

(10) Patent No.: US 12,085,490 B2
(45) Date of Patent: *Sep. 10, 2024

(54) SYSTEM AND METHOD FOR SAMPLE PROCESSING

(71) Applicant: Ventana Medical Systems, Inc., Tucson, AZ (US)

(72) Inventors: Daniel Bauer, Tucson, AZ (US); Michael Otter, Tucson, AZ (US)

(73) Assignee: Ventana Medic Systems, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,430

(22) Filed: Feb. 28, 2023

(65) Prior Publication Data
US 2023/0204470 A1 Jun. 29, 2023

Related U.S. Application Data

(63) Continuation of application No. 16/439,743, filed on Jun. 13, 2019, now Pat. No. 11,630,038, which is a (Continued)

(51) Int. Cl.
*G01N 1/30* (2006.01)
*G01N 1/31* (2006.01)
(Continued)

(52) U.S. Cl.
CPC ............ *G01N 1/30* (2013.01); *G01N 1/31* (2013.01); *G01N 29/024* (2013.01); *G01N 29/07* (2013.01);
(Continued)

(58) Field of Classification Search
CPC .......... G01N 1/30; G01N 1/31; G01N 29/024; G01N 29/07; G01N 29/4418;
(Continued)

(56) References Cited

U.S. PATENT DOCUMENTS

| 5,089,288 A | 2/1992 | Berger |
| 6,291,180 B1 | 9/2001 | Chu |

(Continued)

FOREIGN PATENT DOCUMENTS

| CN | 102573648 A | 7/2012 |
| CN | 105319266 A | 2/2016 |

(Continued)

OTHER PUBLICATIONS

Daniel Bauer, Benjamin Stevens, Jefferson Taft, David Chafin, Vinnie Petre et al. "Dynamic subnanosecond time-of-flight detection for ultra-precise diffusion monitoring and optimization of biomarker preservation", 2014, SPIE Medical Imaging Event (Year: 2014).*

(Continued)

*Primary Examiner* — Peter J Macchiarolo
*Assistant Examiner* — John M Royston
(74) *Attorney, Agent, or Firm* — Charney IP Law LLC; Thomas M. Finetti

(57) ABSTRACT

A method and system are described for processing tissues according to particular processing protocols that are established based on time-of-flight measurements as a processing fluid is diffused into a tissue sample. In one embodiment, measurement of the time it takes about 70% ethanol to diffuse into a tissue sample is used to predict the time it will take to diffuse other processing fluids into the same or similar tissue samples. Advantageously, the disclosed method and system can reduce overall processing times and help ensure that only samples that require similar processing conditions are batched together.

19 Claims, 56 Drawing Sheets

Related U.S. Application Data continuation of application No. PCT/US2017/067819, filed on Dec. 21, 2017.

(60) Provisional application No. 62/438,152, filed on Dec. 22, 2016, provisional application No. 62/437,962, filed on Dec. 22, 2016.

(51) Int. Cl.
*G01N 29/024* (2006.01)
*G01N 29/07* (2006.01)
*G01N 29/44* (2006.01)

(52) U.S. Cl.
CPC ..... *G01N 29/4418* (2013.01); *G01N 29/4427* (2013.01); *G01N 29/4472* (2013.01); *G01N 2001/305* (2013.01); *G01N 2291/011* (2013.01); *G01N 2291/023* (2013.01); *G01N 2291/02475* (2013.01); *G01N 2291/02809* (2013.01)

(58) Field of Classification Search
CPC .......... G01N 29/4427; G01N 29/4472; G01N 2001/305; G01N 2291/011; G01N 2291/023; G01N 2291/02475; G01N 2291/02809

See application file for complete search history.

(56) References Cited

U.S. PATENT DOCUMENTS

| | | | |
|---|---|---|---|
| 7,371,346 | B2 | 5/2008 | Windeyer et al. |
| 8,394,322 | B2 | 3/2013 | Windeyer et al. |
| 10,126,216 | B2 | 11/2018 | Chafin et al. |
| 10,267,769 | B2 | 4/2019 | Otter et al. |
| 10,712,250 | B2 | 7/2020 | Bauer et al. |
| 11,002,593 | B2 | 5/2021 | Bauer et al. |
| 11,181,506 | B2 | 11/2021 | Bauer et al. |
| 2012/0329088 | A1* | 12/2012 | Otter ............... G01N 29/07 435/40.5 |
| 2013/0224791 | A1 | 8/2013 | Taft et al. |
| 2016/0377457 | A1* | 12/2016 | Zhang ............... G01D 9/32 702/189 |
| 2017/0336303 | A1 | 11/2017 | Chafin et al. |

FOREIGN PATENT DOCUMENTS

| | | |
|---|---|---|
| JP | 2004-347594 A | 12/2004 |
| JP | 2008-139327 A | 6/2008 |
| JP | 2013521506 | 6/2013 |
| JP | 2014505890 A | 3/2014 |
| WO | 030/29845 A2 | 10/2003 |
| WO | 2011020574 A1 | 2/2011 |
| WO | 2011048586 A1 | 4/2011 |
| WO | 2011109769 A1 | 9/2011 |
| WO | 2012110646 A1 | 8/2012 |
| WO | 2016/097166 A1 | 6/2016 |
| WO | 2016097163 A1 | 6/2016 |
| WO | 2016120195 A1 | 8/2016 |
| WO | 2016128299 A1 | 8/2016 |

OTHER PUBLICATIONS

International Search Report and Written Opinion, mailed Mar. 29, 2018, in corresponding PCTUS2017067819, filed Dec. 21, 2017, pp. 1-16.

* cited by examiner

Avg ρ = 0.1477
Std ρ = 0.0274

Residual Plots for 90% EtOH 90% cleared

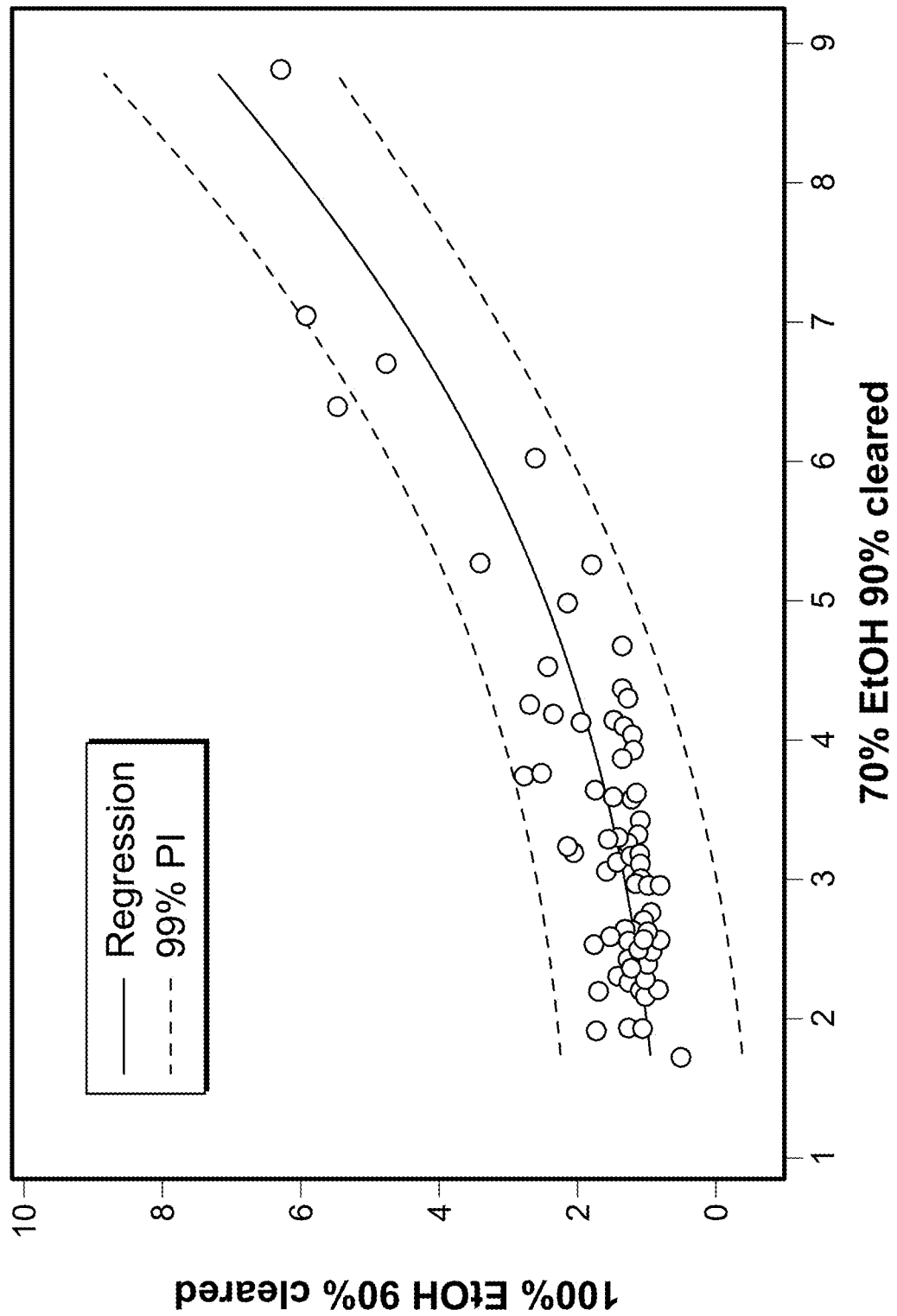

Residual Plots for 100% EtOH 90% cleared

Residual Plots for 100% EtOH 90% cleared

Residual Plots for Xylene 90% cleared

SYSTEM AND METHOD FOR SAMPLE PROCESSING

CROSS REFERENCE TO RELATED APPLICATIONS

This disclosure is a continuation of U.S. patent application Ser. No. 16/439,743 filed on Jun. 13, 2019, which application is a continuation of International Application No. PCT/US2017/067819 filed on Dec. 21, 2017, which application claims the benefit of the filing date of U.S. Provisional Patent Application No. 62/438,152, filed Dec. 22, 2016, and the benefit of the filing date of U.S. Provisional Patent Application No. 62/437,962, filed Dec. 22, 2016, the disclosures of which are hereby incorporated by reference herein in their entireties.

FIELD OF THE DISCLOSURE

The present disclosure generally relates to a system and method for ensuring that a biological sample is properly processed for analysis. In particular, the present disclosure relates to a system and method for ensuring that a cellular sample is properly processed for microscopic analysis.

BACKGROUND

Proper histological staining of tissue biopsies remains the gold standard for clinical diagnoses. Before tissue samples can be interrogated with optical microscopy they must first be fixed, processed, and sectioned into thin slices that are placed on microscope slides and stained to enhance morphological feature for highlight the presence of diagnostic markers. Current clinical practice is for a specimen to be placed in fixative, such as neutral buffered formalin (NBF), after surgery. After diffusing into the tissue, formaldehyde stabilizes the tissue and prevents further degradation by crosslinking biostructures within of the tissue, which hardens the sample for downstream microtomy, and protects it from subsequent processing chemicals. Next, the sample is dehydrated through a series of graded ethanols of increasing concentrations which gradually remove all aqueous solution from within the tissue. Finally, because paraffin and ethanol are largely immiscible the tissue is placed in a series of clearing agents, such as xylene, to remove the ethanol and prepare the sample for infiltration with an embedding agent. The most common embedding agent is heated liquid paraffin which infiltrates the samples and is then quickly cooled to provide a support structure for microtomy and long term preservation of the specimen.

Although fixation and processing of a histological specimen seek to preserve the tissue in a state representative of how it was removed from a subject, these steps are not without consequence. Incomplete ethanol dehydration or xylene clearing will compromise the ability of the paraffin to infiltrate the sample, leaving the specimen soft and difficult to section. Conversely, overexposure to dehydrating and clearing chemicals can cause tissue to become hard and brittle, leading to microtomy artifacts such as tissue tearing, microchatter, or the so-called "Venetian blind" effect. Aggressive dehydrating chemicals such as ethanol work by clearing free water and striping bound water molecules from biological molecules. However, since water insulates these molecules from each other, when it is removed, neighboring molecules can be drawn together through electrostatic forces, and as a result, the tissue shrinks, causing morphological distortions. Care must be taken to gradually increase the concentration of the ethanol solutions or distortion at cell membranes can also occur. Short processing protocols or alternatively the use of exhausted reagents can also result in a loss of architectural detail.

There is significant evidence that the choice of fixative, fixative temperature, length of time in the fixative, and other pre-analytical variables such as warm and cold ischemia can significantly alter the antigenicity of a sample. Regrettably, the effects that the subsequent processing steps have on tissue integrity and epitope retrieval are significantly less understood. There is, however, a growing body of evidence that the processing steps can indeed impact stain quality. For instance, incomplete as well as over dehydration have been correlated with weak immunorecognition of target cells and increased background signal, whereas complete dehydration and infiltration resulted in improved staining for several targets such as L26 and Kappa. The specific reagents used for dehydration and clearing, in addition to the temperature of the reagent, can also impact the intensity and prevalence of immunohistochemistry (IHC) stains. Several studies have reported that long dehydration times produce superior RNA and protein preservation. Reportedly, even paraffin can impact stain quality as low temperature wax reportedly produced superior IHC results and less fragmented RNA.

Furthermore, it would seem that the processing steps are a confounding factor in epitope retrieval and that synergies exist between how completely a sample is fixed and the degree to which it was processed. For example, in the presence of ethanol, ribonuclease A molecules collapse from their native $\alpha+\beta$ protein conformation to a purely $\beta$ state and this conformation change might indeed be important to epitope retrieval. This finding would seem also to be supported by the fact that lightly processed samples are more receptive to heat induced antigen retrieval. Ethanol acts to strip away N-hydroxymethyl adducts before they have had a chance to form a stable crosslink by binding to another amine. Thus, in the case of rushed or poorly crosslinked samples, ethanol can act to prevent the sample from being fully crosslinked and stabilized. Poorly fixed tissues are also particularly susceptible to denaturation when ethanol strips bound water molecules, causing hydrophobic inversion of the tissue's biostructure leading to problems such as morphological distortions, faded nuclei, poor chromatin patterns, and aberrant coloration of collagen. Conversely, properly crosslinked samples are not nearly as susceptible to distortion from processing.

Currently clinical tissue processing occurs in batch mode with a tissue processor that fixes and processes dozens of tissue cassettes simultaneously. Clinical specimens are typically grouped together, with all needle core biopsies processed through a rapid protocol, and larger samples processed through a separate, longer protocol. Group processing leaves quickly diffusing samples overexposed to dehydrating and clearing chemicals while slowly diffusing tissues are at risk of being under processed, particularly with rapid protocols. Additionally, fixation and processing is a slow process that is usually the bottleneck of the pre-analytical phase. For instance, a small 3 mm biopsy is recommended to receive 12 hours for optimal processing while larger specimens that fit into a standard sized histological cassette may require several days to be optimally prepared for microtomy and further downstream staining assays. In addition, batch mode processing times are highly variable, and essentially laboratory specific, which can induce pre-analytical variation from the processing steps on tissues. Technology that could hasten the processing of histological specimens without compromising tissue or biomarker quality would have widespread applicability in current practice.

At present there is no technology capable of quantifying the degree to which a sample is dehydrated, cleared, or embedded, either statically or dynamically.

BRIEF SUMMARY OF THE DISCLOSURE

Disclosed herein are a system and method for time-of-flight (TOF) monitoring of the rate of diffusion of tissue processing fluids, for example, graded ethanols, and xylene, in addition to formalin, into several different types of tissues. The disclosed system and method can be used to measure, monitor and/or predict the degree to which a sample is dehydrated, cleared, and embedded to minimize the deleterious impact such processes have on, for example, overall tissue quality and downstream immune-recognition of biomarkers. Furthermore, the disclosed system and method can, in certain embodiments, serve to expedite the time required to process tissues and provide guidance to standardize the processing of histological specimens in a fully traceable and/or repeatable pre-analytics workflow.

Surprisingly, it has been shown that based on the rate at which 70% ethanol diffuses into a sample (such as obtained by measurement, predicted by a diffusivity constant as discussed below, or by the time it takes to achieve a concentration of 70% ethanol at a particular point in a sample, such as at the center of a sample, which is also disclosed below) one can precisely predict the rate of diffusion for the other chemicals used for tissue processing.

In one aspect of the present disclosure is a method of processing tissue including subjecting a first tissue sample to TOF analysis while the first tissue sample is immersed in a first processing fluid, determining a first processing time sufficient for a predetermined amount of the first processing fluid to diffuse into the first tissue sample, determining a second processing time sufficient for a predetermined amount of a second processing fluid to diffuse into the first sample, wherein the second processing time is calculated based on the first processing time and a pre-determined functional relationship between the first processing time and the second processing time, and, immersing the first tissue sample in the second processing fluid for the second processing time.

In some embodiments, the determining of the first processing time sufficient for the predetermined amount of the first processing fluid to diffuse into the first tissue sample comprises determining one or more of (i) a time it takes to observe a predetermined change in the decay time of a measured TOF signal passing through the first sample while the first sample is immersed in the first processing fluid, (ii) a time it takes to observe a predetermined change in the decay amplitude of a measured TOF signal passing through the first sample while the first sample is immersed in the first processing fluid, (iii) a time it takes to observe a predetermined change in a percent diffusion calculated from a measured TOF signal passing through the first sample while immersed in the first processing fluid, and (iv) a time it takes to observe a predetermined change in a reagent concentration at the center of the tissue calculated from a measured TOF signal passing through the first sample while immersed in the first processing fluid.

In some embodiments, the first processing fluid comprises about 70% ethanol and the second processing fluid comprises one of about 90% ethanol, about 100% ethanol, xylene, and paraffin. In some embodiments, the first processing time is used to determine second processing times for multiple second processing fluids. In some embodiments, the first processing fluid comprises about 70% ethanol and second processing times are determined for at least about 90% ethanol and xylene, and the method further includes immersing the first tissue sample in about 90% ethanol for its determined second processing time and immersing the first tissue sample in xylene for its determined second processing time. In some embodiments, the first processing fluid comprises about 70% ethanol and second processing times are determined for each of about 90% ethanol, about 100% ethanol, xylene and paraffin, and the method further includes immersing the first tissue sample successively in about 90% ethanol, about 100% ethanol, xylene and paraffin for the determined second processing times for about 90% ethanol, about 100% ethanol, xylene and paraffin, respectively.

In some embodiments, the method may further include selecting a second tissue sample of a type, shape and size having diffusion properties that are substantially similar to those of the first tissue sample and immersing the second tissue sample in the first processing fluid for the first processing time and in the second processing fluid for the second processing time.

In some embodiments, the method further includes subjecting the first tissue sample to TOF analysis while the first tissue sample is immersed in the first processing fluid, and determining the first processing time sufficient for a predetermined amount of the first processing fluid to diffuse into the first tissue sample, wherein the step is performed across a plurality of tissue types, a plurality of tissue sizes, and a plurality of tissue shapes to provide a look up table of first processing times for tissue samples of particular types, sizes and shapes. Once the look up table is established, in some embodiments, the method may further include selecting a second tissue sample and selecting a first processing time for the second tissue sample from the look up table, wherein the selection of the first processing time is based on the type, size and shape of the second tissue sample. Alternatively, and again based on the use of the established look up table, the method can further include batching two or more second tissue samples together for processing based on the two or more second tissue samples having substantially similar first processing times. As used herein "substantially similar" refers to parameters (such as time, size, shape, diffusion characteristics, processing times, protocols and the like) that are within ±20% of one another. For example, two tissue samples can have substantially similar processing protocols if the processing time in a particular processing fluid (such as 70% ethanol) differs between that two protocols differs by less than about ±20% such as less than about ±10% or less than about ±5%.

In another aspect of the present disclosure is a system including a tissue processing system, a non-transitory memory, and a processor communicatively coupled to the tissue processing system and the non-transitory memory. The memory can include stored therein a database of protocol instructions including tissue processing steps and other data, such as times or timings for particular types, shapes and/or sizes of tissue samples and/or one or more groups of particular types, sizes and/or shapes of tissue samples that share substantially similar processing protocols. The system can include a user interface providing a user with a data entry function, wherein the data entry function permits the user to enter a type, shape and size of a tissue sample or select a group to which the type, shape and size of the tissue sample belongs, wherein upon entry of the type, size and shape of the tissue sample or selection of a group to which the tissue sample type, shape and size belongs, the processor will control the tissue processing system to process the tissue according to the protocol stored in the database for the entered tissue type, shape and size or the selected group. In some embodiments, entry by a user of a type, shape and size of the tissue sample causes the processor to retrieve and display to the user on the user interface the group of particular types, sizes and shapes of tissue samples that share the substantially same processing protocol with the tissue sample. In some embodiments, the system is configured to process multiple different samples and/or multiple different groups of samples sharing substantially similar processing protocols in parallel and according to different protocol instructions.

In another aspect of the present disclosure is a time-of-flight enabled tissue processing system. The time-of-flight enabled tissue processing system includes a first bath in which a tissue sample may be immersed in a first processing fluid, an acoustic monitoring device configured to obtain TOF data from the tissue sample while it is immersed in the first processing fluid, a processor configured to receive the TOF data and calculate a first processing time sufficient for predetermined amount of the first processing fluid to diffuse into the tissue sample, the processor further configured to calculate a second processing time sufficient for a predetermined amount of a second processing fluid to diffuse into the tissue sample, wherein the second processing time is calculated based on the first processing time and a pre-determined functional relationship between the first processing time and the second processing time, and a second bath in which the tissue sample is immersed in the second processing fluid, wherein the processor monitors the time of immersion of the tissue sample in the second processing fluid and when the second processing time is reached, either alerts a user to remove the tissue sample from the second bath or causes the system to automatically remove the tissue sample from the second processing fluid of the second bath. In some embodiments, the first processing fluid is about 70% ethanol and the second processing fluid is one of about 90% ethanol, about 100% ethanol, xylene and paraffin. In some embodiments, calculating the first processing time sufficient for a predetermined amount of the first processing fluid to diffuse into the tissue sample includes determining one or more of a time it takes to observe a predetermined change in the decay time of a measured TOF signal passing through the first sample during while the first sample is immersed in the first processing fluid, a time it takes to observe a predetermined change in the decay amplitude of a measured TOF signal passing through the first sample during while the first sample is immersed in the first processing fluid, a time it takes to observe a predetermined change in a percent diffusion calculated from a measured TOF signal passing through the first sample during while immersed in the first processing fluid, and a time it takes to observe a predetermined change in a reagent concentration at the center of the tissue calculated from a measured TOF signal passing through the first sample during while immersed in the first processing fluid.

BRIEF DESCRIPTION OF THE DRAWINGS

FIG. 43A is a normal probability plot for the regression shown in FIG. 42.

FIG. 43B is a "versus fits" plot for the regression shown in FIG. 42.

FIG. 43C is a "versus order" plot for the regression shown in FIG. 42.

FIG. 43D is a histogram plot for the regression shown in FIG. 42.

FIG. 44 shows paired data plotting time to 90% diffused for 70% ethanol versus about 100% ethanol, as well as the power regression fit (solid line) and 99% predictive interval (dashed line) thereof.

FIG. 45A is a normal probability plot for the regression shown in FIG. 44.

FIG. 45B is a "versus fits" plot for the regression shown in FIG. 44.

FIG. 45C is a "versus order" plot for the regression shown in FIG. 44.

FIG. 45D is a histogram plot for the regression shown in FIG. 44.

FIG. 47A is a normal probability plot for the regression shown in FIG. 46.

FIG. 47B is a "versus fits" plot for the regression shown in FIG. 46.

FIG. 47C is a "versus order" plot for the regression shown in FIG. 46.

FIG. 47D is a histogram plot for the regression shown in FIG. 46.

DETAILED DESCRIPTION

Figure 1:
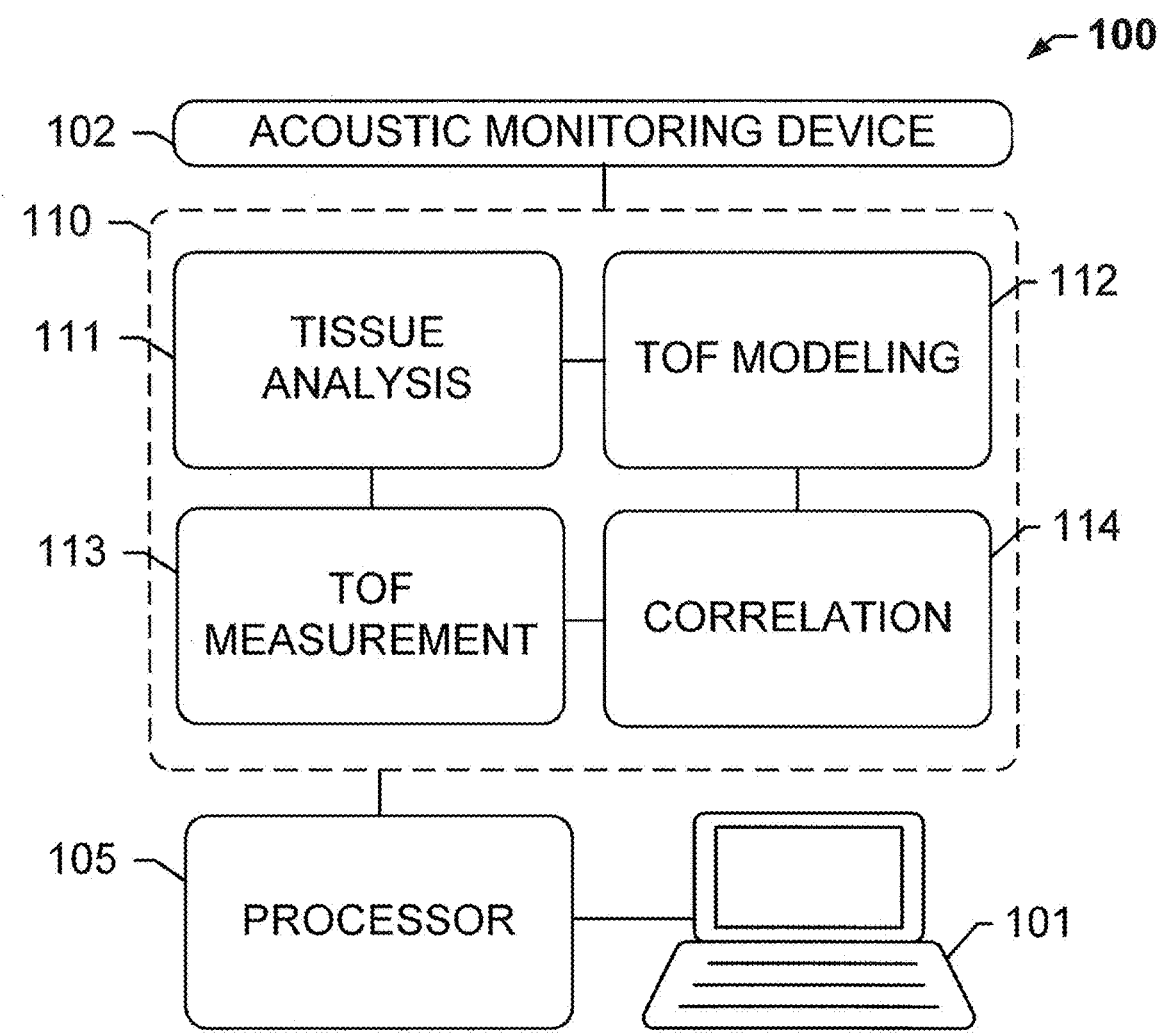
FIG. 1 shows a tissue processing system 100 for optimized tissue fixation, according to an exemplary embodiment of the subject disclosure.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

I. Technical Implementation

The present disclosure provides systems and computer-implemented methods for calculating the diffusivity constant (also known as "diffusion coefficient") and a porosity of a sample using acoustic time-of-flight (TOF) based information correlated with a diffusion model to reconstruct a spatiotemporal concentration profile across a tissue sample. In some embodiments, tissue preparation systems and methods disclosed herein may be adapted to monitor the diffusion of fixative fluid into a tissue sample until a pre-determined concentration level is reached. For example, as formalin penetrates into tissue, it displaces interstitial fluid. This fluid exchange at least partially changes the composition of the tissue volume, and this change may be monitored. By way of example, given that interstitial fluid and formalin each react differently to an introduced ultrasound pulse (i.e. each fluid has a discrete "sound velocity" property), an output ultrasound pulse will accumulate a small transit time differential that increases as more fluid exchange occurs, i.e. as more formalin displaces interstitial fluid. This enables operations such as determining the phase differential accumulated by diffusion based on the geometry of the tissue sample, modeling the impact of the diffusion on the TOF, and/or using a post-processing algorithm to correlate the results to determine the diffusivity constant. Moreover, the sensitivity of the disclosed TOF instruments can detect a change of less than 10 parts per million enabling potentially more accurate characterization of the diffusivity constant and porosity. On the nanosecond TOF scale, all fluids and tissues will have discrete sound velocities, so the disclosed operations are not limited to solely quantifying water diffusion but may be used to monitor the diffusion of all fluids into all tissues. For example, diffusion of dehydrating reagents (such as graded ethanols), clearing agents (such as xylene) and paraffin used for embedding of a tissue sample.

The rate of diffusion may be monitored by a system of acoustic probes based on the different acoustic properties of formalin-soaked tissue samples. Such a system for diffusion monitoring and experimental TOF measurement is described in further detail U.S. Patent Publication Nos. 2013/0224791, 2017/0284969, 2017/0336363, 2017/0284920, and 2017/0284859 the disclosures of which are each incorporated by reference herein in their entireties. Another suitable system for diffusion monitoring and experimental TOF measurement is also described in the international patent application entitled ACCURATELY CALCULATING ACOUSTIC TIME-OF-FLIGHT filed in Dec. 17, 2015, the contents of each of which are hereby incorporated by reference herein in their entirety.

Further examples of suitable systems and methods for TOF monitoring are described in PCT Publication No. WO2016/097163 and US Patent Publication No. 2017/0284859, the contents of which are also incorporated by reference herein to the extent they are not inconsistent with the present disclosure. The referenced applications describe solid tissue samples being contacted with a liquid fixative that travels through the tissue samples and diffuses throughout substantially the entire thickness of the tissue samples and being analyzed based on acoustic characteristics that are continuously or periodically monitored to evaluate the state and condition of the tissue sample throughout processing. For example, a fixative such as formalin having a bulk modulus greater than interstitial fluid can significantly alter the TOF as it displaces the interstitial fluid. Based on the obtained information, a fixation protocol may be adjusted to enhance processing consistency, reduce processing times, improve processing quality, or the like. The acoustic measurements may be used to non-invasively analyze tissue samples. The acoustic properties of tissue samples may change as liquid reagent (e.g., a liquid fixative) travels through the sample. The sample's acoustic properties can change during, for example, a pre-soak process (e.g., diffusion of cold fixative), a fixation process, a staining process, or the like. In the fixation process (e.g., a cross-linking process), the speed of transmission of acoustic energy can change as the tissue sample becomes more heavily cross-linked. Real-time monitoring can be used to accurately track movement of the fixative through the sample. For example, a diffusion or fixation status of a biological sample can be monitored based on a time-of-flight (TOF) of acoustic waves. Other examples of measurements include acoustic signal amplitude, attenuation, scatter, absorption, phase shifts of acoustic waves, or combinations thereof.

In some embodiments, the movement of the fixative through the tissue sample may be monitored in real-time.

II. Systems and Methods

The terms "time-of-flight" or "TOF" as used herein refer to, for example, the time that it takes for an object, particle or acoustic, electromagnetic or other wave to travel a distance through a medium. The TOF may be measured empirically e.g. by determining a phase differential between the phases of an acoustic signal emitted by a transmitter ("transmitted signal") and an acoustic signal received by a receiver ("received signal") that has passed through an object immersed in a fluid and an acoustic signal that has passed through the fluid alone. A "sample" as used herein is, for example, a biological specimen containing multiple cells. Examples include, but are not limited to, tissue biopsy samples, surgical specimen samples, amniocentesis samples and autopsy material. The samples may be contained e.g. on a tissue sample slide.

As used herein, the term "biological sample," "biological specimen," "tissue sample," "sample," or the like refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject. The samples may be contained e.g. on a tissue sample slide.

The term "porosity" refers to a measure of the void (i.e. "empty") spaces in a material and is a fraction of the volume of voids over the total volume of an object, between 0 and 1, or as a percentage between 0 and 100%. A "porous material" as used herein refers to, for example, a 3D object having a porosity larger than 0.

The terms "diffusion coefficient" or "diffusivity constant" as used herein is refer to, for example, a proportionality constant between the molar flux due to molecular diffusion and the gradient in the concentration of the object whose diffusion is observed (or the driving force for diffusion). Diffusivity is encountered in numerous equations in physical chemistry, e.g. in Fick's law. The higher the diffusivity (of one substance with respect to another), the faster compounds/objects diffuse into each other. Typically, a compound's diffusivity constant is ~10,000× as great in air as in water. Carbon dioxide in air has a diffusivity constant of about 16 $mm^2/s$, and in water its diffusivity constant is about 0.0016 $mm^2/s$.

The phrase "phase differential" as used herein refers to, for example, the difference, expressed in degrees or time, between two waves having the same frequency and referenced to the same point in time.

The phrase "biopsy capsule" as used herein refers to, for example, a container for a biopsy tissue sample. Typically, a biopsy capsule comprises a mesh for holding the sample and letting a liquid reagent, e.g. a buffer, a fixation solution or a staining solution surround and diffuse into a tissue sample. A biopsy capsule can maintain the sample in a particular shape, which shape can advantageously provide the sample with a shape that is computationally easier to model according to the disclosed method and thus be more suitable for use in a disclosed system. A "cassette" as used herein refers to, for example, a container for a biopsy capsule or a tissue sample not contained within a biopsy capsule. Preferentially, the cassette is designed and shaped such that it can automatically be selected and moved, e.g. raised and lowered, relative to the beam path of an ultrasonic transmitter-receiver pair, and further has openings that permit movement of a liquid reagent into and out of the cassette and thus further into and out of a tissue sample held within. The movement may be performed for example by a robotic arm or another automated movable component of a device onto which the cassette is loaded. In other embodiments, a cassette alone is use for containing a tissue sample and the shape of the cassette can, at least in part, determine the shape of the tissue sample. For example, placing a rectangular tissue block that is slightly thicker that the depth of a cassette into a cassette and closing the cassette lid can cause the tissue sample to be compressed and spread to fill a greater portion of the inner space of the cassette, and thus be transformed into a thinner piece having a greater height and width, but having a thickness corresponding roughly to the depth of the cassette.

In some embodiments, a system of calculating a formaldehyde concentration or other reagent is disclosed, the system including a signal analyzer containing a processor and a memory coupled to the processor, the memory to store computer-executable instructions that, when executed by the processor, cause the processor to perform operations including calculating a formalin concentration from a set of acoustic data as described herein.

In some embodiments, a data input into the signal analyzer is an acoustic data set generated by an acoustic monitoring system, the acoustic data set generated by transmitting an acoustic signal so that the acoustic signal encounters a material of interest, and then detecting the acoustic signal after the acoustic signal has encountered the material of interest. Thus, in some embodiments, a system is provided comprising a signal analyzer and an acoustic monitoring system. Additionally, or alternatively, a system may comprise a signal analyzer and a non-transitory computer readable medium comprising an acoustic data set obtained from an acoustic monitoring system. In some embodiments, the acoustic data is generated by frequency sweep transmitted and received by the acoustic monitoring system. As used herein, the term "frequency sweep" refers to a series of acoustic waves transmitted at fixed intervals of frequencies through a medium, such that a first set of acoustic waves is emitted through the medium at a fixed frequency for a first fixed duration of time, and subsequent sets of acoustic waves are emitted at fixed frequency intervals for subsequent— preferably equal—durations.

In some embodiments, the system is adapted for monitoring diffusion of a fluid into a porous material. In some embodiments, a system may be provided comprising: (a) a signal analyzer; (b) an acoustic monitoring system and/or a non-transitory computer readable medium comprising an acoustic data set generated by the acoustic monitoring system; and (c) an apparatus for holding a porous material immersed in a volume of a fluid. In some embodiments, the system is adapted to monitor diffusion of a fixative into a tissue sample.

In some embodiments, the formalin concentration or other reagent concentration is determined for the purpose of characterizing the extent to which a reagent has penetrated a porous object. For example, the method may be used for monitoring a staining process of an object, e.g. cloth, plastics, ceramics, tissues or others, for monitoring a fixation process or other tissue processing step, such as dehydration, clearing and paraffin embedding.

In some embodiments, the present disclosure provides an acoustic monitoring system for collecting an acoustic data set, where the acoustic monitoring system comprises a transmitter and a receiver, wherein the transmitter and receiver are arranged such that acoustic signals generated by the transmitter are received by the receiver and transformed into a computer-readable signal. In an embodiment, the system comprises an ultrasonic transmitter and an ultrasonic receiver. As used herein, a "transmitter" is a device capable of converting an electrical signal to acoustic energy, and an "ultrasonic transmitter" is a device capable of converting an electrical signal to ultrasonic acoustic energy. As used herein, a "receiver" is a device capable of converting an acoustic wave to an electrical signal, and an "ultrasonic receiver" is a device capable of converting ultrasonic acoustic energy to an electrical signal."

Certain materials useful for generating acoustic energy from electrical signals are also useful for generating electrical signals from acoustic energy. Thus, the transmitter and receiver do not necessarily need to be separate components, although they can be. The transmitter and receiver may be arranged such that the receiver detects acoustic waves generated by the transmitter after the transmitted waves have encountered a material of interest. In some embodiments, the receiver is arranged to detect acoustic waves that have been reflected by the material of interest. In other embodiments, the receiver is arranged to detect acoustic waves that have been transmitted through the material of interest.

In some embodiments, the transmitter comprises at least a waveform generator operably linked to a transducer, the waveform generator configured for generating an electrical signal that is communicated to the transducer, the transducer being configured for converting the electrical signal to an acoustic signal. In some embodiments, the waveform generator is programmable, enabling a user to modify certain parameters of the frequency sweep including, for example, starting and/or ending frequency, the step size between frequencies of the frequency sweep, the number of frequency steps, and/or the duration for which each frequency is transmitted. In other embodiments, the waveform generator is pre-programmed to generate one or more pre-determined frequency sweep patterns. In other embodiments, the waveform generator may be configured to transmit both pre-programmed frequency sweeps and customized frequency sweeps. The transmitter may also contain a focusing element, which allows the acoustic energy generated by the transducer to be predictably focused and directed to a specific area of an object.

In some embodiments, the transmitter can transmit a frequency sweep through the medium, which is then detected by the receiver and transformed into the acoustic data set to be stored in a non-transitory computer readable storage medium and/or transmitted to the signal analyzer for analysis. Where the acoustic data set includes data representative of a phase difference between the transmitted acoustic waves and the received acoustic waves, the acoustic monitoring system may also include a phase comparator, which generates an electrical signal that corresponds to the phase difference between transmitted and received acoustic waves. Thus, in certain embodiments, the acoustic monitoring system comprises a phase comparator communicatively linked to a transmitter and receiver. Where the output of the phase comparator is an analog signal, the acoustic monitoring system may also include an analog to digital converter for converting the analog output of the phase comparator to a digital signal. The digital signal may then be recorded, for example, on a non-transitory computer readable medium, or may be communicated directly to the signal analyzer for analysis. Alternatively, the transmitter can transmit acoustic energy at a particular frequency and the signal detected by the receiver is stored and analyzed for its peak intensity.

In some embodiments, a signal analyzer is provided containing a processor and a memory coupled to the processor, the memory to store computer-executable instructions that, when executed by the processor, cause the processor to calculate a formalin concentration based at least in part on an acoustic data set generated by an acoustic monitoring system as discussed above.

The term "processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some embodiments, the signal analyzer accepts as an input an acoustic data set recorded from a test material. In some embodiments, the acoustic data set is representative of at least a portion of a frequency sweep that is detected after the frequency sweep encounters a material of interest. In some embodiments, the portion of the frequency sweep that is detected constitutes acoustic waves that are reflected by the material of interest. In other embodiments, the portion of the frequency sweep that is detected constitutes acoustic waves that have passed through the material of interest. Alternatively, the acoustic data set is representative of burst of acoustic energy of a single frequency that is reflected or has passed through the material of interest.

FIG. 1 shows an embodiment of a system useful for tissue processing 100 (e.g., for optimized tissue fixation, dehydration, clearing or embedding), according to an exemplary embodiment of the subject disclosure. System 100 comprises an acoustic monitoring device 102 communicatively coupled to a memory 110 for storing a plurality of processing modules or logical instructions that are executed by processor 105 coupled to computer 101. Acoustic monitoring device 102 may comprise the aforementioned acoustic probes including one or more transmitters and one or more receivers. In some embodiments, the tissue sample may be immersed in a liquid fixative while the transmitters and receivers communicate to detect time-of-flight (TOF) of acoustic waves.

In some embodiments, the system 100 employs one or more processors 105 and at least one memory 110, the at least one memory 110 storing non-transitory computer-readable instructions for execution by the one or more processors to cause the one or more processors to execute instructions (or stored data) in one or more modules, including: a tissue analysis module 111 for receiving information about the tissue block via user input or electronic input and for determining tissue characteristics such as an acoustic velocity of the tissue; a TOF modeling module 112 for simulating a spatial dependence of relative fixative or reagent concentrations for various times and model diffusion constants to generate a time-varying ("expected" or "modeled") TOF signal and outputting a model decay constant; a TOF measurement module 113 for determining an actual TOF signal of the tissue, computing a spatial average, and generating an experimental decay constant that depends on tissue characteristics (e.g. actual cell types, cell densities, cell sizes and effects of sample preparation and/or sample staining) and input from acoustic monitoring device 102; and a correlation module 114 for correlating (e.g. comparing) the experimental and modeled TOF data, determining a diffusivity constant for the tissue sample based on a minimum of an error function of the correlation, using the determined diffusivity constant in the modelling module 112 along with candidate porosity values for the tissue sample to generate second model TOF signals, and again using the correlation module 114 to make a second correlation between the second model TOF signals based on the determined diffusivity constant and candidate porosities for the sample and the experimental TOF data, determining a porosity of the tissue sample based on a minimum of an error function of the second correlation between the experimental TOF data and the model TOF signals generated using the determined diffusivity constant, and calculating based on the experimental TOF signal, the determined diffusivity constant and the determined porosity, a concentration of a reagent within the sample at a particular point in space and time. These and other operations performed by these modules may result in an output of quantitative or graphical results to a user or a computer 101. Consequently, although not shown in FIG. 1, computer 101 may also include user input and output devices such as a keyboard, mouse, stylus, and a display/touchscreen.

As described above, the modules include logic that is executed by processor 105. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memory 110 that, in an exemplary embodiment, may be a random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network. Moreover, the modules need not be executed in any specific order. Each module may call another module when needed to be executed.

In some embodiments, the acoustic monitoring device 102 may be retrofitted onto a commercial dip-and-dunk tissue processor such as the Lynx II by Electron Microscopy Sciences®. A mechanical head designed using Solidworks® software may be fit around and seal a standard reagent canister. Once sealed, an external vacuum system may initiate to degas the bulk reagent as well as the contents of the cassette, including the tissue. A cassette holder designed for use with either a standard sized histological cassette such as CellSafe 5 by CellPath® or a biopsy capsule such as CellSafe Biopsy Capsules by CellPath® for smaller tissue samples may be utilized. Each holder would securely hold the tissue to prevent the sample from slipping during the experiment. The cassette holder may be attached to a vertical translation arm that would slide the cassette holder in one direction. The mechanical head may be designed with two metal brackets on either side of the tissue cassette, with one bracket housing 5 transmitting transducers, and the other bracket housing 5 receiving transducers that are spatially aligned with their respective transmitting transducers. The receiving bracket may also house a pair of transducers oriented orthogonal to the propagation axis of the other transducers. After each acquisition the orthogonal sensors may calculate a reference TOF value to detect spatiotemporal variations in the fluid that has a profound effect on sound velocity. Additionally, at the end of each 2D acquisition, the cassette may be raised up and a second reference acquisition acquired. These reference TOF values may be used to compensate for environmentally-induced fluctuations in the formalin. Environmentally-induced fluctuations in the formalin or any other fixative may be, for example, temperature fluctuations in the container comprising the porous material, vibrations, and others.

Figures 2A, 2B:
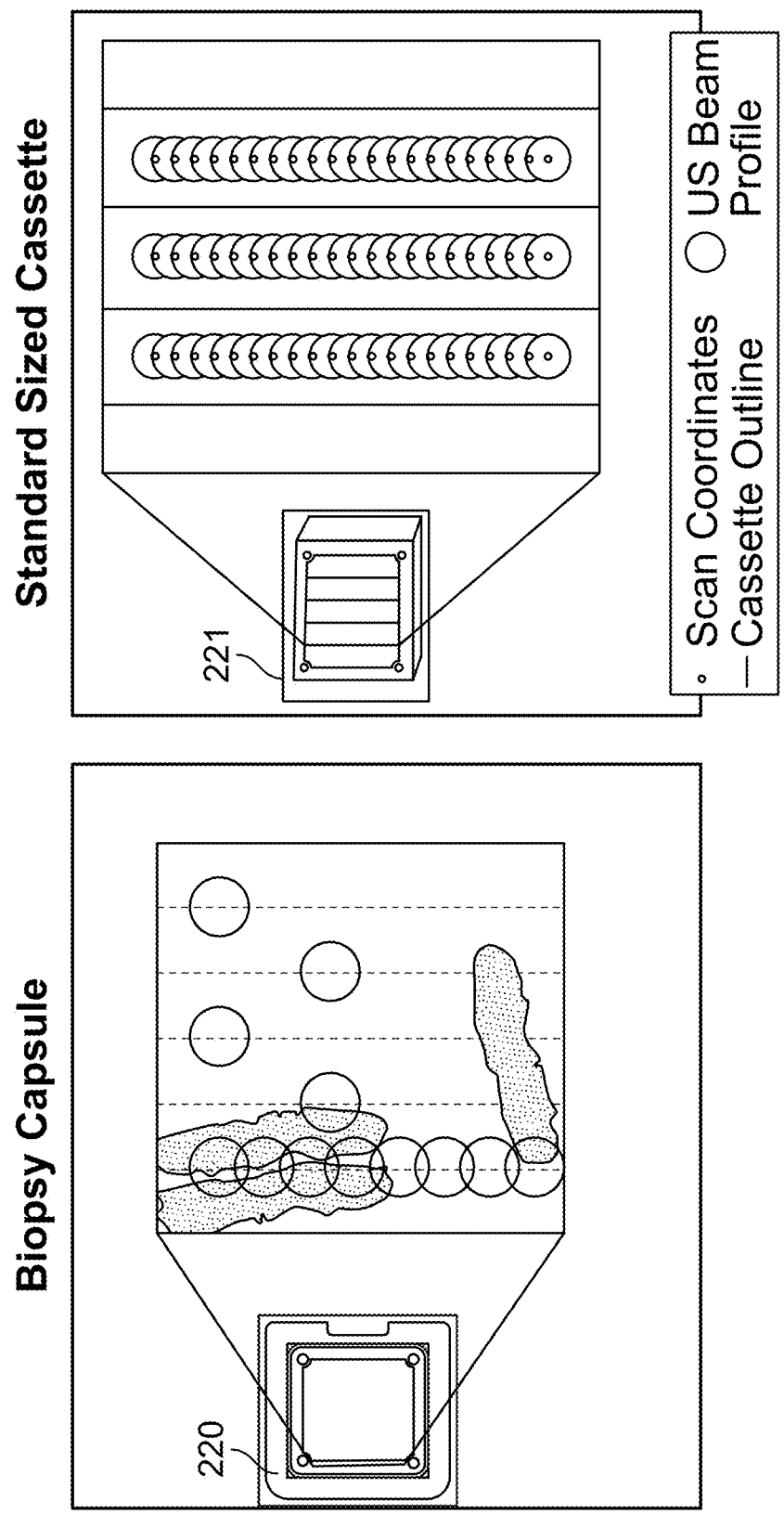
FIG. 2A shows a depiction of ultrasound scan patterns from a biopsy capsule and from a standard-sized cassette.
FIG. 2B shows a depiction of ultrasound scan patterns from a biopsy capsule and from a standard-sized cassette.

FIGS. 2A and 2B, respectively, depict examples of ultrasound scan patterns from a biopsy capsule and from a standard-sized cassette. The measurement and modeling procedures described herein for a tissue samples may likewise be applied on other forms of porous material. As such, while the present disclosure may illustrate modeling in the context of a tissue sample, such examples are non-limiting and the techniques may be applied to other materials, such as any porous material.

As described herein, the measurements from the acoustic sensors in an acoustic monitoring device may be used to track the change and/or rate of change of a TOF of acoustic signals through the tissue sample. This includes monitoring the tissue sample at different positions over time to determine diffusion over time or a rate of diffusion.

For example, the "different positions", also referred to "candidate diffusivity positions" may be a position within or on the surface of the tissue sample. According to some embodiments, the sample may be positioned at different "sample positions" by a relative movement of biopsy capsule and acoustic beam path. The relative movement may comprise moving the receiver and/or the transducer for "scanning" over the sample in a stepwise or continuous manner. Alternatively, the cassette may be repositioned by means of a movable cassette holder.

For example, to image all the tissue in the cassette, the cassette holder may be sequentially raised ≈1 mm vertically and TOF values acquired at each new position, as depicted in FIGS. 2A and 2B. The process may be repeated to cover the entire open aperture of the cassette. Referring to FIG. 2A, when imaging tissue in the biopsy capsule 220, signals are calculated from all 5 transducers pairs, resulting in the scan pattern depicted in FIG. 2A. Alternatively, when imaging tissue in the standard sized cassette 221 depicted in FIG. 2B, the 2nd and 4th transducer pairs may be turned off and TOF values acquired between the 1st, 3rd, and 5th transducer pairs located at the respective centers of the three middle subdivisions of the standard sized cassette 221. Two tissue cores may then be placed in each column, one on the top and one on the bottom, enabling TOF traces from 6 samples (2 rows×3 columns) to simultaneously be obtained and significantly decreased run to run variation and increased throughput. In this exemplary embodiment, the full-width-half-maximum of the ultrasound beam is about 2.2 mm.

Acoustic sensors in the acoustic monitoring device may include pairs of 4 MHz focused transducers such as the TA0040104-10 by CNIRHurricane Tech (Shenzhen) Co., Ltd.® that are spatially aligned, with a tissue sample being placed at their common foci. One transducer, designated the transmitter, may send out an acoustic pulse that traverses the coupling fluid (i.e. formalin) and tissue and is detected by the receiving transducer.

Figure 2C:
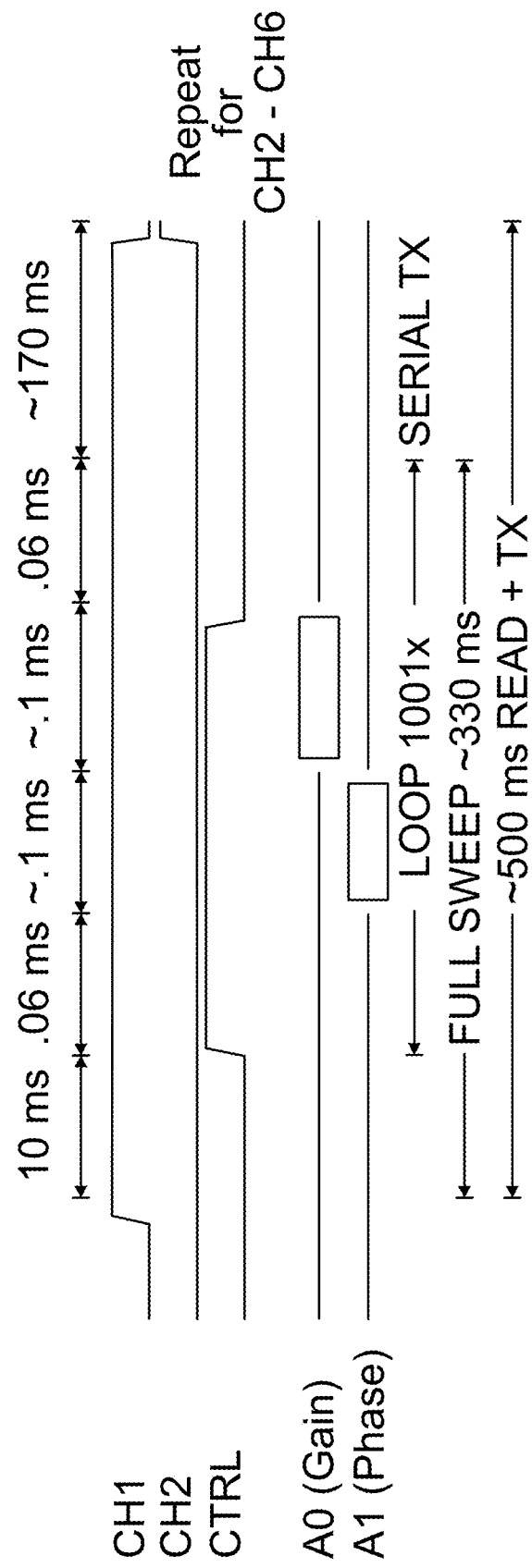
FIG. 2C shows a timing diagram for an exemplary embodiment of the subject disclosure.

FIG. 2C shows a timing diagram for an exemplary embodiment of the subject disclosure. Initially, the transmitting transducer can be programmed with a waveform generator such as the AD5930 by Analog Devices® to transmit a sinusoidal wave for several hundred microseconds. That pulse train may then be detected by the receiving transducer after traversing the fluid and tissue. The received ultrasound sinusoid and the transmitted sinusoid may be compared using, for instance, a digital phase comparator such as the AD8302 by Analog Devices. The output of the phase comparator yields a valid reading during the region of temporal overlap between the transmitted and received pulses. The output of the phase comparator is allowed to stabilize before the output is queried with an integrated analog to digital converter on the microcontroller, such as the ATmega2560 by Atmel®. The process may then be repeated at multiple acoustic frequencies across the bandwidth of the transducer to build up the phase relationship between the input and output sinusoids across a frequency range. This acoustic phase-frequency sweep is directly used to calculate the TOF using a post-processing algorithm analogous to acoustic interferometry and capable of detecting transit times with sub-nanosecond accuracy.

In some embodiments, the "measured TOF", i.e., the "measured TOF value" obtained for a particular time point and a particular candidate diffusivity point is computed from a measured phase shift between a transmitted ultrasound signal and the corresponding, received ultrasound signal, whereby the beam path of the ultrasound signal crossed the particular candidate diffusivity point and whereby the phase shift was measured at the particular time point.

Figure 3:
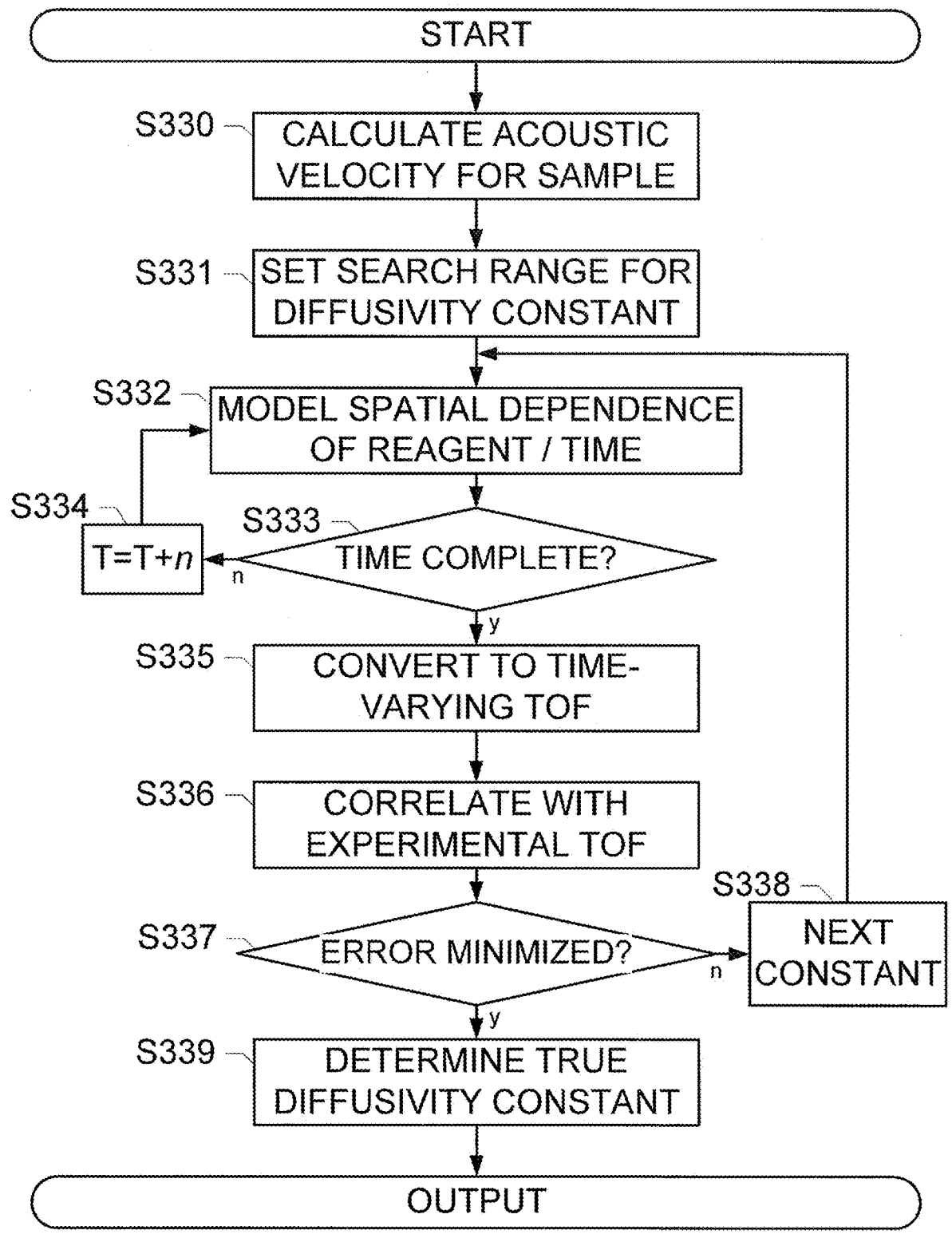
FIG. 3 shows a method for obtaining a diffusivity coefficient for a tissue sample, according to an exemplary embodiment of the subject disclosure.

FIG. 3 shows a method for obtaining a diffusivity coefficient for a tissue sample, according to an exemplary embodiment of the subject disclosure. The operations disclosed with respect to this embodiment may be performed by any electronic or computer-based system, including the system of FIG. 1. In some embodiments, the operations may be encoded on a computer-readable medium such as a memory and executed by a processor, resulting in an output that may be presented to a human operator or used in subsequent operations. Moreover, the operations may be performed in any order besides the order disclosed herein, provided the spirit of the subject disclosure is maintained.

In some embodiments, the method may include a calculation of an acoustic velocity for the tissue sample (S330). This operation includes calculating a speed of sound in the reagent that the tissue sample is immersed in. For example, a distance between ultrasound transducers $d_{sensor}$ i.e., the distance between the transmitting transducer and the receiving transducer, may be accurately measured, and a transit time $t_{reagent}$ between the ultrasound transmitter and the ultrasound receiver in pure reagent is measured, with the speed of sound in the reagent $r_{reagent}$ being calculated using:

$$r_{reagent} = \frac{d_{sensor}}{t_{reagent}}$$

In some embodiments, the tissue thickness may also be obtained via measurement or user input. A variety of suitable techniques are available to obtain tissue thickness, including ultrasound, mechanical, and optical methods. Finally, the acoustic velocity is determined (S330) by obtaining the phase retardation from the undiffused tissue (i.e., a tissue sample to which the fixation solution has not been applied yet) with respect to the bulk reagent (e.g. the fixation solution) using:

$$\Delta t = t_{tissue+reagent} - t_{reagent} \text{ and}$$

$$\frac{1}{r_{tissue}(t=0)} = \frac{1}{r_{reagent}} + \frac{\Delta t}{d_{tissue}}$$

In some embodiments, the specific equation is derived based on the known geometry of the tissue sample and, generally, this equation represents the speed of sound in the undiffused tissue sample (i.e. a tissue sample lacking the reagent, e.g. lacking the fixation solution) at a time t=0. In the experimental embodiment, for example, the acoustic velocity of a tissue sample may be calculated by first calculating the speed of sound in the reagent based on the distance between the two ultrasound transducers (that are herein also referred to as "sensors") ($d_{sensor}$) being accurately measured as with a calibrated caliper. In this example, the sensor separation was measured with a caliper and sensor separation $d_{sensor}$=22.4 mm. Next the transit time ($t_{reagent}$) required for an acoustic pulse to traverse the reagent (lacking the tissue) between the sensors may be accurately recorded with an applicable program. In the experimental example, $t_{reagent}$=16.71 μs for a bulk reagent of 10% NBF (neutral buffered formalin). The sound velocity in the reagent ($r_{reagent}$) may then be calculated as:

$$r_{reagent} = \frac{d_{sensor}}{t_{reagent}} = \frac{22.4 \text{ mm}}{16.71 \text{ μs}} \approx 1.34 \text{ mm/μs}$$

In this particular experiment, a sample piece of tonsil was cored with a 6 mm histological biopsy core punch to ensure accurate and standardized sample thickness ($d_{tissue}$=6 mm), and the TOF differential ($\Delta t$) was calculated between the acoustic sensors with the tissue present ($t_{tissue+reagent}$) and without the tissue present ($t_{reagent}$):

$$\Delta t = t_{tissue+reagent} - t_{reagent}$$

$$\Delta t = 16921.3 - 16709.7 = 211.6 \text{ ns}$$

In some embodiments, the time $t_{reagent}$ is the time required by an ultrasound signal is for traversing the distance from the transmitting transducer to the receiving transducer, whereby the signal passes a reagent volume but not the tissue sample. Said traversal time can be measured e.g. by placing a biopsy capsule between the two sensors that has the same diameter as the tissue, e.g. 6 mm, and performing a TOF measurement for a signal that passes solely the reagent, not the tissue.

In some embodiments, the time $t_{tissue}$ is the time required by an ultrasound signal for traversing the distance from the transmitting transducer to the receiving transducer, whereby the signal passes the tissue sample that does not comprise and is not surrounded by the reagent. In some embodiments, the traversal time can be measured, e.g. by placing a biopsy capsule between the two sensors before adding the reagent to the capsule and performing a TOF measurement for a signal that passes solely through the tissue.

In some embodiments, the time differential (or "TOF differential") $\Delta t$ caused by the tissue in addition to the tissue's thickness and the speed of sound in the reagent may be used to calculate the sound velocity of the undiffused tissue ($t_{tissue}$(t=0)) with the following equation derived from the known geometry (e.g. cylinder-shape, cube-shaped, box-shaped, etc.) of the sample:

$$\frac{1}{r_{tissue}(t=0)} = \frac{1}{1.34 \text{ mm/μs}} + \frac{0.2116 \text{ μs}}{6 \text{ mm}} \Rightarrow r_{tissue}(t=0) = 1.28 \text{ mm/μs}$$

Subsequently, a modeling process is executed to model the TOF over a variety of candidate diffusivity constants. In some embodiments, the candidate diffusivity constants comprise a range of constants selected (S331) from known or prior knowledge of tissue properties obtained from the literature. In some embodiments, the candidate diffusivity constants are not precise, but are simply based on a rough estimate of what the range may be for the particular tissue or material under observation. In some embodiments, the estimated candidate diffusivity constants are provided to the modeling process (steps S332-S335), with a minimal of an error function being determined (S337) to obtain the true diffusivity constant of the tissue. In other words, method tracks differences between the experimentally measured TOF diffusion curve and a series of modeled diffusion curves with varying diffusivity constants.

For example, upon selecting one of a plurality of candidate diffusivity constants, the spatial dependence of the reagent concentration in the tissue sample is simulated (S332), based on a calculation of the reagent concentration $C_{reagent}$ as a function of time and space, using the solution to a heat equation for a cylindrical object:

$$c_{reagent}(t, D, x) = c_{max}\left(1 - 2\sum_{n=1}^{\infty} \frac{e^{-D\alpha_n^2 t/R_0^2} J_0(\alpha_n x/R_o)}{\alpha_n J_1(\alpha_n)}\right)$$

where x is the spatial coordinate in the depth direction of the tissue, $R_o$ is the radius of the sample, D is the candidate diffusivity constant, t is time, $J_o$ is a Bessel function of the first kind and $0^{th}$ order, Ji is a Bessel function of the first kind and $1^{st}$ order, $\alpha_n$ is the location of the $n^{th}$ root of a $0^{th}$ order Bessel function, and $c_{max}$ is the maximum concentration of the reagent. In other words, the summation of the coefficient of each of these Bessel functions (higher-order differential equations), provides the constant as a function of space, time, and rate, i.e. the diffusivity constant. Although this equation is specific to the cylindrical tissue sample disclosed in these experimental embodiments, and the equation would change depending on the shape or boundary condition, the solution to the heat equation for any shape may provide the diffusivity constants for that shape. For example, heat equations for object having spherical, cubic or rectangular block shapes can also be utilized in the disclosed methods.

In some embodiments, this step is repeated for a plurality of time points (S333-S334) to obtain a time-varying TOF (that corresponds to an expected reagent concentration because the integral of the expected reagent concentration at a particular time point can be used for computing the speed of sound differential) (S335). For example, a determination is made as to whether or not the diffusion time is complete. In some embodiments, this diffusion time may be based on the hardware or the type of system being used. For each time interval T, steps S333, S334, and S332 are repeated until the modeling time is complete upon which the modeled reagent concentration is converted to a time-varying TOF signal (S335).

In the experimental embodiment, each of the used candidate diffusion constants $D_{candidate}$ is contained in the following value range:

$$0.01 \leq D_{candidate} \leq 2 \ \mu m^2/ms$$

Figure 5A:
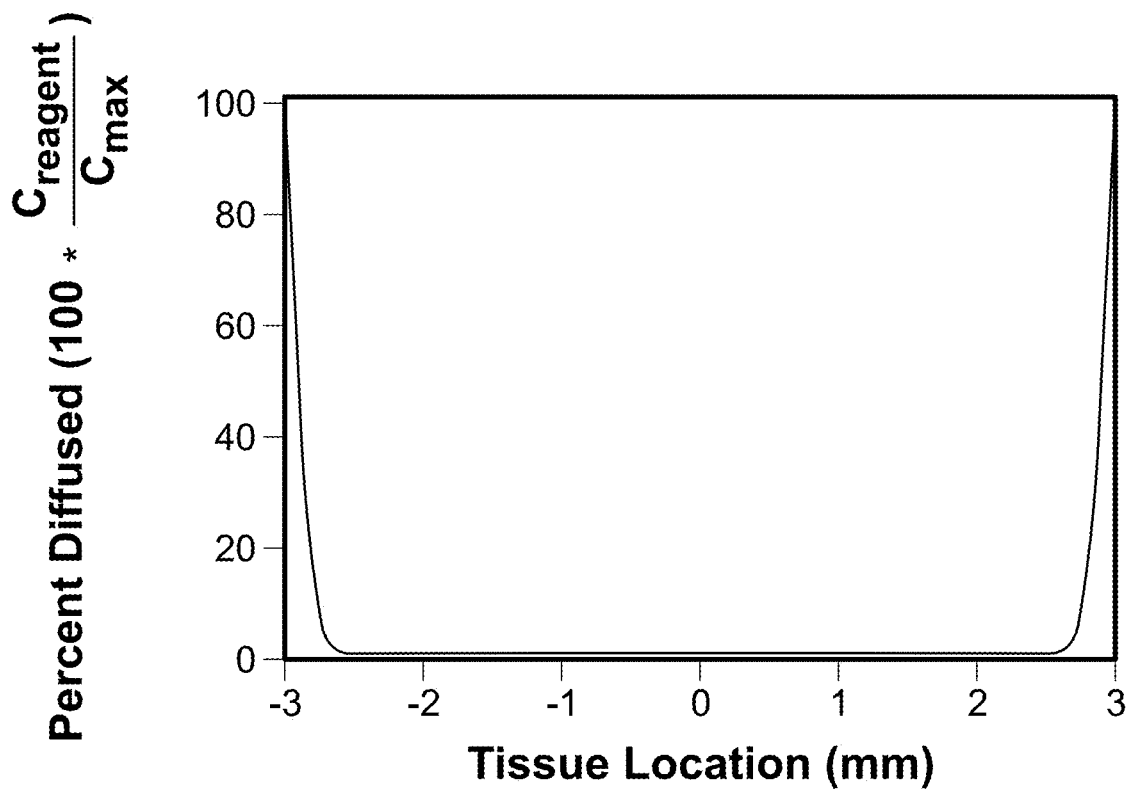
FIG. 5A shows a simulated concentration gradient for a first time point, and for several time points over the course of an experiment.

In some embodiments, the tissue sample was cored with a cylindrical biopsy core punch and therefore may be well approximated by a cylinder. In some embodiments, the solution to the heat equation above was then used to calculate an expected concentration of the reagent ($c_{reagent}$) in the tissue sample and, for the first time point in the experiment, i.e. after 104 seconds of diffusion (based on the time interval between TOF acquisitions used in the system performing the disclosed experiment), the solution representing the concentration of the reagent in the depth direction of the tissue is depicted in FIG. 5A. For example, a particular system may regularly measure a new TOF value for each of a number of different spatial locations which here are also referred to as "pixels". Each "pixel" may thus have an update rate of assigning a new TOF value, e.g. every 104 seconds.

FIG. 5A shows the simulated concentration gradient of 10% NBF into a 6 mm sample of tissue after 104 seconds of passive diffusion as calculated from the heat equation in the experimental embodiment. Moreover, these steps were repeated to determine the concentration of the reagent throughout the tissue repeatedly every 104 s over the course of the experiment (8.5 hours long in the experimental embodiment), and the result depicted in FIG. 5B.

Figure 5B:
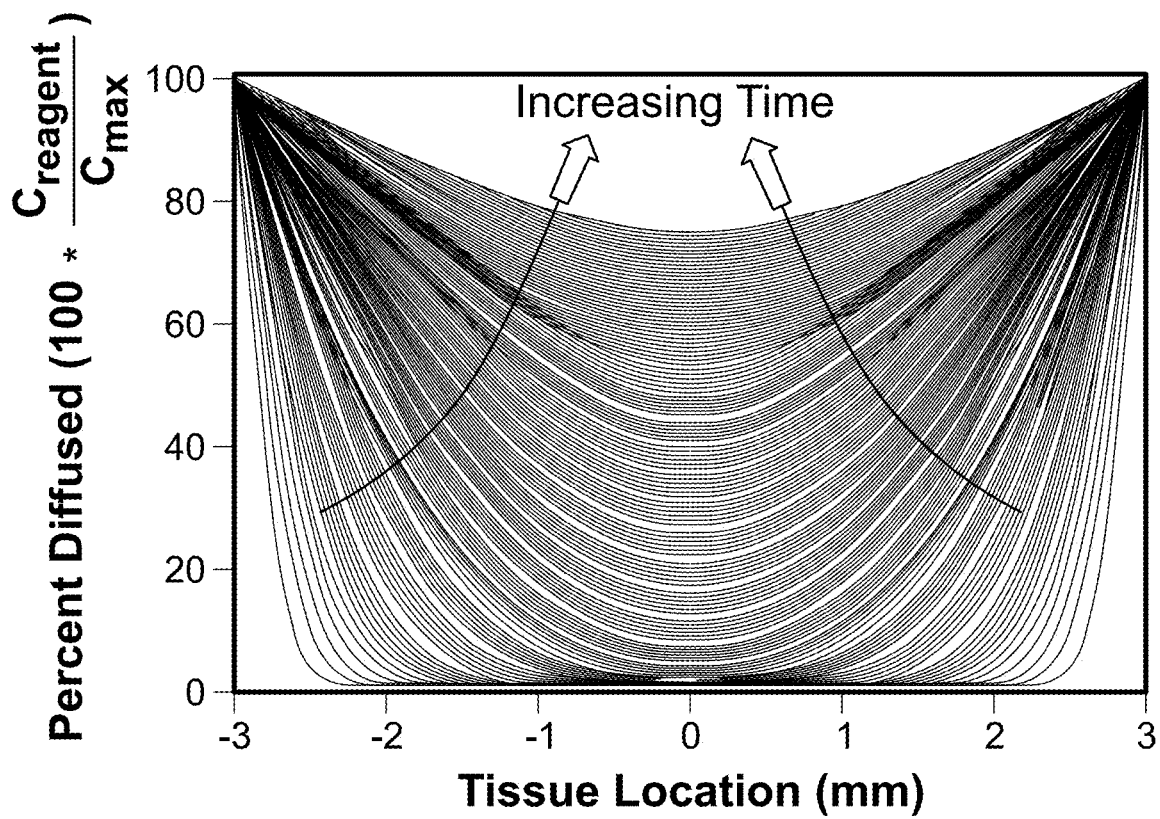
FIG. 5B shows a simulated concentration gradient for a first time point, and for several time points over the course of an experiment.

FIG. 5B shows a plot of $c_{reagent}(t, r)$ displaying the ("expected", "modeled", or "heat equation based") concentration of the reagent at all locations in the tissue (horizontal axis) as well as at all times (curves moving upward).

Referring back to FIG. 3, the results of the reagent modeling steps (S332-S334) may be used to predict the contribution towards the ultrasound signal based on the fact that the ultrasound detection mechanism linearly builds up phase retardation over the depth of the tissue.

Since the ultrasound detects an integrated signal from all tissue in the depth direction, i.e. along the propagation axis of the US beam and will thus be sensitive to the integrated amount of fluid exchange in the depth direction, an "integrated expected" reagent concentration $c_{detected}$, also referred to as "detected reagent concentration", may be calculated. In some embodiments, the "detected reagent concentration" is not an empirically detected value. Rather, it is a derivative value created by spatially integrating all expected reagent concentrations computed for a particular time point t and for a particular candidate diffusivity constant. In some embodiments, the spatial integration may cover, for example, the radius of the tissue sample.

For example, the detected reagent concentration $c_{detected}$ may be calculated using:

$$c_{detected}(t) = \frac{2}{R_o} \int_0^{R_o} c_{reagent}(t, x) dx$$

In some embodiments, the integrated reagent concentration $c_{detected}$ is used to calculate the total amount of reagent at a particular time point. For example, additional volume and/or weight information of the sample may be used for calculating absolute reagent amounts. Alternatively, and in some embodiments, the reagent amount is computed in relative units, e.g. as a percentage value indicating e.g. the volume fraction [%] of the sample being already diffused by the reagent.

After simulating (i.e., computing based on the heat equation model) the detected concentration of the reagent for a given candidate diffusivity constant and a given time point, that detected concentration may then be converted into a TOF signal (S335) as a linear combination of undiffused tissue and reagent, using:

$$TOF_{tissue}(t, D) = \frac{d_{tissue}}{r_{tissue}(t=0) + \rho c_{detected}(t)(r_{tissue}(t=0) - r_{reagent})}$$

where $r_{tissue}(t=0)$ is the speed of sound of undiffused tissue, and $\rho$ is the volume porosity of the tissue, representing the fractional volume of the tissue sample that is capable of fluid exchange with the bulk reagent. This equation therefore models the change in TOF signal from diffusion as a linear combination of the two distinct sound velocities (tissue and reagent). As the TOF of the respective sound velocities of pure tissue on the one hand and pure reagent on the other hand can easily be determined empirically (e.g. by respective phase-shift based TOF measurements), the amount of the reagent having already diffused into the sample at the particular time point can easily be determined.

In some embodiments, the TOF contribution of the pure tissue sample (being free of the TOF contribution of a bulk fluid such as sample buffers or the tissue fluid) can be obtained by subtracting the TOF contribution measured for the tissue sample including and/or being surrounded by the bulk fluid from the TOF contribution measured for an ultrasound signal having traversed a corresponding inter-transducer distance filled with the bulk fluid only.

Figure 6A:
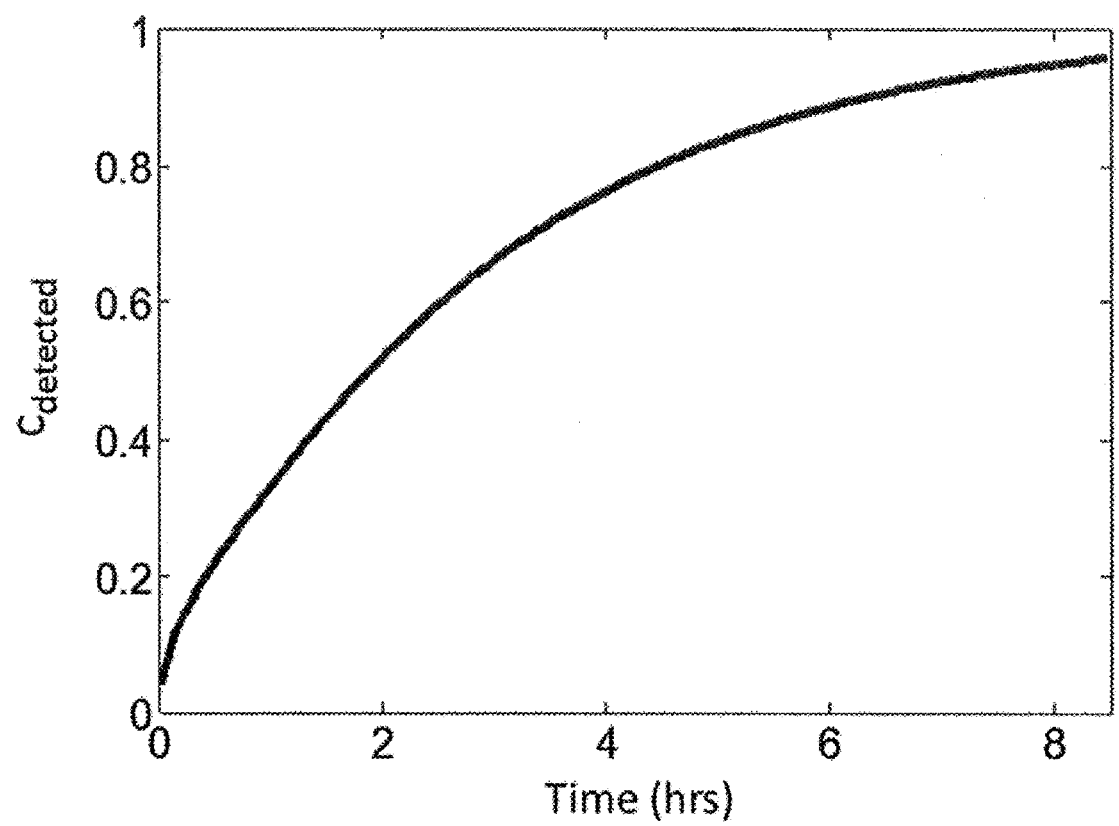
FIGS. 6A and 6B respectively depict plots of the simulated amount of detected concentration of NBF by the ultrasound over the course of the experiment (FIG. 6A) and the simulated TOF signal for the first candidate diffusivity constant (FIG. 6B).
Figure 6B:
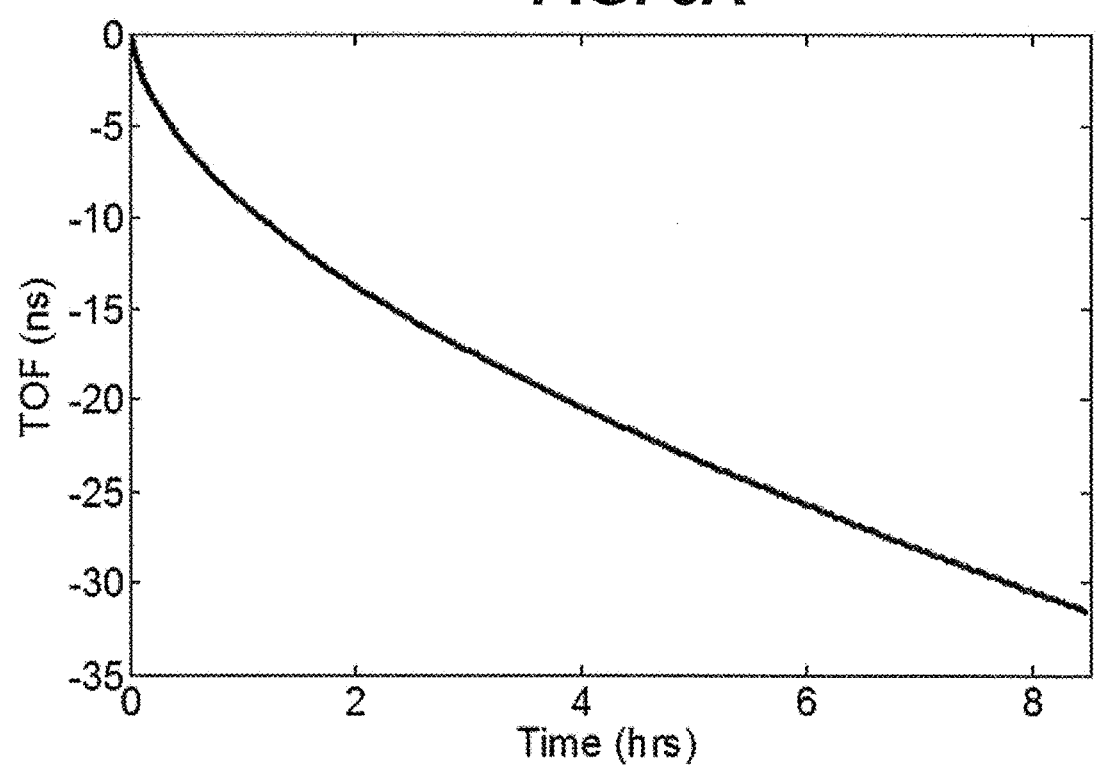

FIGS. 6A and 6B respectively depict a plot of the simulated, "detected" or "integrated" concentration of NBF by the ultrasound over the course of the experiment (FIG. 6A), and a plot of the simulated (or "expected") TOF signal for the first candidate diffusivity constant (FIG. 6B, where D=0.01 μm2/ms). The TOF signals in FIG. 6B are computed as derivatives of the respective integrated concentration of the reagent.

At this point, the method generally correlates (S336) the modeled (or "simulated" or "expected") TOF with an experimental TOF determined by measuring different spatial regions of interest (ROIs), also referred to as "candidate diffusivity points", within the tissue sample and determining a minimum of an error function to obtain a true diffusivity constant. In this example, each modeled TOF for the specific diffusion constant selected in the range specified by (S322) is correlated with the experimental TOF (S336), and determination is made as to whether or not an error is minimized (S337). In some embodiments, the if the error is not minimized, the next diffusion constant is selected (S338) and the modeling process (S332-S335) is repeated for the new diffusion constant. In some embodiments, the if it is determined that the error is minimized (S337) based on correlation (S336), then the true diffusivity constant is determined (S339) and the method ends.

Figure 4:
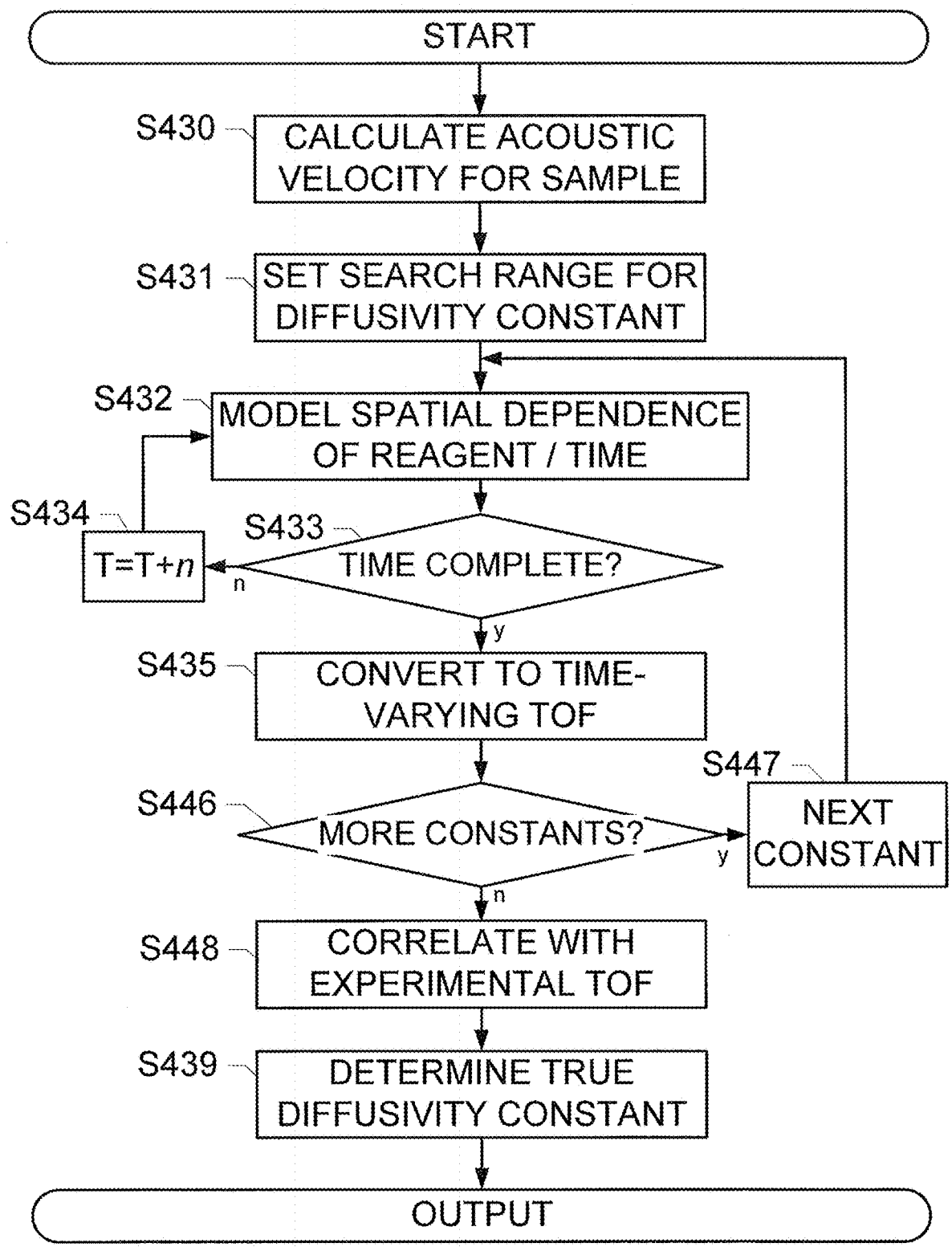
FIG. 4 shows an alternate method for obtaining a diffusivity coefficient for a tissue sample.
Figure 7:
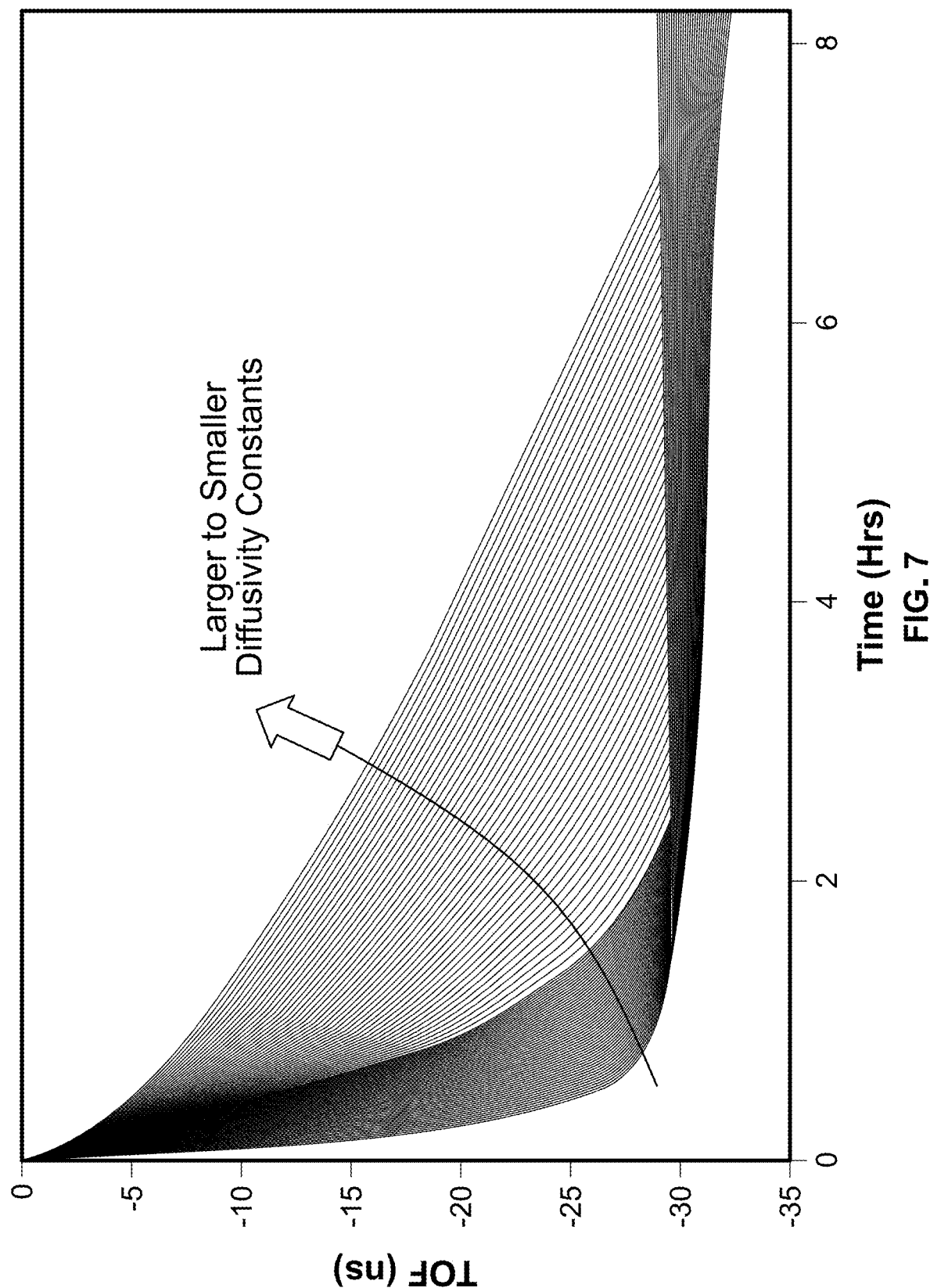
FIG. 7 depicts temporally varying TOF signals calculated for all potential diffusivity constants.

FIG. 4 shows an alternative method whereby all candidate diffusivity constants are first used to perform the modeling, based on steps S446-S447 and the correlation (S448) is performed after all the diffusivity constants are processed. A depiction of the temporally varying TOF signal calculated for all potential diffusivity constants is shown in FIG. 7. For example, FIG. 7 depicts simulated TOF traces over the 8.5 hour experiments for 6 mm tissue samples with diffusivity constants ranging from 0.01 to 2.0 µm2/ms. In the embodiment of FIG. 4, the error minimization is performed within true diffusivity constant determination step S439.

In either case, the experimental TOF must be determined for the correlation to take place. In some embodiments, the experimental TOF may be determined by measuring different spatial regions of interest (ROIs) within the tissue. In some embodiments, each signal has the contribution from background reagent subtracted out to isolate the contribution from active diffusion into the tissue. In some embodiments, individual TOF trends are temporally smoothed via filtering. In some embodiments, these spatially distinct TOF trends are then spatially-averaged to determine the average rate of 10% NBF diffusion into the tissue.

Figure 8B:
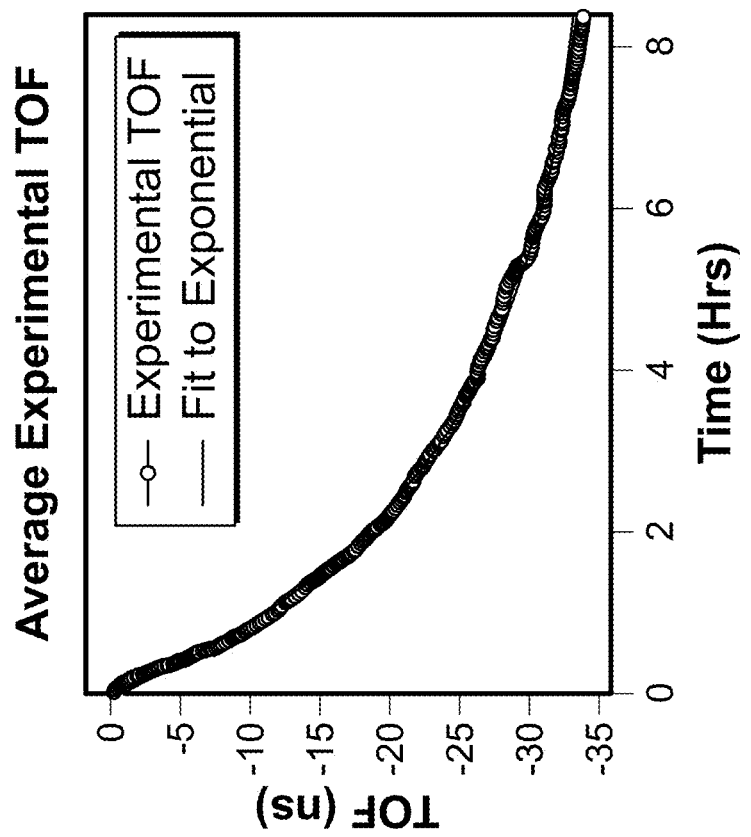
FIG. 8B depicts a spatially-averaged TOF signal collected from a 6 mm piece of human tonsil sample.
Figure 8A:
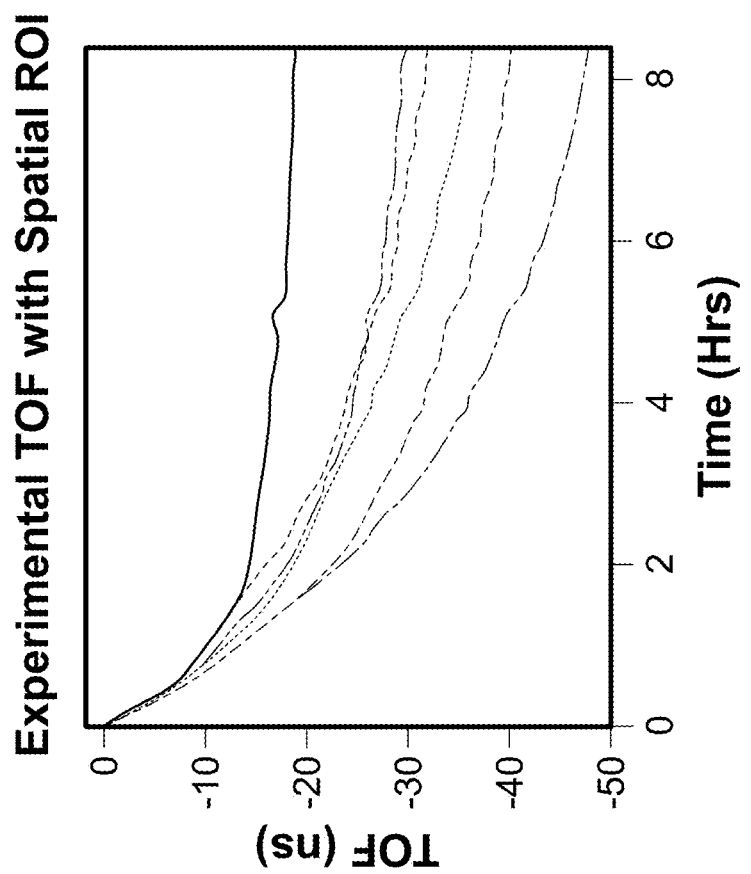
FIG. 8A depicts experimentally calculated TOF trends collected from a 6 mm piece of human tonsil sample.

FIGS. 8A and 8B respectively depict experimentally calculated TOF trends collected from a 6 mm piece of human tonsil sample (FIG. 8A) and spatially-averaged TOF signals (FIG. 8B) representing the average rate and amount of fluid exchange of 10% NBF into the tissue.

In some embodiments, the average rate of diffusion into the tissue is highly correlated to a single exponential signal (depicted by the dashed line in FIG. 8B), and derived by:

$$TOF_{experimental}(t) = Ae^{-t/\tau_{experimental}} + \text{offset}$$

where A is the amplitude of the TOF in nanoseconds (i.e., the TOF difference between the undiffused and fully diffused tissue sample), $\tau_{experimental}$ is the sample's decay constant representing the time required for the TOF to decay to 37% of its amplitude or equivalently to be 63% decayed and offset is a vertical offset of the above given decay function.

The 63% can be derived by the following calculation: at time t=τ, $TOF(\tau) = Ae^{(-tau/tau)} = Ae^{-1} = A/e = A/2.72 = 0.37*A$.

It is hereby assumed that the TOF decreases with an increase in reagent concentration in the sample, but the method would likewise be applicable for reagents which increase the measured TOF upon diffusing into the sample. In the 6 mm piece of human tonsil of the experimental embodiment, $\tau_{experimental}$=2.83 hours. Thus, from a plurality of TOFs having been experimentally determined for a plurality of consecutive time points, a decay constant of the tissue sample can be computed, e.g. by plotting the amplitudes of the TOF signal over time, analyzing the plot for identifying the offset and resolving the above solution for the decay constant.

In some embodiments, the error correlation (S336 in FIG. 3, S448 in FIG. 4) is performed to determine an error of the modeled ("expected") TOF vs. the experimental TOF. Having calculated simulated and experimental TOF signals, a difference between the two signals may be calculated to see whether or not the candidate diffusivity constant minimizes the difference between the two signals (S337).

In some embodiments, the error function may be computed in a couple of different ways, for instance, using one of the following:

$$\text{Error}(D) = \frac{1}{N}\sum_{t=1}^{N}(TOF_{simulated}(t, D) - TOF_{experimental}(t))^2$$

$$\text{Error}(D) = (\tau_{simulated}(D) - \tau_{experimental})^2$$

In some embodiments, the first error function calculates the point-by-point difference between simulated ("modeled", "expected") and experimentally measured TOF signals.

In some embodiments, the second error function exclusively compares the rate of diffusion between the simulated and modeled TOF signal by calculated the sum-squared differences between each's decay constant. The experimental decay constant $\tau_{experimental}$ can be obtained experimentally as described above. The "modeled", "expected" or "simulated" decay constant $\tau_{simulated}$ can be derived analogously from the modeled ("expected") TOFs signal of consecutive time points which also follow a decay function.

Based on the output of the error function, a true diffusivity constant may be determined (S339). The true diffusivity constant is calculated as the minimum of the error function, for instance:

$$D_{reconstructed} = \arg\min(\text{error}(D))$$

This equation enables a determination of the candidate diffusivity coefficient that produce a TOF signal as close as possible to the experimental data.

For example, with respect to the method depicted in FIG. 3, the error function may be determined for each candidate diffusivity constant until the error is minimized (S337). Alternatively, in the method of FIG. 4, the correlation with experimental TOF may be performed after all candidate diffusivity constants are processed, upon which the determination (S439) of the true diffusivity constant includes determining a minimum of the error function. In some embodiments, the minimum of the error function is ideally zero, or as closed as possible to zero. In some embodiments, any error function known in the art may be used with the goal being to minimize the error between the modeled versus experimental coefficients as disclosed herein.

Figure 9A:
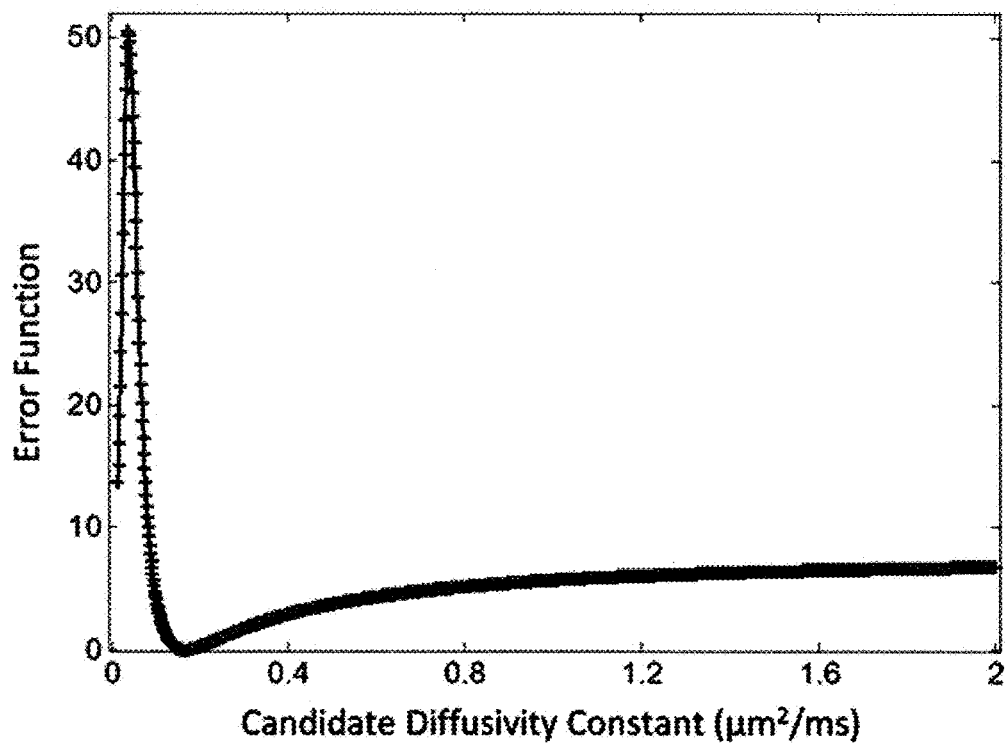
FIGS. 9A and 9B respectively show plots of the calculated error function between simulated (FIG. 9A) and experimentally measured (FIG. 9B) TOF signals as a function of candidate diffusivity constant and a zoomed-in view of the error function.
Figure 9B:
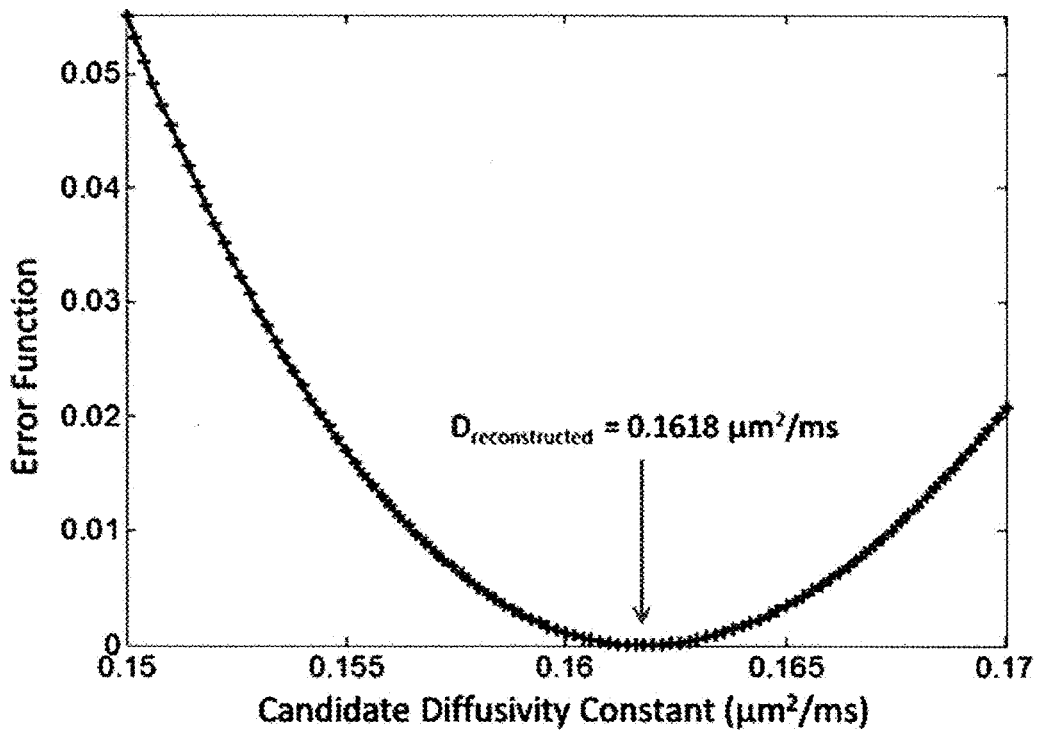
Figure 10:
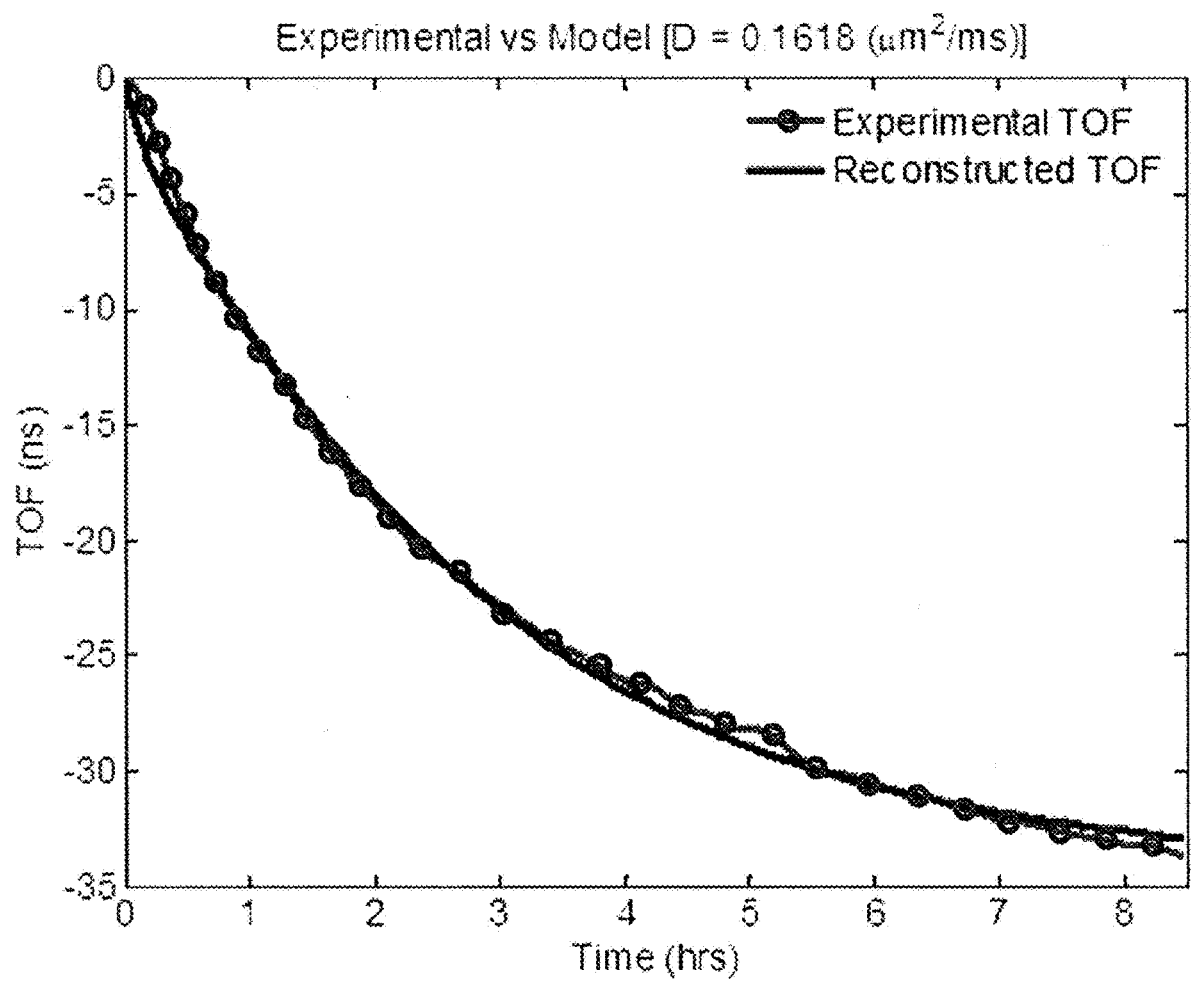
FIG. 10 depicts a TOF trend calculated with a modeled diffusivity constant plotted alongside an experimental TOF.

FIGS. 9A and 9B respectively show a plot of the calculated error function between simulated and experimentally measured TOF signals as a function of candidate diffusivity constant (FIG. 9A, ΔD≈10e$^{-5}$ µm$^2$/ms.), and a zoomed-in view of the error function (FIG. 9B). In the experimental embodiment, the minimum of the error function was calculated to be at D=0.1618 µm$^2$/ms. The validity of the reconstructed constant was tested and used to back-simulate a TOF trend. FIG. 10 depicts the TOF trend calculated with this diffusivity constant and plotted alongside the experimental TOF measured with the 6 mm piece of human tonsil. In FIG. 10, the plot shows the experimentally calculated TOF trend from a 6 mm piece of human tonsil in 10% NBF (dotted line) and the modeled TOF trend for $D_{reconstructed}$=0.168 µm$^2$/ms (solid line). In this embodiment, $\tau_{experimental}$=2.830 hours and $\tau_{simulated}$=2.829 hours.

Figure 11B:
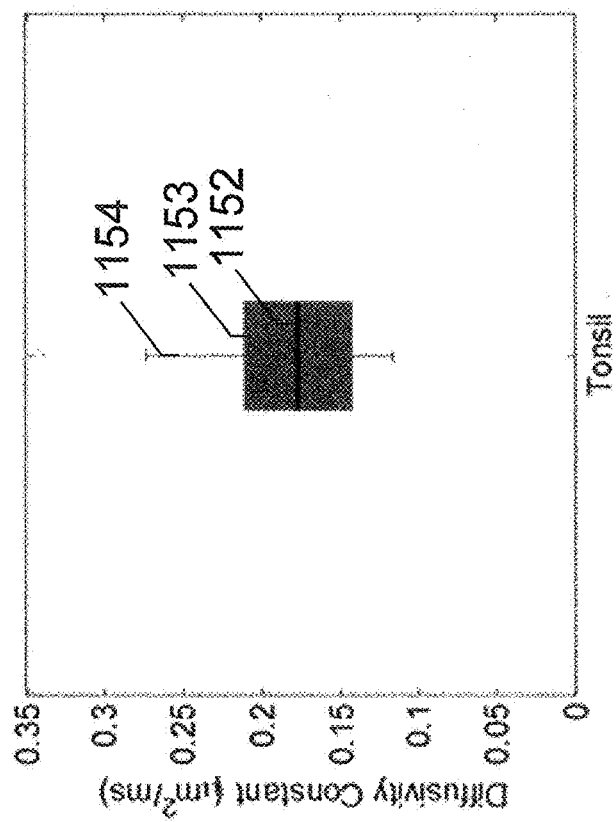
FIGS. 11A and 11B each show reconstructed diffusivity constants for multiple tissue samples.
Figure 11A:
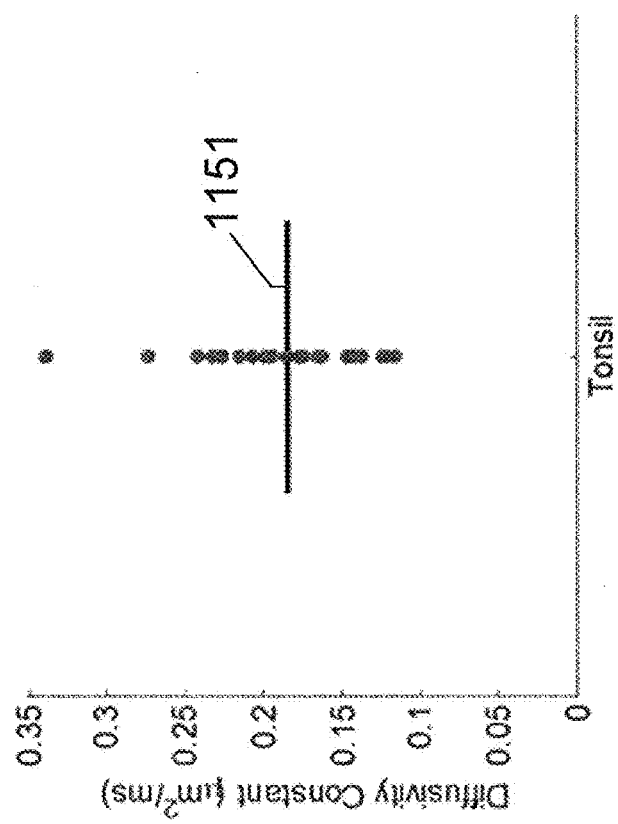

Furthermore, this same procedure was repeated for several specimens of 6 mm human tonsil samples, with successfully reconstructed diffusivity constants for all samples, as depicted in FIGS. 11A and 11B. FIG. 11A shows reconstructed diffusivity constants for the 23 samples of 6 mm human tonsil. Line 1151 represents the average. FIG. 11B shows a box and whisker plot displaying the distribution of the reconstructed diffusivity constants. Line 1152 represents the median value, and the box 1153 extends from the 25-75 percentiles, with whiskers 1154 extending from the 5-95 percentiles. Overall, the algorithm predicted 6 mm tonsils samples have an average diffusivity constant of 0.1849 µm2/ms with a relative tight distributed producing a standard deviation of 0.0545 µm2/ms.

Figure 12A:
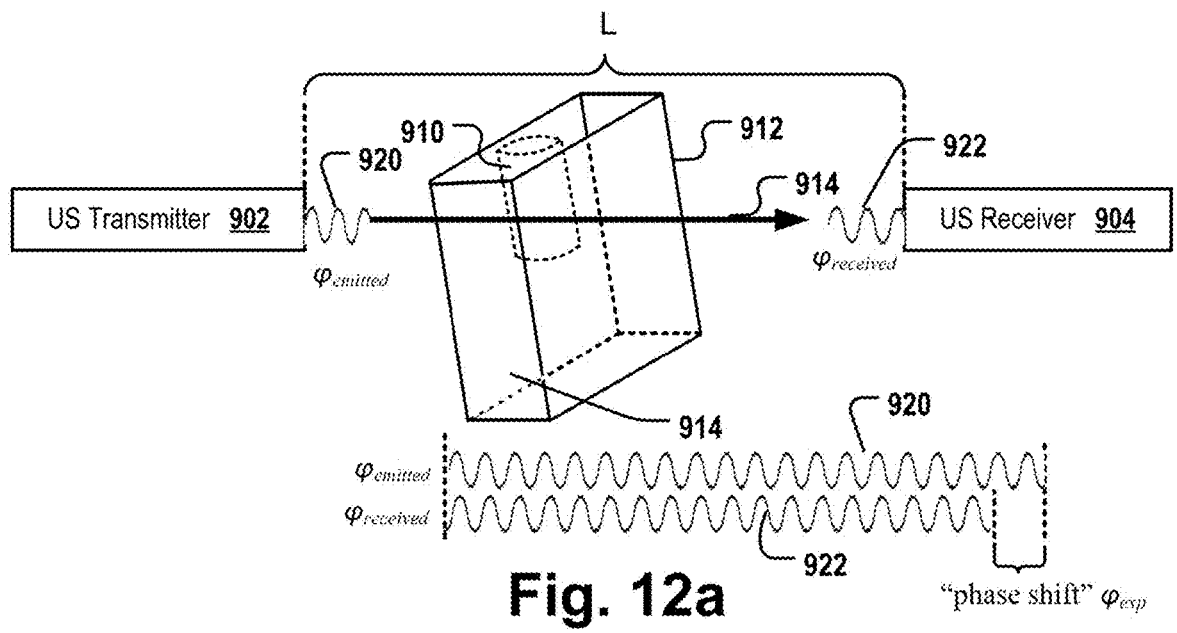
FIG. 12A depicts a system comprising a transmitter and a receiver pair for measuring TOF via phase shifts.

FIG. 12A shows a system for monitoring the time-of-flight of an ultrasound signal according to embodiments of the disclosure. An ultrasound-based time-of-flight (TOF) monitoring system may comprise one or more pairs of transducers (e.g. TA0040104-10, CNIRHurricane Tech) for performing the time-of-flight measurements based on a phase shift of the ultrasound signals. In the embodiment depicted in FIG. 12A, the system comprises at least one pair of transducers consisting of an ultrasound ("US") transmitter 902 and an ultrasound receiver 904 which are spatially aligned to each other such that a tissue sample 910 which is placed in the beam path 914 from the transmitter to the receiver is located at our close to the common foci of the two transducers 902, 904. The tissue sample 910 can be contained, for example, in a sample container 912 (e.g. a standard histological cassette like "CellSafe 5" of CellPath or a biopsy capsule like "CellSafe Biopsy Capsules" of CellPath) that is filled with a fixation solution. Phase-shift based TOF measurements are performed before and after the biopsy capsule 912 is filled with the fixation solution and while the solution slowly diffuses into the sample. The one transducer acting as the transmitter sends out an acoustic pulse that traverses the tissue and is detected by the other transducer acting as the receiver. The total distance between two transducers constituting a transmitter-receiver transducer pair is referred to as "L". The total time the ultrasound signal needs to traverse the distance between the transmitter 902 and the receiver 904 may be referred to as time-of-flight of the signal. The transmitter 902 may be focused, for example, at 4 MHz and support a frequency sweep range of 3.7-4.3 MHz.

In some embodiments, the distance L is assumed here to be known, at least approximately. For example, the distance of the transducers may be accurately measured (e.g. by optic, ultrasound based or other measurement techniques) or may be disclosed by a manufacturer of the acoustic monitoring system.

In some embodiments, the transmitting transducer 902 is programmable with a waveform generator (e.g. AD5930 from Analog Devices) to transmit a sinusoidal wave (or "sinusoidal signal") for a defined frequency for a defined time interval, e.g. several hundred microseconds. In some embodiments, that signal is detected by the receiving transducer 904 after traversing the fluid and/or tissue. In some embodiments, the received ultrasound signal 922 and the emitted (also referred to as "transmitted") sinusoid signal 920 are compared electronically with a digital phase comparator (e.g. AD8302, Analog Devices).

As used herein, the term "received" "signal" (or wave) refers a signal whose properties (phase, amplitude, and/or frequency, etc.) are identified and provided by a transducer, e.g. receiver 904, that receives the signal. Thus, the signal properties are identified after the signal has passed a sample or any other kind of material.

As used herein, the terms "transmitted" or "emitted" "signal" (or wave) refer to signals whose properties (phase, amplitude, and/or frequency, etc.) are identified by a transducer, e.g. transmitter 902 that emits the signal. In some embodiments, the signal properties are identified before the signal has passed a sample or any other kind of material.

For example, the transmitted signal may be characterized by signal properties identified by the transmitting transducer, the received signal may be characterized by signal properties measured by the receiving transducer, whereby the transmitting and the receiving transducer are operatively coupled to a phase comparator of the acoustic monitoring system.

Figure 12B:
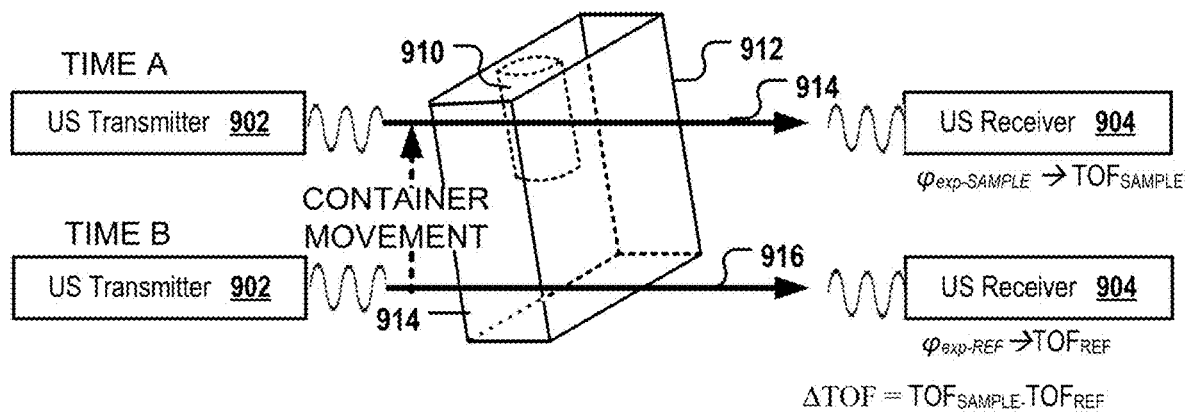
FIG. 12B depicts a system comprising a transmitter and a receiver pair for measuring TOF via phase shifts.

FIG. 12B depicts the determination of the TOF for the pure reagent from which the speed of the sound wave for the beam path crossing the pure reagent without the sample can be inferred. In this embodiment, the one or more transducer pairs 902, 904 and the sample container 912 can be moved relative to each other. In some embodiments, the system comprises a container holder capable of repositioning the container 912 such that the US beam traverses a region 914 of the container that solely comprises the fixation solution but not the tissue.

At a time, A, when the tissue is not yet immersed in a fixation solution, the TOF for a sound signal traversing the distance between the transducers is obtained via a measured phase shift φexp as described for FIG. 12A. In this case, the beam path crosses a sample being free of the reagent. As L is known, the measured TOF can be used for computing the speed of the sound signal for traversing the distance in the presence of the undiffused sample.

At a time, B, when the tissue is immersed in a fixation solution, the TOF for a sound signal traversing the distance between the transducers is obtained via a measured phase shift φexp. In this case, the beam path crosses a sample container comprising only the reagent, not the sample (or crosses the sample container at a position that is free of the sample). As L is known, the measured TOF can be used for computing the speed of the sound signal for traversing the distance in the presence of the reagent (and the sample container) only, i.e., in the absence of the sample in the beam path.

Time A and time B may represent identical time points in case a further transducer pair is configured for performing the two measurements in parallel.

III. Examples

An investigation of the disclosed method of determining reagent concentrations across space and time within a sample, and across tissue sample types, was conducted. Samples were monitored during cold immersion in NBF using a TOF system as described above and extracted experimental TOF data over time was obtained. Following TOF analysis, samples were warmed to fix the tissues and then processed in a tissue processor to prepare sample paraffin blocks. In some embodiments, the blocks were sliced on a microtome and mounted on microscope slides and stained according to standard protocols, and in some instances read by qualified slide readers to assess stain quality.

Figure 13:
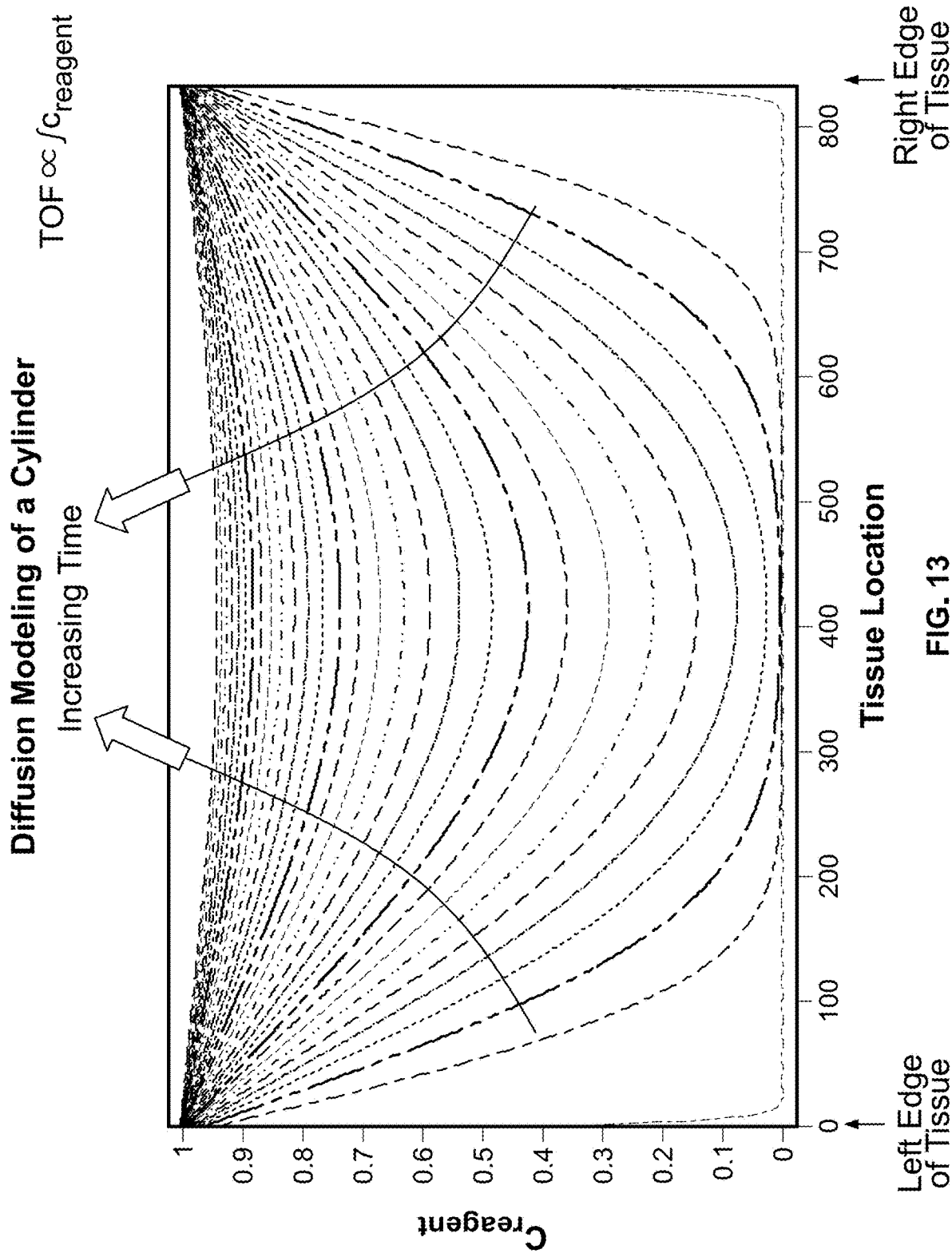
FIG. 13 shows a model of diffusion of a reagent into a cylindrical object, such as a cylindrical tissue core.

FIG. 13 shows a model of diffusion of a reagent into a cylindrical object, such as a cylindrical tissue core. As can be seen, the reagent concentration rapidly increases first at the edges of the tissue sample, and that the concentration of the reagent at the center increases slowly (if at all) at first, lagging the concentration changes seen at the edges of the sample, and then accelerating at later time points, before beginning to slow again. In this model:

$$TOF \propto fc(\text{reagent})$$

In comparison to FIG. 5B, the changes in concentration over time are more variable in rate than are the changes seen for percent diffused. This is not unexpected as percent diffusion is a measured average across the entire sample, whereas the concentration changes are location specific.

Furthermore, since sample porosity scales with A in the following equation:

$$TOF_{experimental}(t) = Ae^{-t/\tau_{experimental}} + \text{offset},$$

once the diffusivity constant is known, candidate porosities can be used to calculate simulated TOF curves and compared to experimental TOF curves to generate an error, which error can be minimized. The error function may be computed in different ways, for instance, using one of the following:

$$\text{Error(porosity)} = \frac{1}{N}\sum_{t=1}^{N}(TOF_{simulated}(t, \text{porosity}) - TOF_{experimental}(t))^2$$

$$\text{Error}(D) = (\tau_{simulated}(\text{porosity}) - \tau_{experimental})^2$$

In some embodiments, the first error function calculates the point-by-point difference between simulated ("modeled", "expected") and experimentally measured TOF signals.

In some embodiments, the second error function exclusively compares the rate of diffusion between the simulated and modeled TOF signal by calculating the sum-squared differences between each's decay constant. The experimental decay constant $\tau_{experimental}$ can be obtained experimentally as described above. The "modeled", "expected" or "simulated" decay constant $\tau_{simulated}$ can be derived analogously from the modeled ("expected") TOFs signal of consecutive time points which also follow a decay function.

In some embodiments, based on the output of the error function, a true porosity may be determined. The true porosity is calculated as the minimum of the error function, for instance:

$$\rho_{reconstructed} = \arg\min(\text{error(porosity)})$$

In some embodiments, once the porosity of the sample is determined, a concentration of a reagent at a particular point in space and time can be calculated using the following equation:

$$\text{reagent\_conc} = (\% \text{ diffused})(\rho)\left(\frac{\text{MWg\_reagent}}{1 \text{ liter}}\right)\left(\frac{1 \text{ mol}}{\text{MWg\_reagent}}\right)$$

Figure 14:
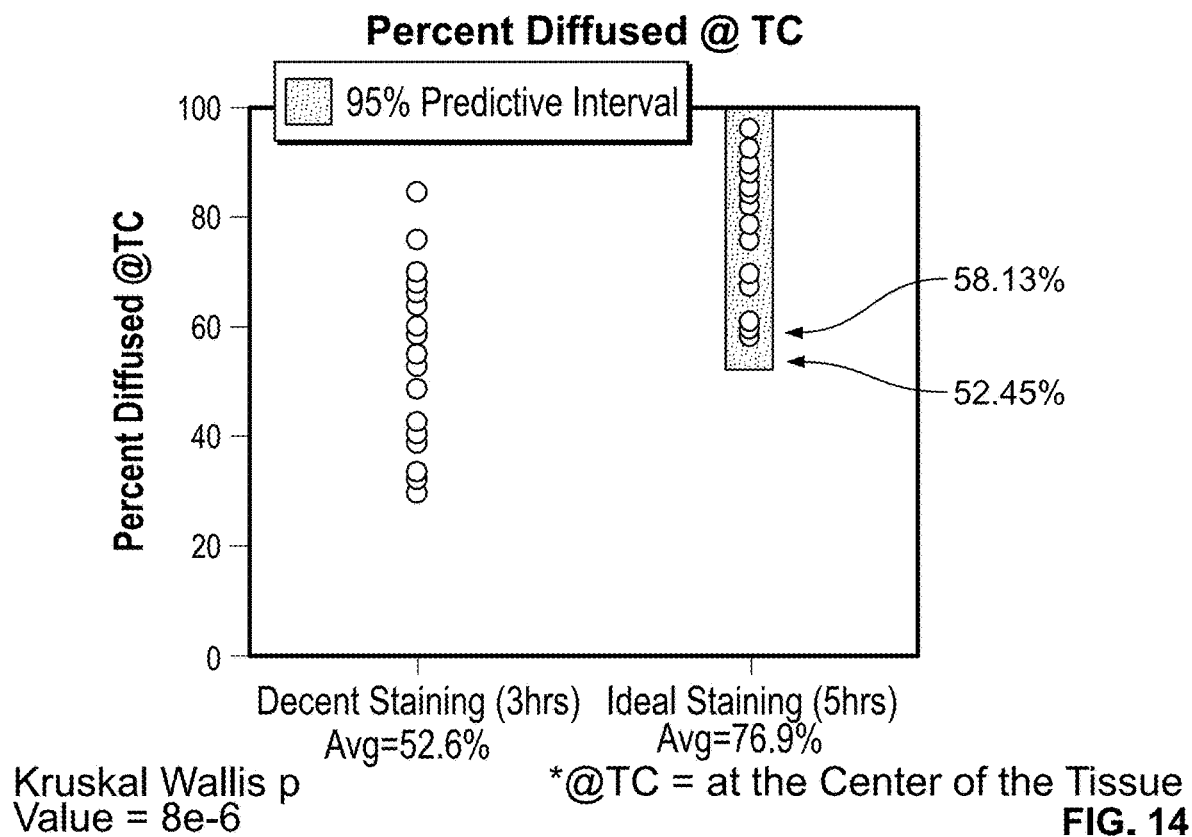
FIG. 14 shows a typical distribution of the percent diffusion of a reagent into the tissue sample center at about 3 hours and about 5 hours.

FIG. 14 comparatively illustrates a typical distribution of the percent diffusion of a formalin solution into the centers of tonsil tissue core samples (about 6 mm cylinders) at about 3 hours and about 5 hours, wherein an about 3 hour immersion of a sample yields decent staining whereas an about 5 hour immersion yields "ideal" staining. On average, a sample subjected to an about 3 hour immersion will reach an about 52.6% percent diffusion at tissue center and a sample subjected to a 5 hour immersion will reach an average percent diffusion of about 76.9% diffused. The about 95% predictive interval at about 5 hours indicates that a sample needs to be at least about 52.45% diffused at the center to achieve "ideal" staining as judged by pathologist review.

Figure 15:
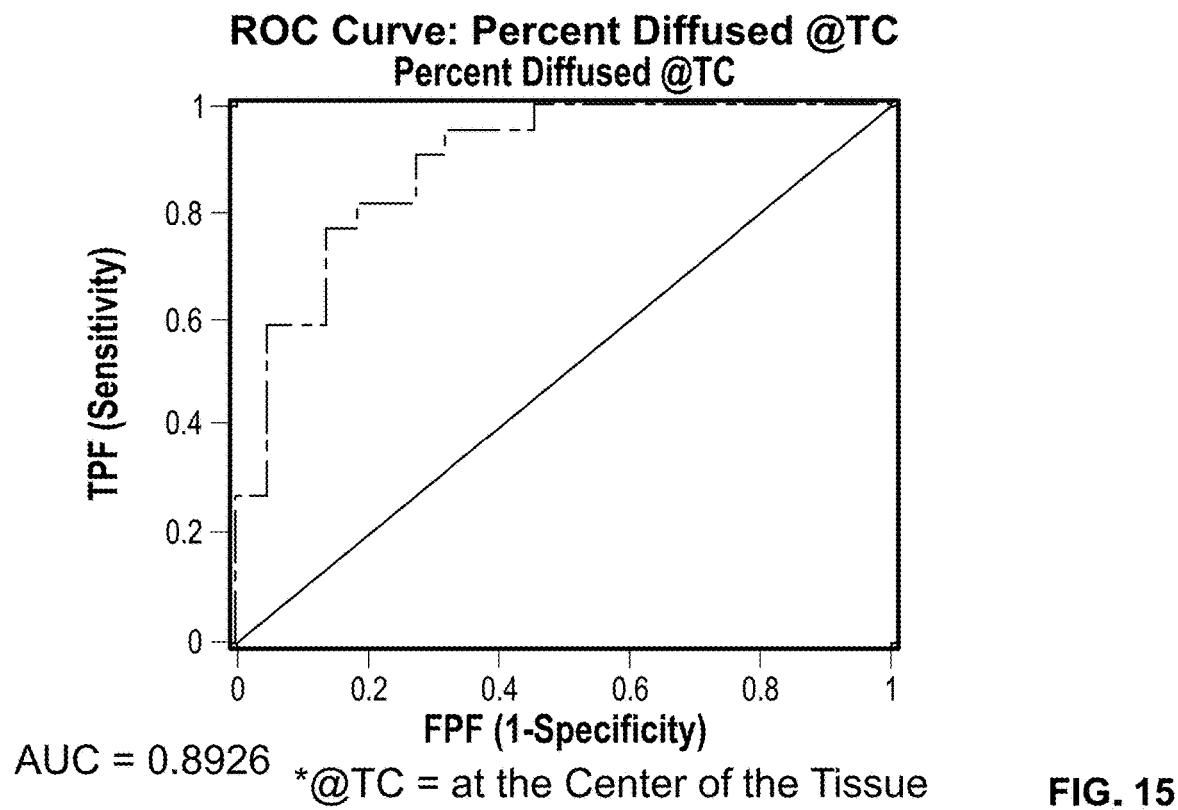
FIG. 15 shows a typical ROC curve of staining quality (based on sensitivity and specificity) based on percent diffusion at the tissue sample center.

FIG. 15 shows for comparison a receiver operating characteristic ("ROC") curve of staining quality (sensitivity and specificity) based on percent diffusion at the tissue sample center. In this instance, using percent diffusion at tissue center yields an area under the curve (AUC) of 0.8926 for prediction of staining quality based on a measurement of percent diffused at tissue center.

Figure 16:
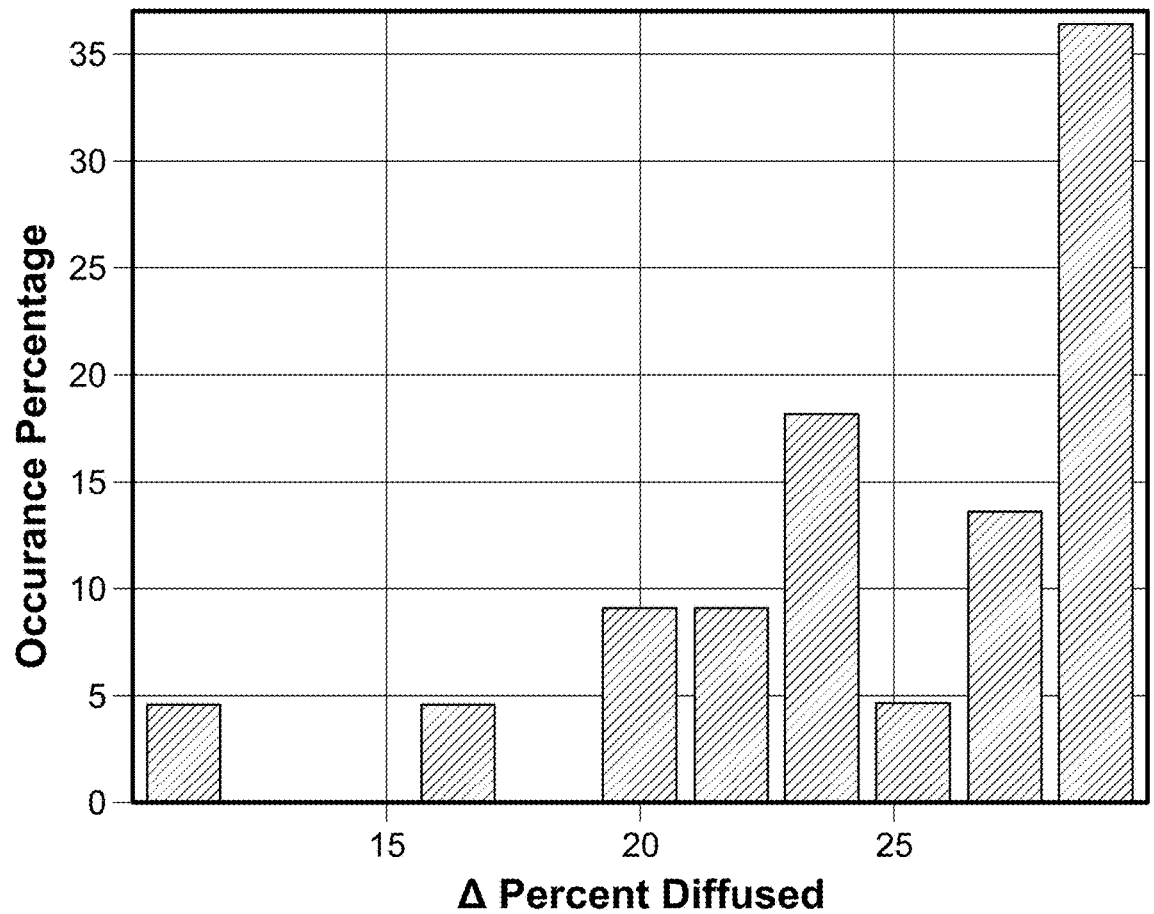
FIG. 16 shows a typical graph of the differential in percent diffusion at the tissue sample center between about 3 hours and 5 about hours of exposure to a reagent.

FIG. 16 shows for comparison a typical graph of the differential in percent diffusion measured at the tissue sample center between 3 hours and 5 hours of exposure to a reagent, with the result that the average difference between 3 and 5 hours of diffusion is 24.3% at the center of the tissue.

Figure 18:
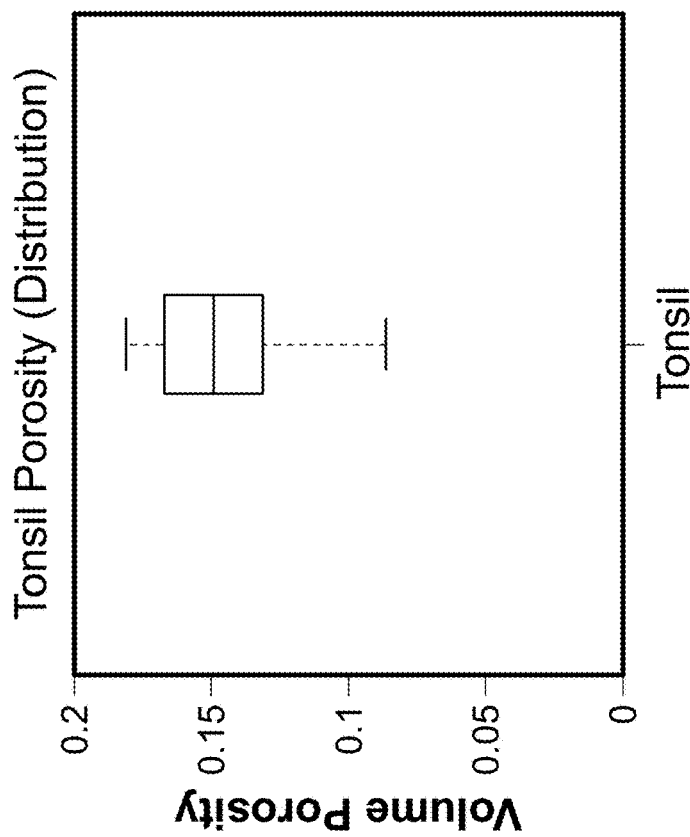
FIG. 18 shows a box and whisker distribution of tonsil tissue volume porosity determined according to a disclosed embodiment.
Figure 17:
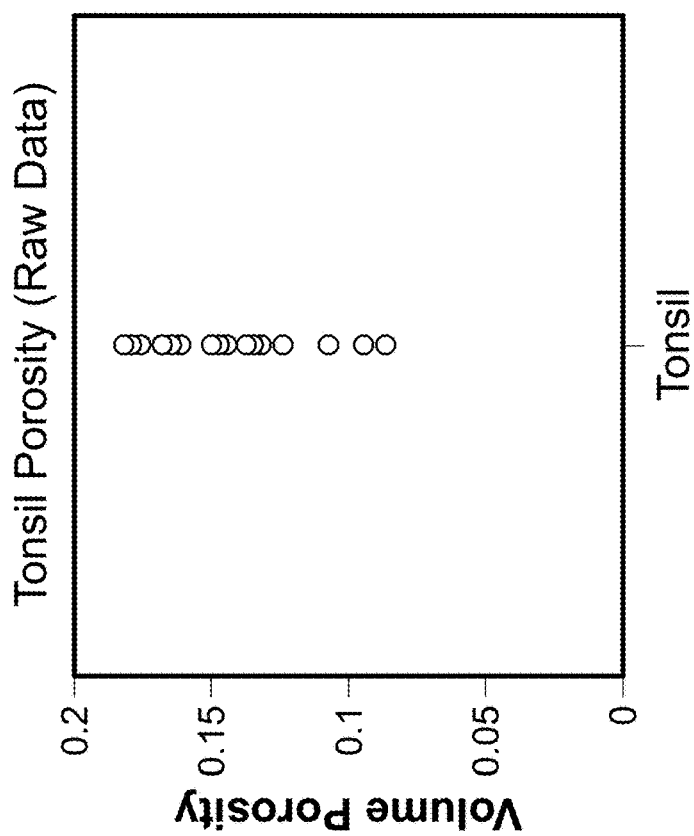
FIG. 17 shows the raw data distribution of tonsil tissue volume porosity determined according to a disclosed embodiment.

Turning now to results obtained using the disclosed method of determining reagent concentrations at particular spatial points within a tissue sample from TOF data, FIG. 17 shows a raw data distribution of determined tonsil tissue volume porosities for several samples. FIG. 18 shows a corresponding box and whisker distribution of the data of FIG. 17 for determined tonsil tissue volume porosities. As can be seen, tonsil tissue in particular exhibits an average porosity of about 0.15.

Figure 19:
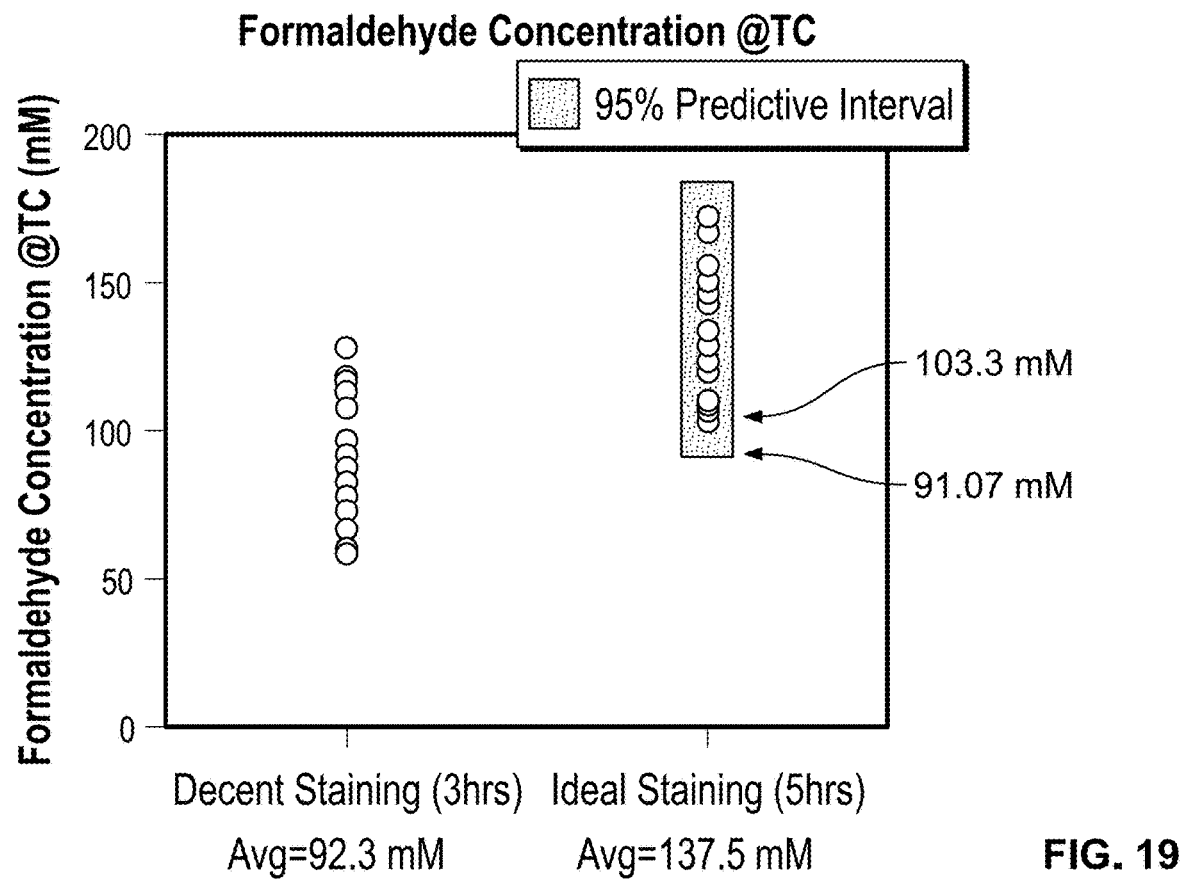
FIG. 19 shows a typical distribution of formaldehyde concentration at the tissue sample center as determined according to a disclosed embodiment at about 3 hours and about 5 hours.

FIG. 19 shows a typical distribution of formaldehyde concentrations at the tissue sample center for tonsil tissue core samples (approximately 6 mm cylinders) at 3 hours and 5 hours, wherein a 3 hour immersion of a sample yields decent staining whereas a 5 hour immersion yields "ideal" staining. On average, a sample subjected to a 3 hour immersion will reach a 92.3 mM formaldehyde concentration at tissue center and a sample subjected to a 5 hour immersion will reach an average concentration at tissue center of 137.5 mM. The 95% predictive interval at 5 hours indicates that a sample should have achieved at least 91.07 mM formalin at tissue center during fixation to achieve "ideal" staining as judged by pathologist review.

Figure 20:
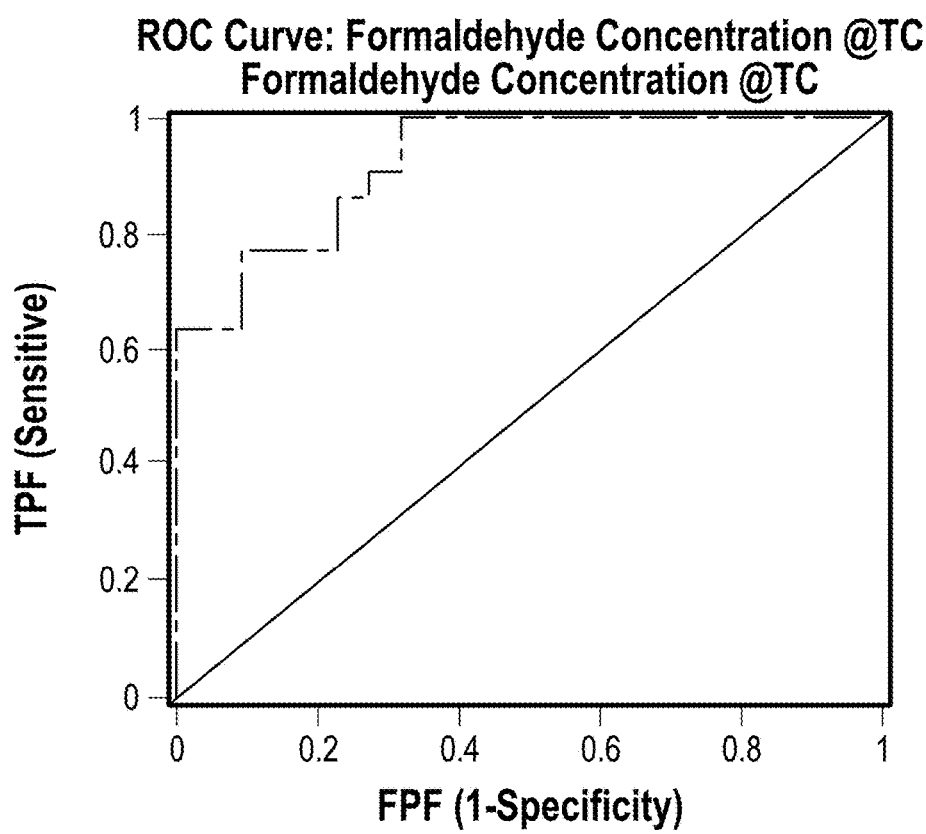
FIG. 20 shows a typical ROC curve of staining quality (based on sensitivity and specificity) based on formaldehyde concentration at the tissue sample center.

FIG. 20 shows a ROC curve of staining quality (sensitivity and specificity) based on formaldehyde concentration at the tissue sample center. The AUC in this case is 0.9256, which demonstrates the superiority of using formaldehyde concentration at tissue center as a predictor of stain quality in comparison with use of percent diffused at tissue center as a predictor of stain quality (AUC-0.8926) as shown in FIG. 15.

Figure 21:
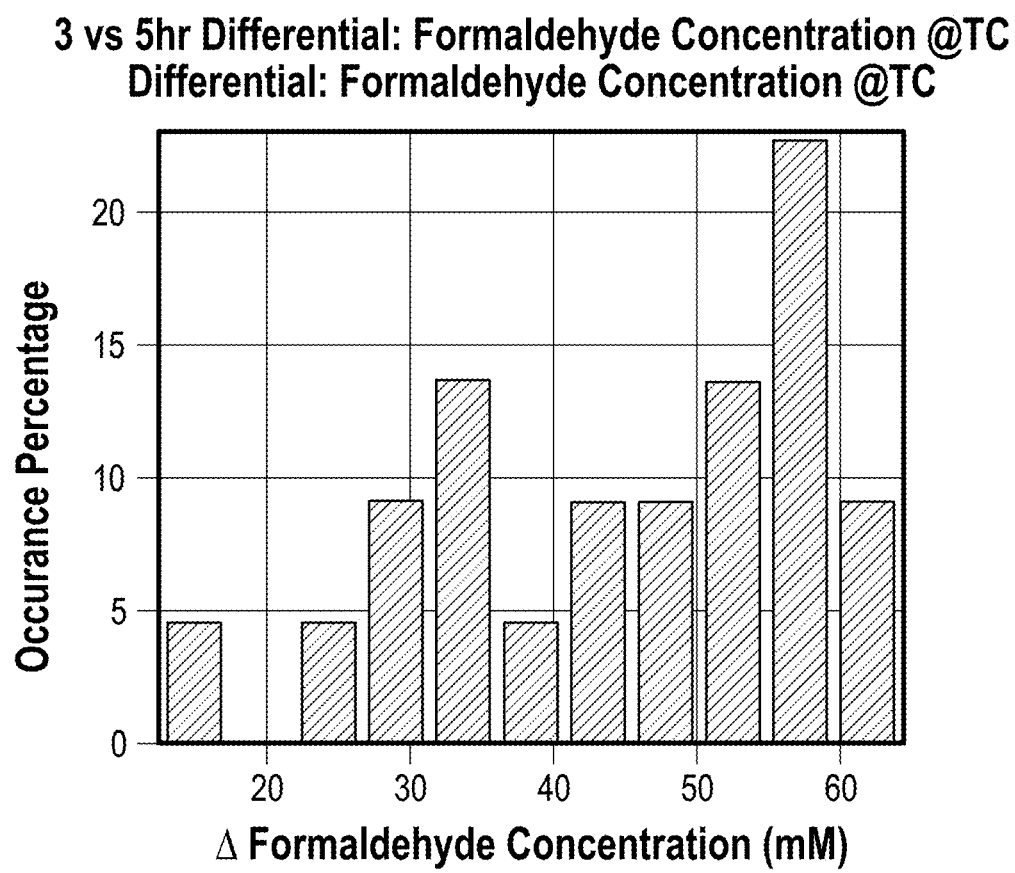
FIG. 21 shows a typical graph of the differential in formaldehyde concentration at the tissue sample center between about 3 hours and about 5 hours of immersion in an NBF solution.

Likewise, FIG. 21 demonstrates the superiority of reagent concentration at tissue center as a predictor of stain quality. As such, FIG. 21 provides a graph of the differential in formaldehyde concentration at the tissue sample center between about 3 hours and about 5 hours of immersion in an NBF solution. Overall, the average difference seen in concentration is about 45 mM. Compared to the difference in percent diffused (24%; FIG. 16), the difference in concentration at tissue center between about 3 hours and about 5 hours is more dramatic at about 33% (45 mM/137 mM×100%) reflecting the differences in reagent concentration occurring late in an immersion that can have an effect on staining quality at the tissue center. Again, this demonstrates the advantage of using a method that provides a measure (in this case concentration) that is location and time specific within the sample volume, as opposed to an average measure across the entire sample volume (as in the case of a percent diffused measurement alone).

Figure 22:
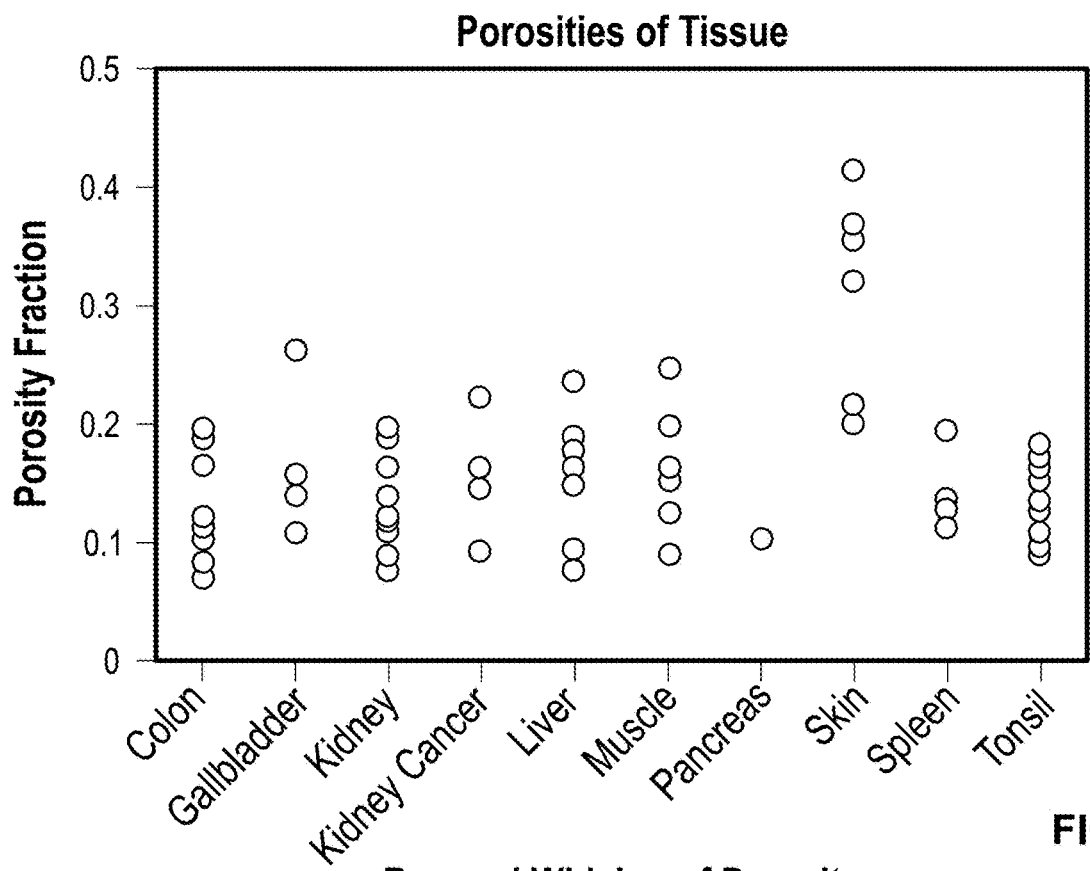
FIG. 22 shows the distributions of raw porosities for several tissue types as determined according to a disclosed embodiment.
Figure 23:
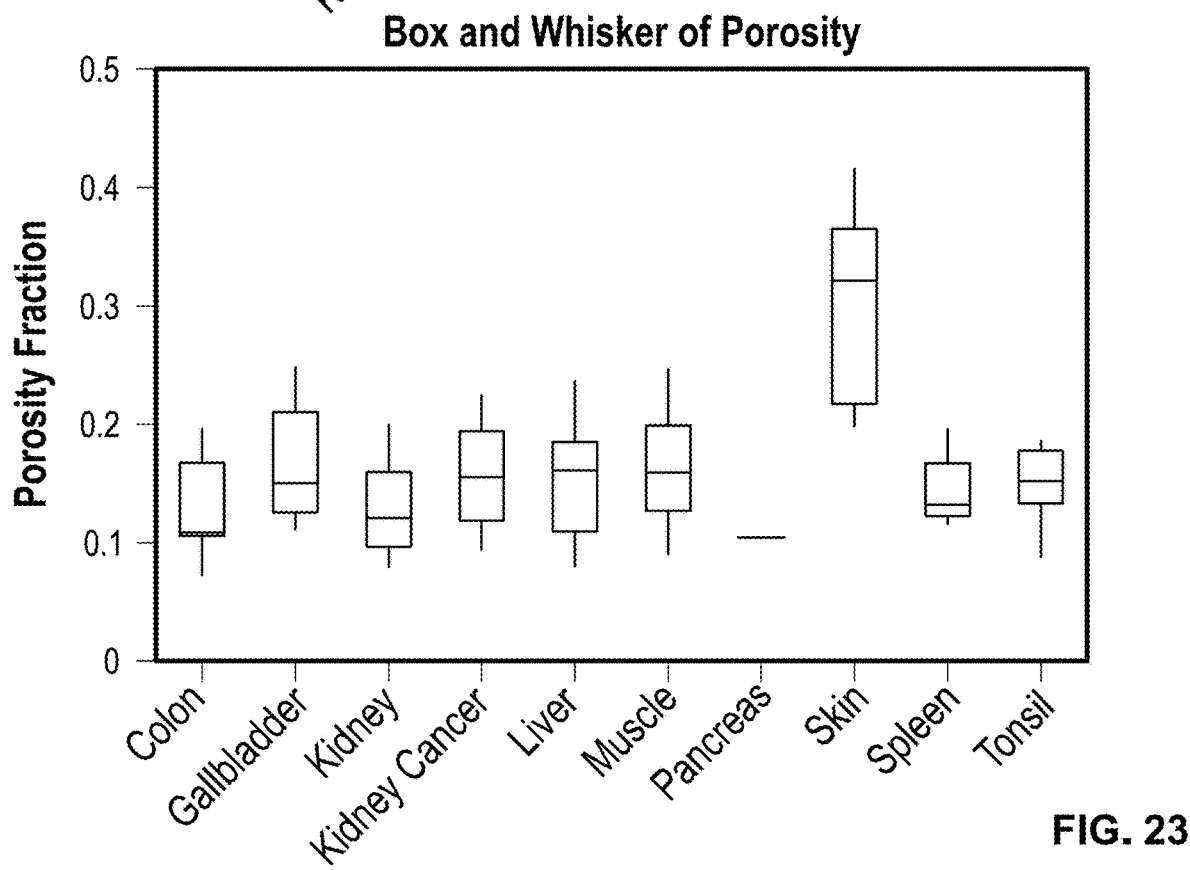
FIG. 23 shows a set of box and whisker distributions of porosities for several tissue types as determined according to a disclosed embodiment.

Having established the disclosed method could be used to determine a porosity for tonsil tissue, porosities were measured for about 10 different tissue types (about 80 samples), and the results are shown in FIG. 22, which shows the distributions of raw porosities for the several tissue types. FIG. 23 shows a set of box and whisker distributions of porosities for the several tissue types. As can be seen, for most tissue types, the average porosity (line in box) is between about 0.1 and about 0.2, whereas skin has a much higher porosity of more than about 0.3.

Figure 24:
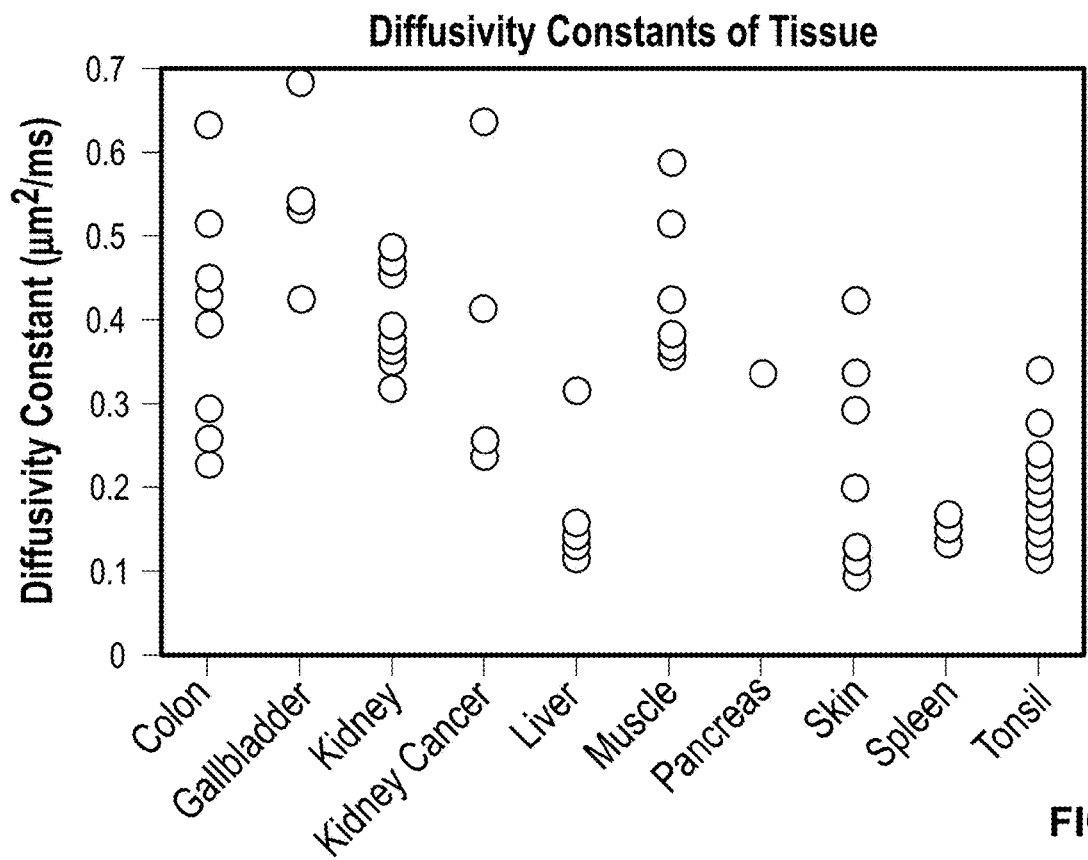
FIG. 24 shows the distributions of diffusivity constants for several tissue types.
Figure 25:
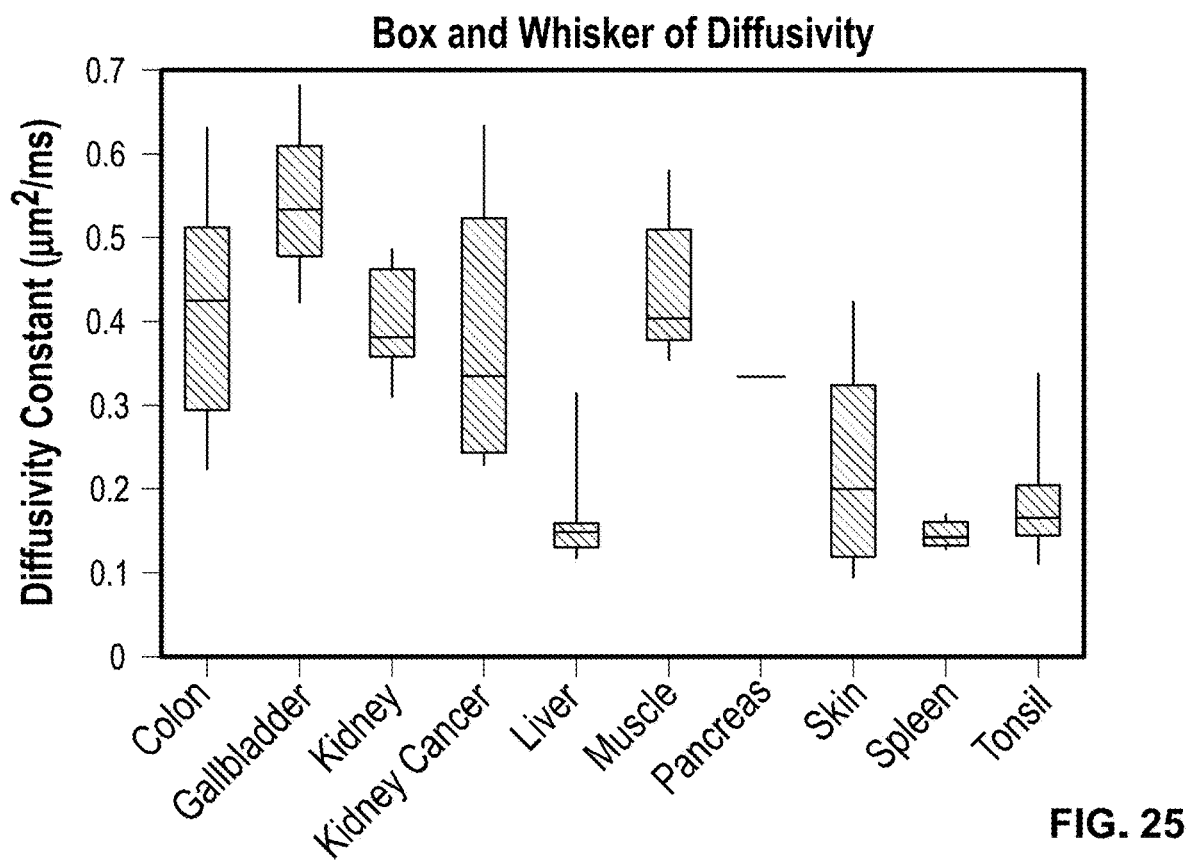
FIG. 25 shows a set of box and whisker distributions of diffusivity constants for several tissue types.

For comparison, FIG. 24 shows the distributions of the determined diffusivity constants for the several tissue types, and FIG. 25 shows a set of box and whisker distributions of the diffusivity constants for the several tissue types. In comparison to the average porosities determined among the several tissue types, the diffusivity constant is more variable.

Figure 26:
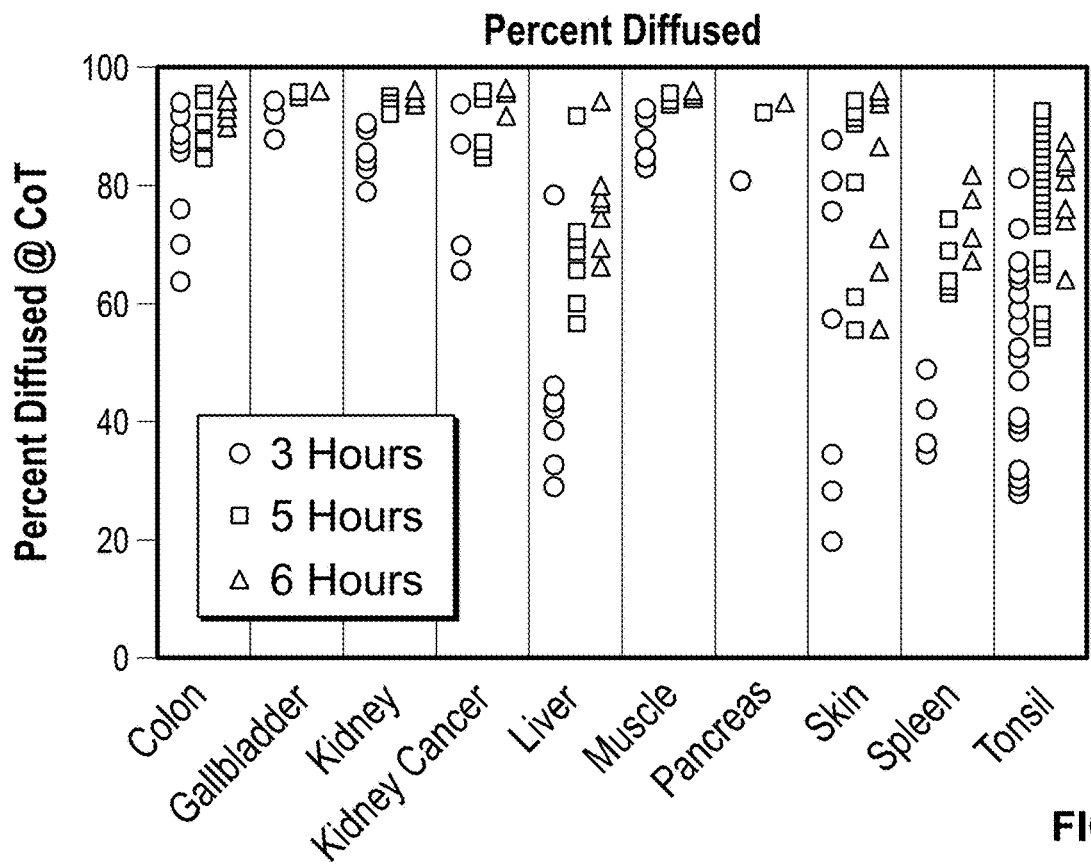
FIG. 26 shows the distributions of raw percent diffusion at the tissue sample center at about 3, about 5 and about 6 hours for several tissue types.
Figure 27:
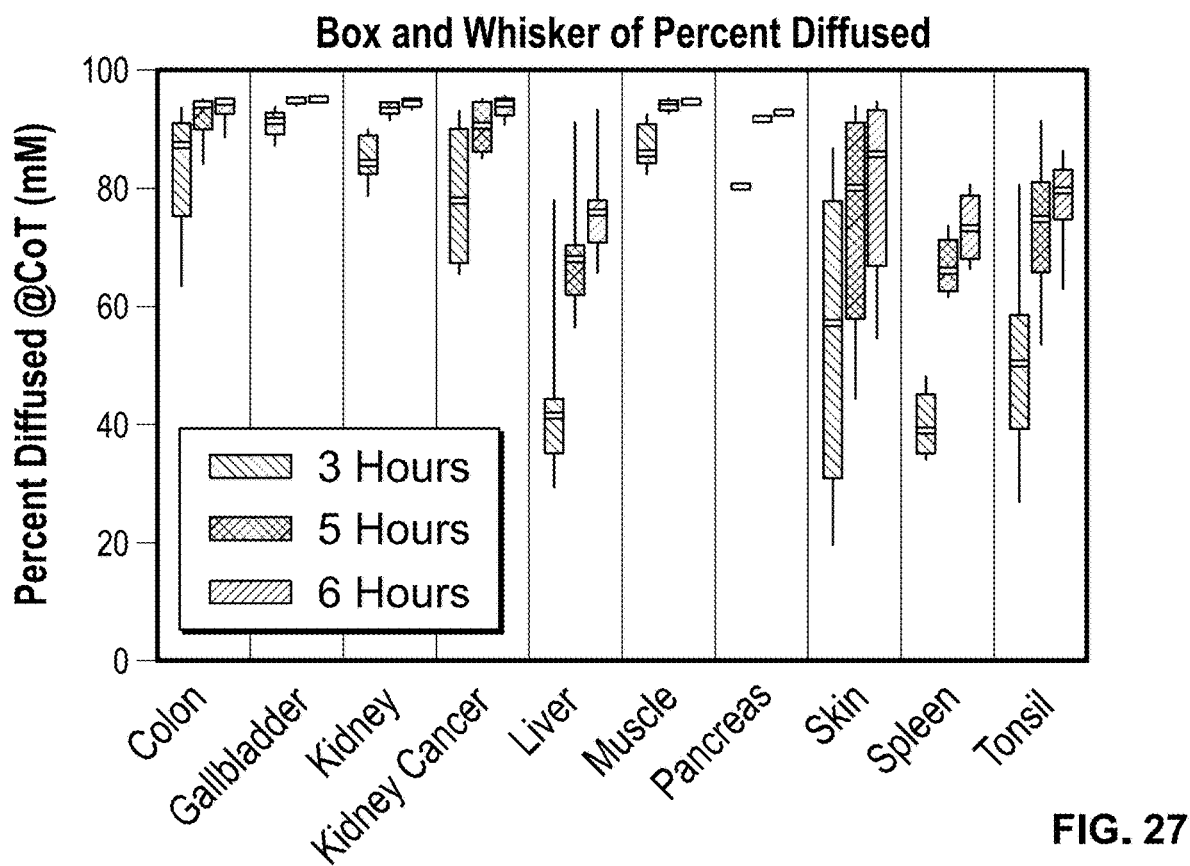
FIG. 27 shows a set of box and whisker distributions of percent diffusion at the tissue sample center at about 3, about 5 and about 6 hours for several tissue types.
Figure 28:
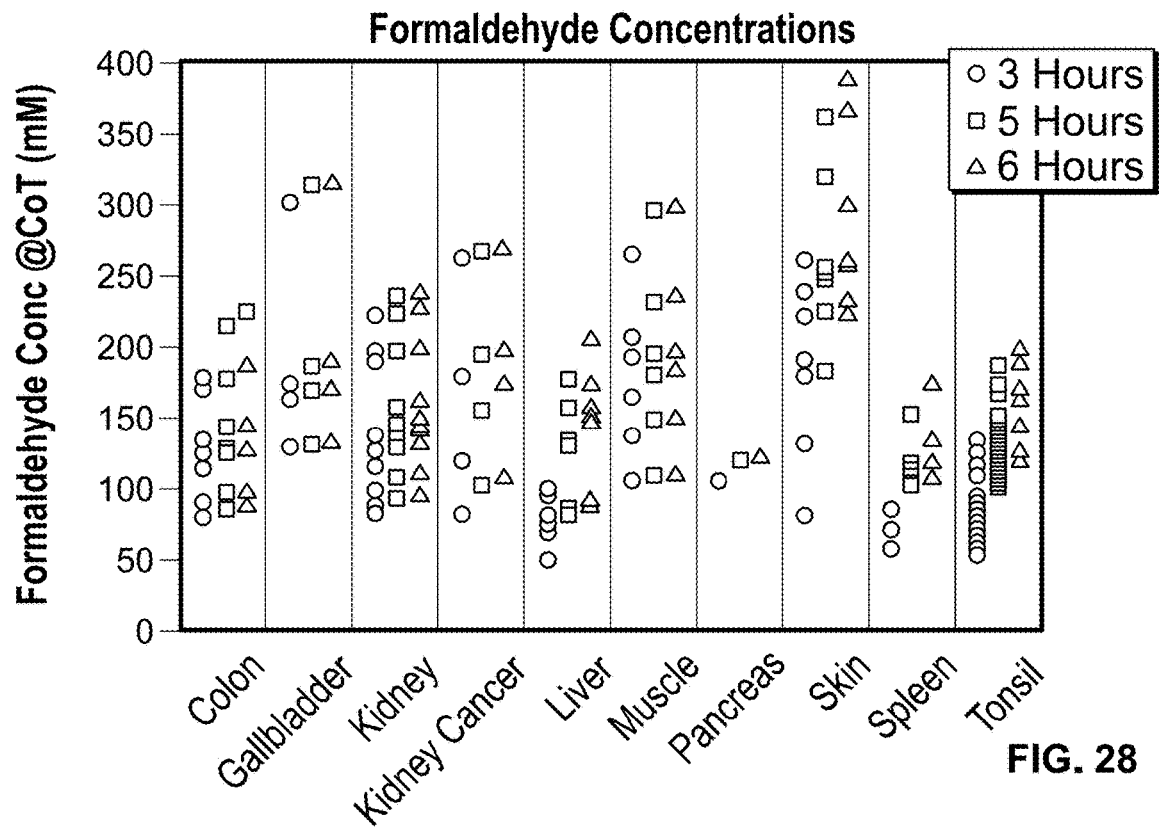
FIG. 28 shows the distributions of raw formaldehyde concentrations at the tissue sample center at 3, 5 and 6 hours for several tissue types.
Figure 29:
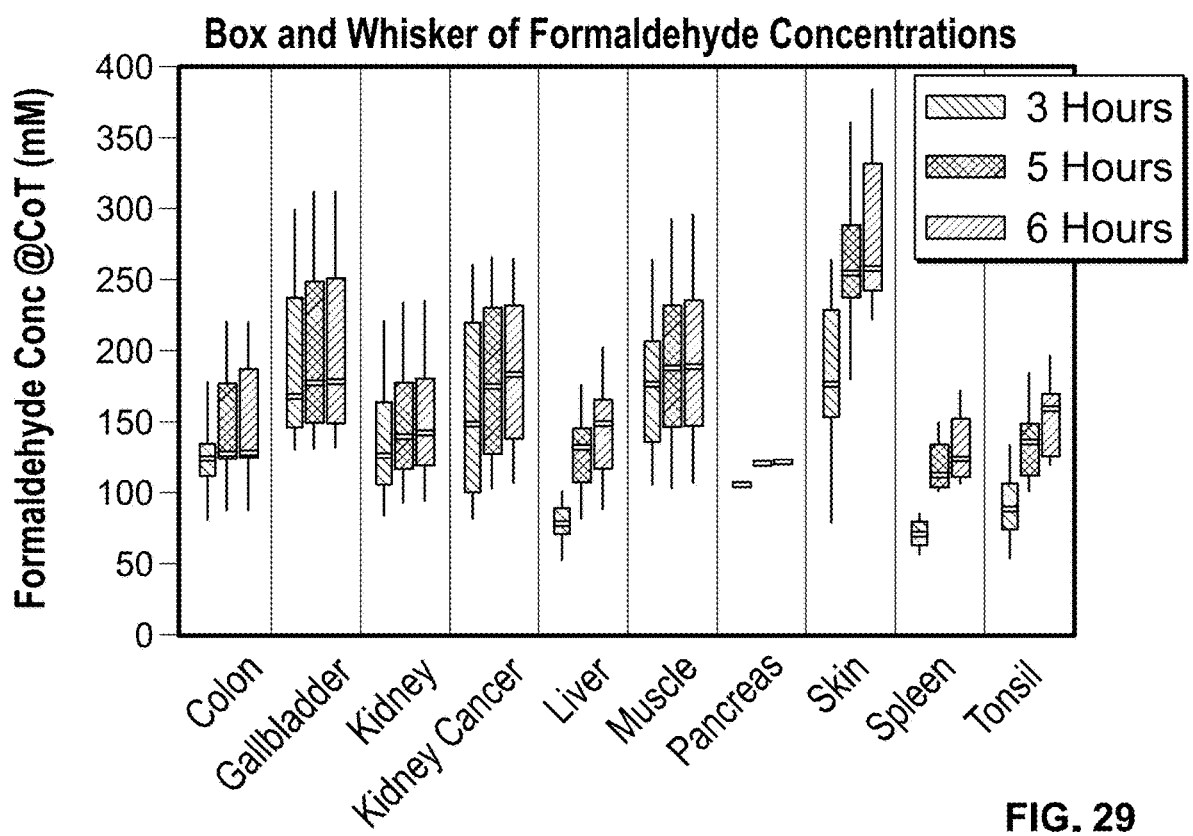
FIG. 29 shows a set of box and whisker distributions of formaldehyde concentration at the tissue sample center at about 3, about 5 and about 6 hours for several tissue types.

FIG. 26 shows the distributions of raw percent diffusion at the tissue sample center at about 3, about 5 and about 6 hours determined for the several tissue types, and FIG. 27 shows a set of box and whisker distributions of percent diffusion at the tissue sample center at about 3, about 5 and about 6 hours for the several tissue types. FIG. 28 shows the distributions of raw formaldehyde concentration as determined at the tissue sample center at about 3, about 5 and about 6 hours for several tissue types, and FIG. 29 shows a set of box and whisker distributions of formaldehyde concentration at the tissue sample center at about 3, about 5 and about 6 hours for several tissue types. From a comparison of the raw data and box-and-whisker distributions based on measuring percent diffusion and those based on determining reagent concentration at the center of the tissue, it can be seen that the data tend to cluster more tightly when concentration is utilized.

Figure 30:
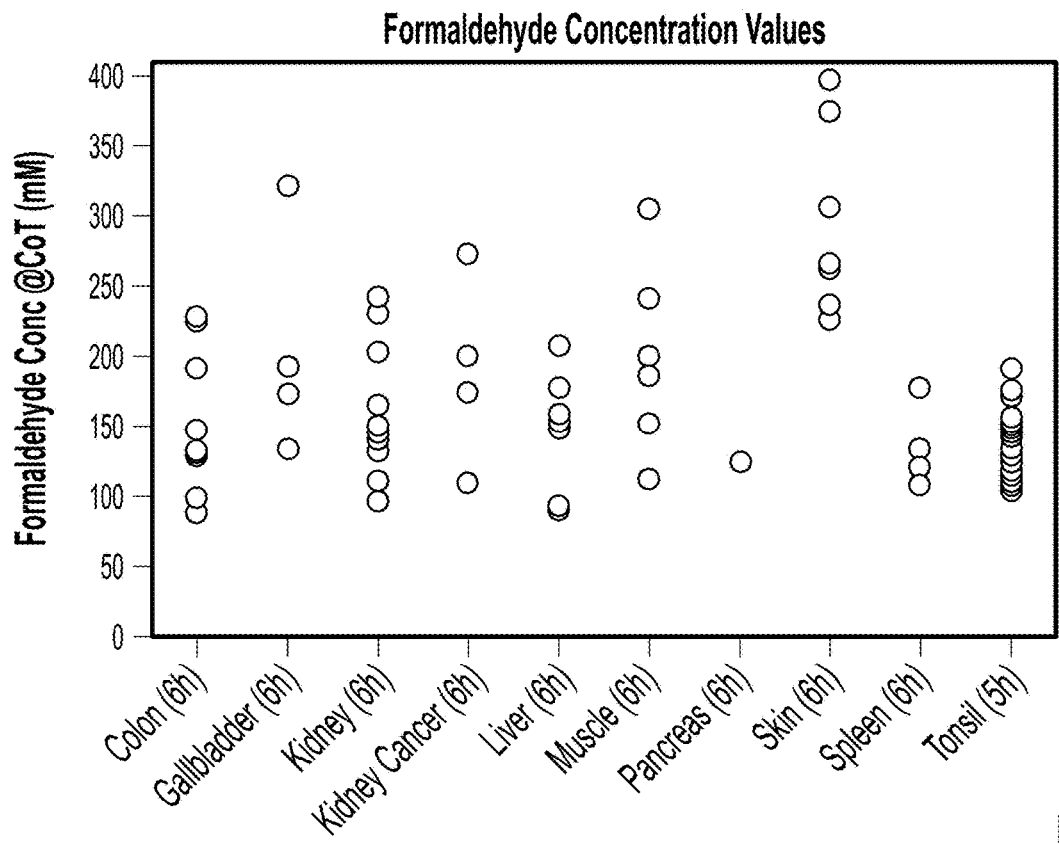
FIG. 30 shows distributions of raw formaldehyde concentrations at the tissue sample center for several tissue types after the indicated immersion times.
Figure 31:
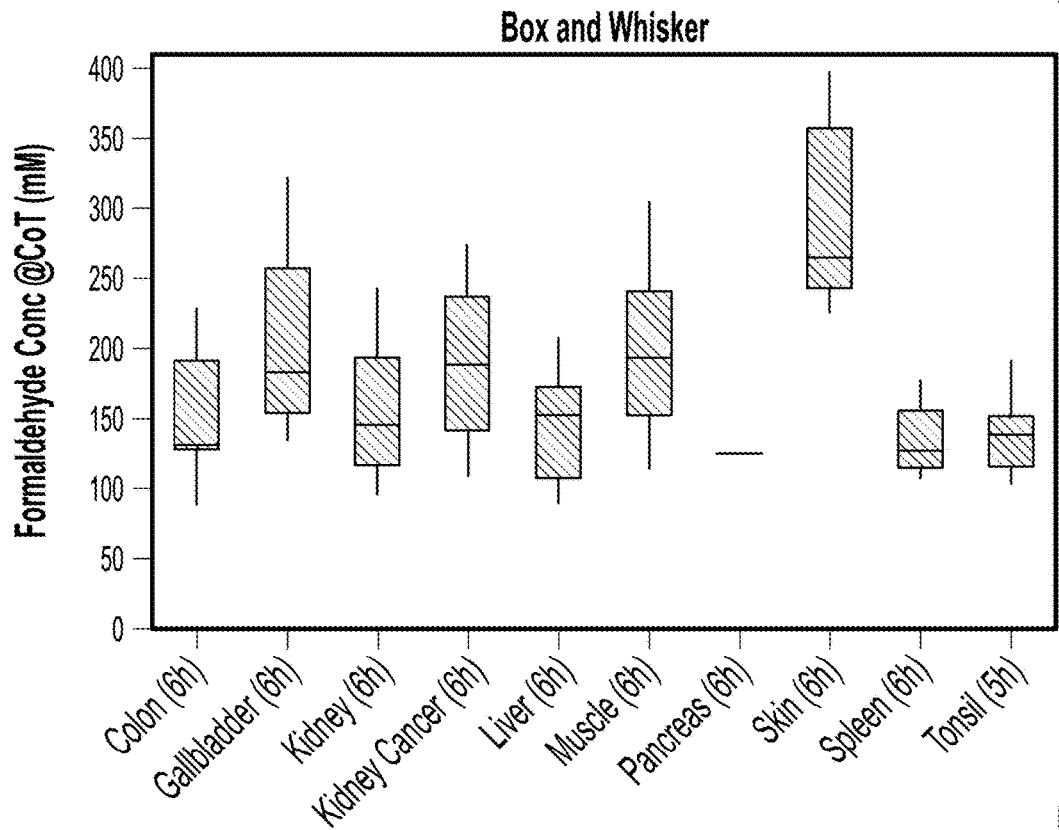
FIG. 31 shows a set of box and whisker distributions of formaldehyde concentration at the tissue sample center for several tissue types after the indicated immersion times.
Figure 32:
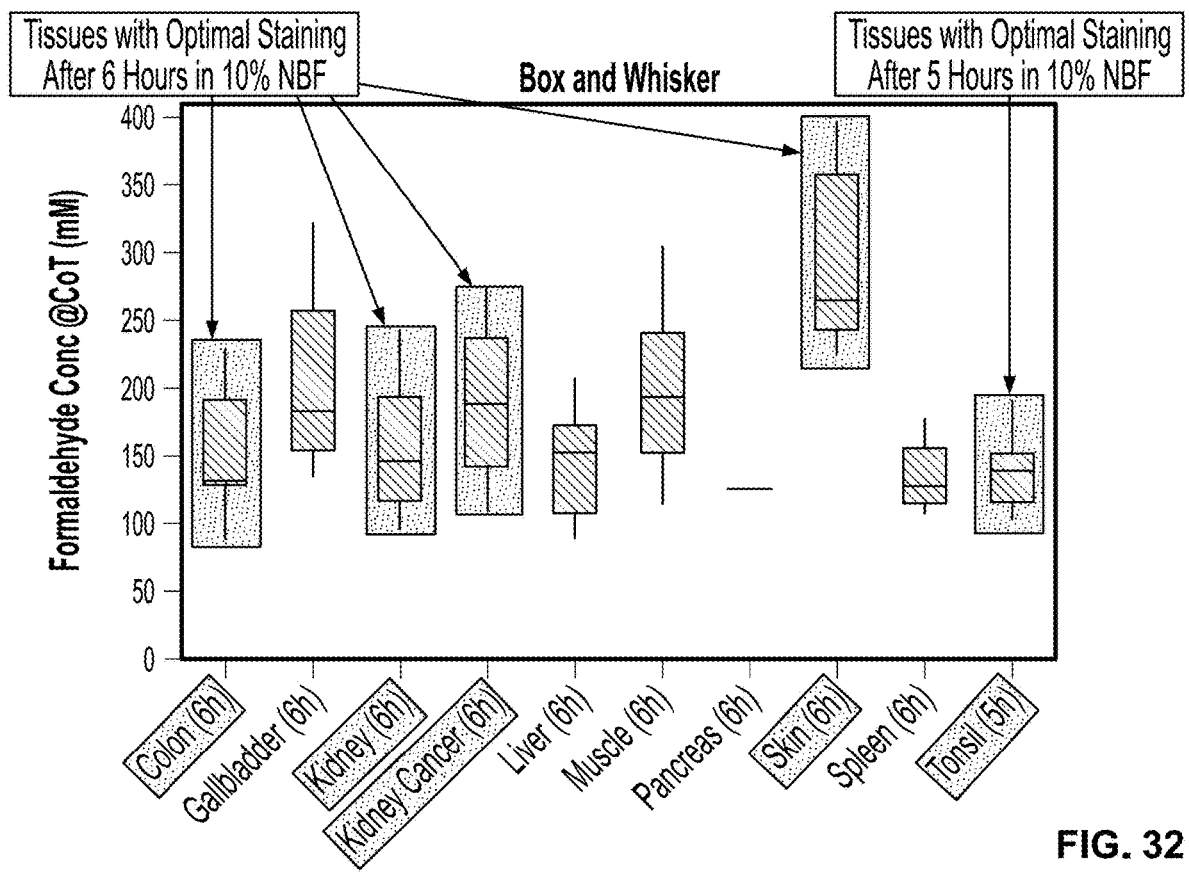
FIG. 32 shows a labeled version of FIG. 31, dividing tissue types that provide optimal staining after either about 5 or about 6 hours of immersion in 10% NBF.

FIG. 30 shows distributions of raw formaldehyde concentrations at the tissue sample center for the several tissue types after the indicated immersion times, and FIG. 31 shows a set of box and whisker distributions of formaldehyde concentrations at the tissue sample center for the several tissue types after the indicated immersion times. These results confirm the correlation of tissue center formaldehyde concentrations above about 90 mM (such as above 100 mM) with "ideal" staining since earlier studies showed that fixation for at least about 6 hours (about 5 hours for tonsil) in a cold step of a cold+hot fixation protocol ensures "ideal" staining. The results were further confirmed through microscopic analysis, with qualified readers determining the tissues indicated in FIG. 32 indeed demonstrated "ideal (optimal)" staining after the indicated times.

Figure 33:
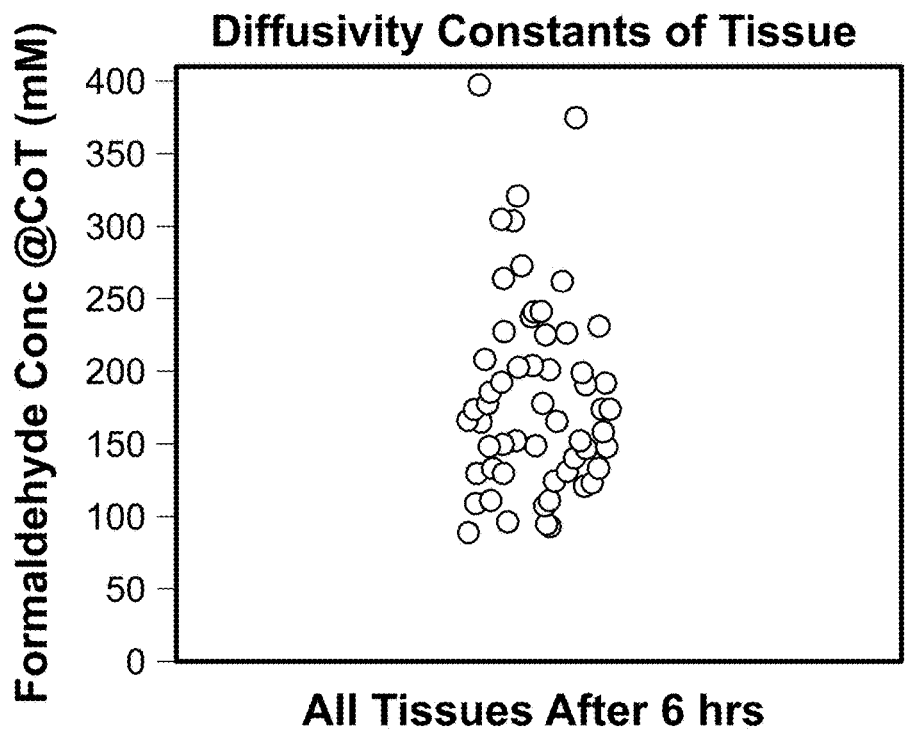
FIG. 33 shows the raw distribution of formaldehyde concentration at the tissue sample center for all tissues after about 6 hours of immersion in 10% NBF.
Figure 34:
FIG. 34 show the box and whisker distribution of formaldehyde concentration at the tissue sample center for all tissues after about 6 hours of immersion in 10% NBF.

FIG. 33 shows the raw distribution of formaldehyde concentration at the tissue sample center across all tissues types after 6 hours of immersion in 10% NBF, and FIG. 34 show the box and whisker distribution of formaldehyde concentration at the tissue sample center for all tissues after 6 hours of immersion in 10% NBF. The 90 mM (or 100 mM) formaldehyde concentration level for achievement of "ideal staining" is confirmed across all tissue types. The difference between calculating formaldehyde concentration at the center of the tissue based on TOF data and simply using a standard fixation time protocol is that while an about 6 hour immersion might not be sufficient to achieve ideal staining for sample larger than about 6 mm in diameter, a time sufficient to achieve at least 90 mM (or 100 mM) formaldehyde at the tissue center will ensure "ideal" staining of the sample. Conversely, smaller samples (e.g. needle core biopsies) that could be potentially be over-fixed using a standard fixation time of about 6 hours can be treated only until the concentration at tissue center reaches at least 9 about 0 mM, thus leading to a shorter overall analysis time.

Figure 35:
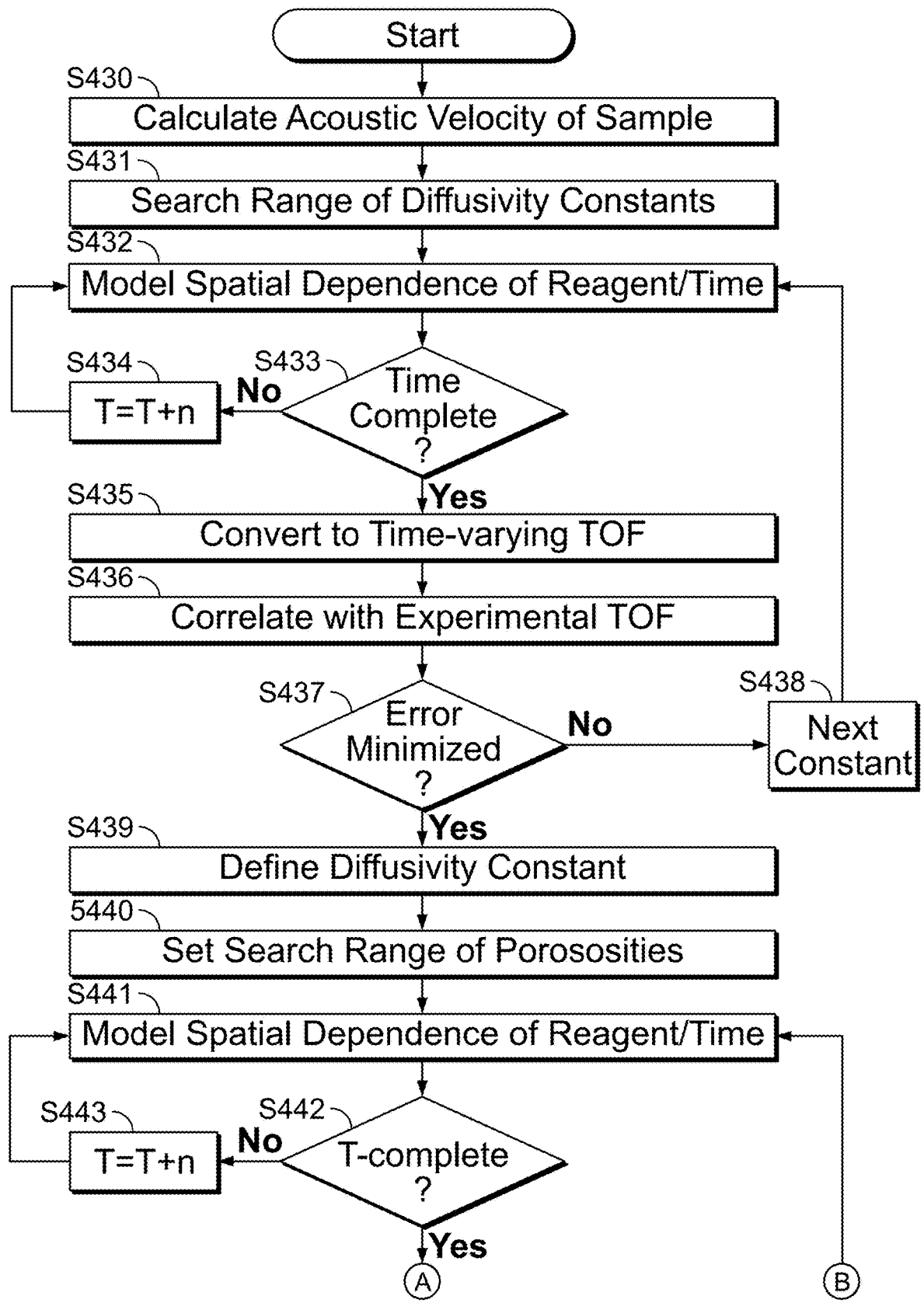
FIG. 35 shows a method for obtaining a diffusivity coefficient, a porosity, and formaldehyde concentration at the tissue sample center according to an exemplary embodiment of the subject disclosure.
Figure 35:
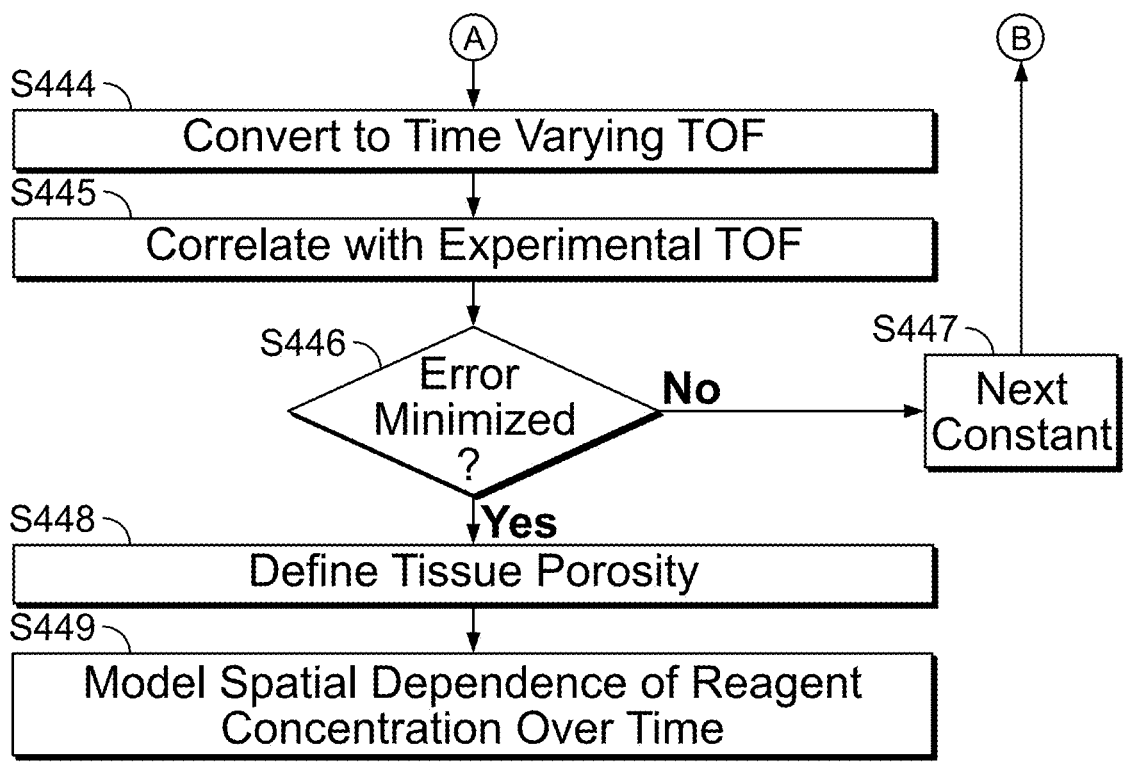

FIG. 35 shows an embodiment of the disclosed method for obtaining a diffusivity coefficient, a porosity, and formaldehyde concentration at the tissue sample center. At S430 the acoustic velocity of the sample is measured as was previously described in the context of FIG. 3. Also like the embodiment of FIG. 3, operations and decisions S431, S432, S433, S434, S435, S436, S437 and S438 are performed to define the diffusivity constant. Once the diffusivity constant is determined at S439, a range of porosities that are used to model the diffusion of the reagent solution into the sample is set at S440. The range can be set by default or entered by a user. For example, based on the experimentally determined porosity values discussed above in regard to FIG. 22, to a range of 0.05 to 0.50 (or a narrower) should cover most, if not all, tissue types. A narrower range can be set when the tissue type has been examined prior, and for example, the user can enter the tissue type to provide an appropriate range of values for the model to explore. At S441, S442 and S443, the diffusivity constant from S439 and a candidate porosity set at S440, are used to model the spatial dependence of the reagent over a series of time points T to T+n. The model built over the series of time points is then used to generate an expected TOF curve at S444 and correlated with the experimental TOF curve at S445. At S446, the error between the expected and experimental TOF curves is checked to see if it is at a minimum, and if so, the candidate tissue porosity is determined at S448 to be the actual tissue porosity. If not, the process is repeated with a second candidate porosity at S447. Once both the diffusivity constant (S439) and the porosity (S448) are defined, a spatial model of reagent concentration across time can be generated at S449. Once the spatial model of reagent concentration over time is established, the concentration at a particular point within the sample at a particular time, such as at sample center, can be extracted from the model.

In a second set of experiments, the applicability of TOF measurements for monitoring the tissue sample preparation workflow after the sample is fixed was examined. Tissue samples were obtained as de-identified materials. Samples were collected fresh from surgical excisions as well as from autopsy material when fresh surgical material was difficult to obtain. All specimens were either cored with a 6 mm punch or cut to be roughly 6 mm in maximum thickness. In practice, due to the gelatinous nature of tissue, samples 4-7 mm thick were included in the study, although the majority of samples (85%) were estimated to be 6 mm thick. Overall, 250 total tissues were collected from 8 different organs including normal and cancerous breast, normal and cancerous colon, normal and cancerous kidney, normal and cancerous lung, liver, adipose, skin, and tonsil. Not all tissues were monitored in each reagent because the study initially started with NBF, then added monitoring of 3× ethanol dehydration, and lastly added in monitoring of xylene clearing. Data could not be collected if the tissue slipped, a reagent erroneously evaporated, or the TOF instrument had an error so not all reagents were monitored successfully for all tissues. Overall, 170, 113, 123, 98, and 31 tissue samples were monitored in NBF, 70% ethanol, 90% ethanol, 100% ethanol, and xylene, respectively.

As described earlier, a commercial dip and dunk tissue processor (Lynx II, Electron Microscopy Sciences) was retrofit with acoustic monitoring technology. A custom developed digital acoustic interferometry algorithm described elsewhere was used to detect the small acoustic phase retardation resulting from fluid exchange within the tissue with sub-nanosecond precision (25). Pairs of 4 MHz focused transducers were spatially aligned and a tissue sample was placed near their common foci. The transmitting transducer was programmed to send out a sinusoidal pulse that was detected by the receiving transducer after traversing the reagent and tissue and the received pulse was used to calculate the transit time. Tissue was held in mesh biopsy cassettes (CellSafe 5 Biopsy Cassette, CellPath USA) to measure multiple samples at one time, see FIG. 1$d$. The cassette holder was mechanically translated so that diffusion throughout the tissue sample could be monitored with a spatial resolution of 1 mm. A baseline TOF value was acquired by measuring the TOF through only the reagent and this reference value was subtracted from the TOF with the tissue present to isolate the phase retardation from the tissue and to compensate for environmentally-induced fluctuations in the reagent.

Figure 36A:
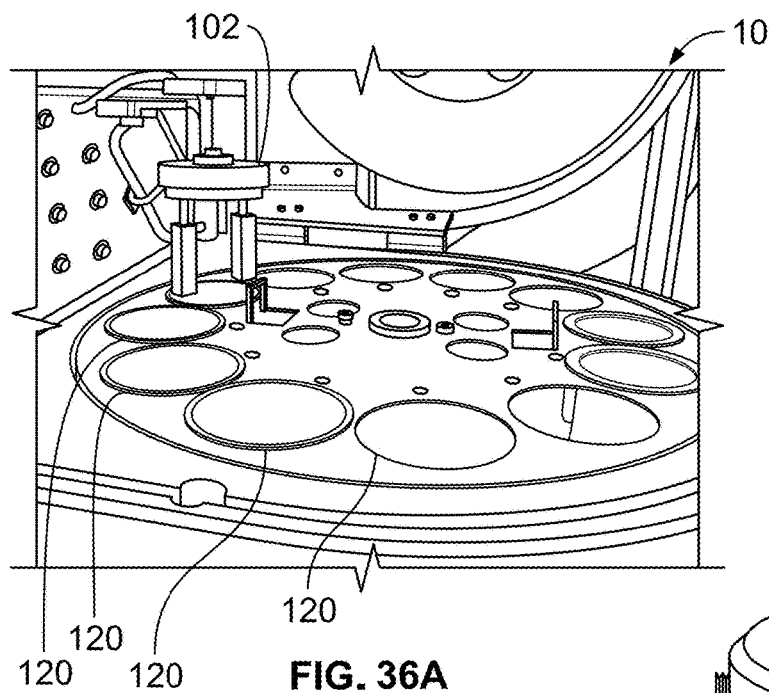
FIG. 36A shows a perspective schematic of a TOF-enabled tissue processing system.

FIG. 36A shows a perspective schematic of an embodiment of a TOF-enabled tissue processing system 100 that includes an acoustic monitoring device 102 and several chambers 120 that include baths for holding the processing chemicals, between which the acoustic monitoring device 102 can be moved, along with a sample, for execution of a tissue processing protocol. In other embodiments, the acoustic monitoring device can be integrated into the walls of a particular bath and samples are moved in and out of the TOF bath and other baths according to a tissue processing protocol. In a particular embodiment, the TOF enabled bath is a 70% EtOH bath, which advantageously permits automatic setting of subsequent processing steps based on TOF behavior of the tissue in 70% ethanol. As used herein, "bath" refers to any enclosure in which a tissue processing step is performed. It will be recognized by those skilled in the art that there are many different designs of tissue processors that could be retrofitted or otherwise re-engineered to include TOF measurement capacities in one or more baths. It is also contemplated that data derived from a TOF-enabled tissue processing system can be used to develop look up tables for an automated system that allows a user to program a tissue processing protocol for a particular type and size of tissue, or groups of particular types and sizes of tissue that share similar processing requirements. The system could also provide a user will guidance similar tissue types that could be included with a particular selected protocol. For example, the user might select a first sample of a particular tissue type and size and then be presented with a list of other appropriate samples for batching with the first sample. In this way, only samples that need similar processing times can proceed through processing at the same pace, which may increase overall lab workflow efficiency.

Figure 36B:
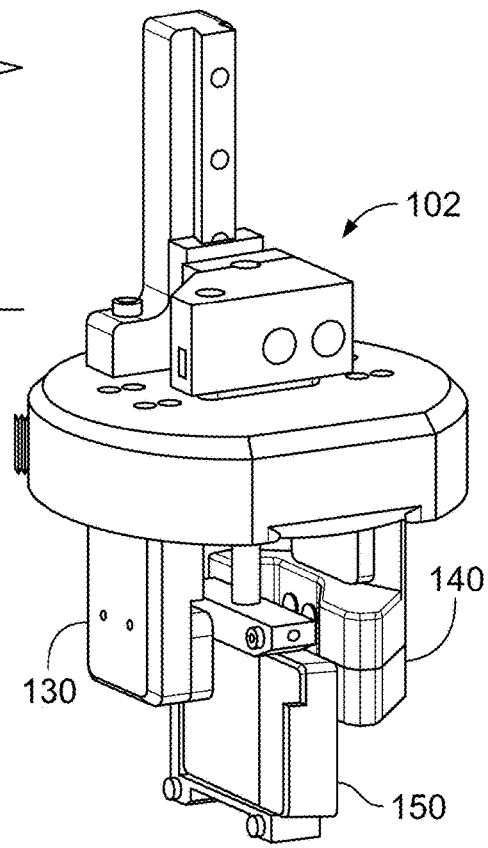
FIG. 36B shows a perspective schematic of the acoustic monitoring device of FIG. 36A.
Figure 36C:
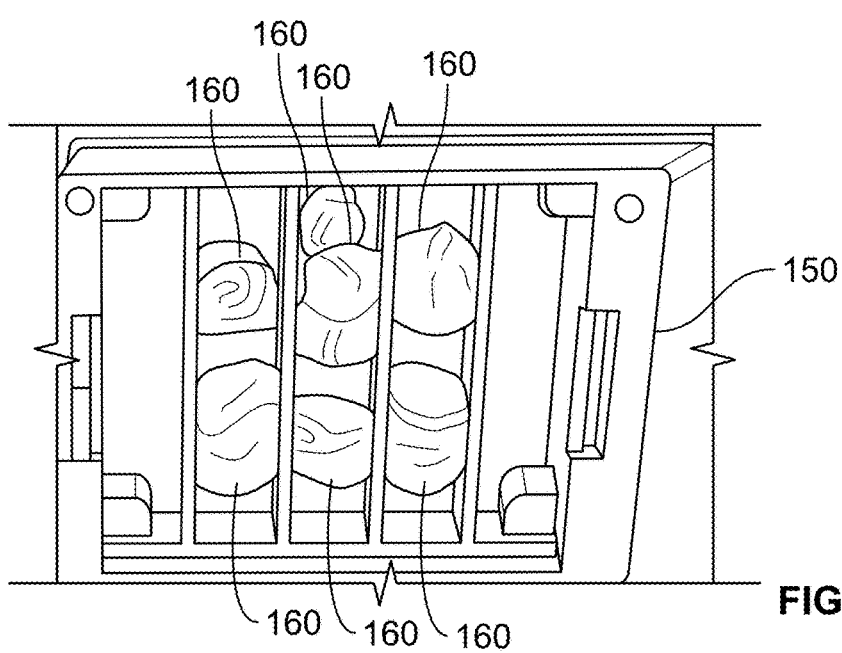
FIG. 36C shows a tissue processing cassette holding several pieces of tissue.

FIG. 36B shows a perspective schematic of an exemplary acoustic monitoring device 102. A tissue cassette 150 is movably held in the monitoring device between an ultrasound transmitter 130 and an ultrasound receiver 140. FIG. 36C shows a tissue processing cassette 150 holding several pieces of tissue 160. Relative motion between the ultrasound transmitter 130 and receiver 140 pair and the cassette 150 make it possible to measure TOF in different parts of a single tissue sample or to measure TOF signals for different pieces of tissue in the same cassette.

Figure 36D:
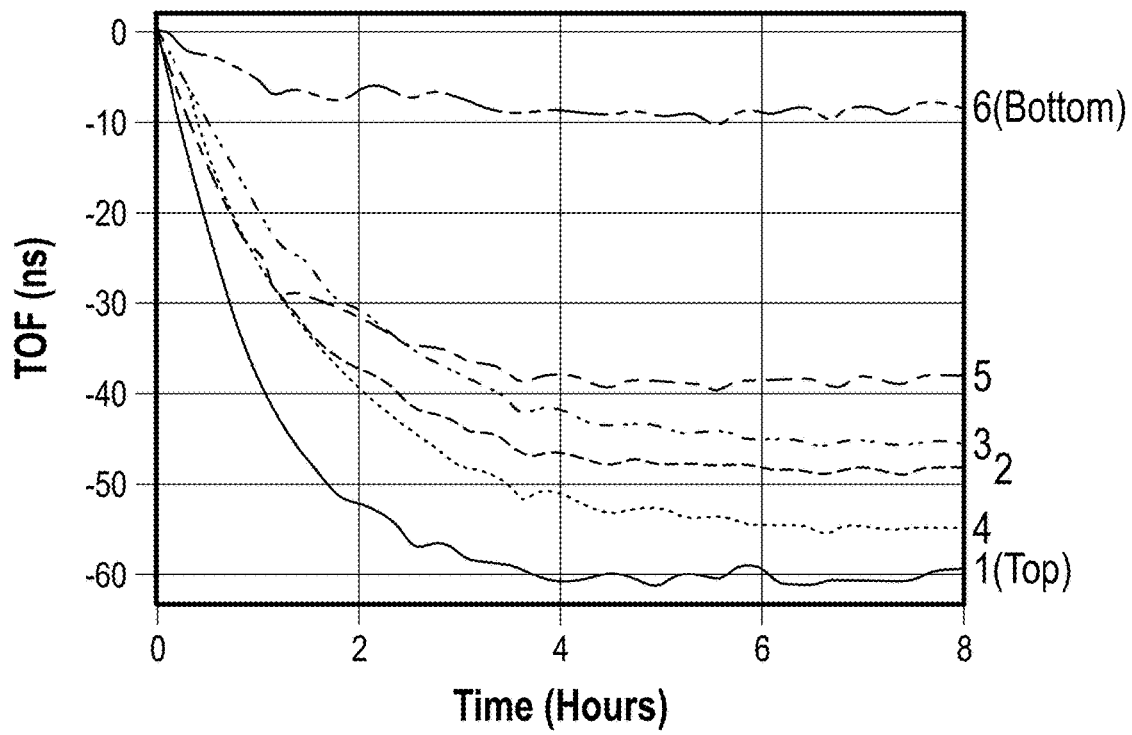
FIG. 36D shows several TOF traces obtained for a single piece of tissue, collected by moving the sample relative to transmitter and receiver portions of the acoustic monitoring device.
Figure 36E:
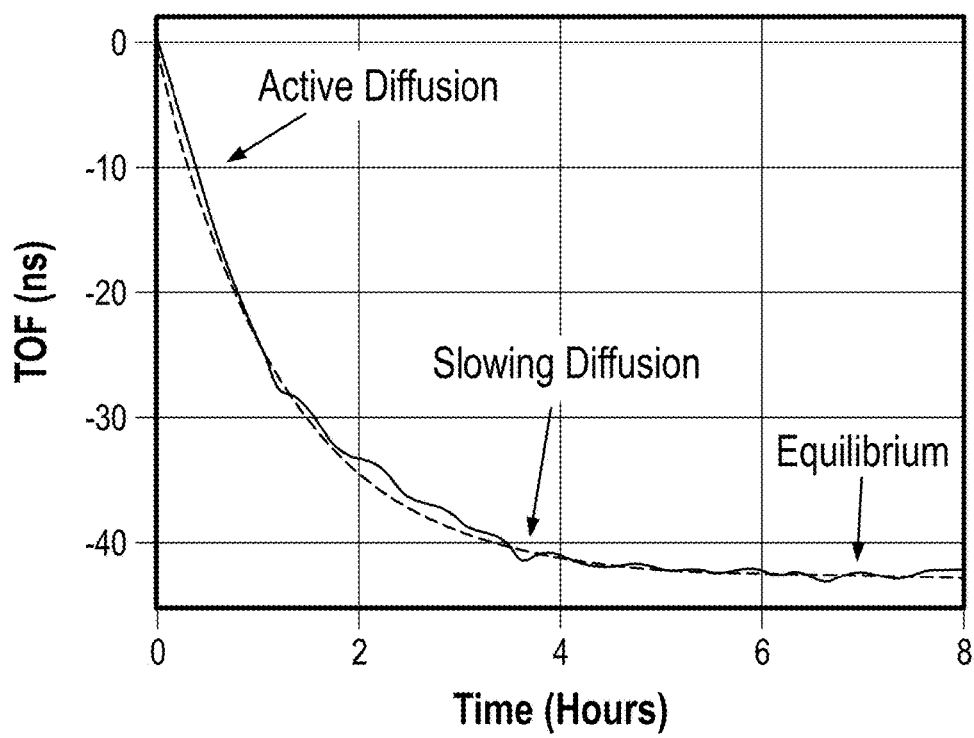
FIG. 36E shows a spatially averaged TOF signal (solid line) observed for a sample and its exponential curve fit (dashed line).

For example, FIG. 36D shows several TOF traces obtained for a single piece of tissue immersed in 10% NBF, collected by moving the sample relative to transmitter and receiver portions of the acoustic monitoring device. Individual TOF signals were filtered with a low-order median filter and a 3rd order Butterworth filter to reduce noise. To get a representative metric of the rate of fluid exchange all individual TOF signals were averaged together to produce a single TOF curve representing the average rate of diffusion of the entire specimen FIG. 36E shows a spatially averaged TOF signal (solid line) observed for single piece of tissue and its exponential curve fit (dashed line). Passive formalin diffusion into tissue gradually increases the sound velocity of the sample because the speed of sound is faster in formalin than the exchangeable fluid within the tissue. This increase in velocity results in progressively decreasing acoustic transit times through the tissue. Consistent with expectations from Fick's Law, the sample initially experiences rapid exchange from the large concentration gradient and gradually trends toward no fluid exchange as diffusive equilibrium is achieved (see FIG. 36E). This approach also mitigates the effects of substantial spatial heterogeneity within the tissue. Finally, in practice the TOF change during cold formalin diffusion was well correlated with a single-exponential decay so average diffusion curves were fit to a single exponential function using non-linear regression. Although the acoustic properties of tissue could change for a variety of reasons during tissue processing such as tissue shrinking, distortion, or becoming less compressible it has been previously shown that the TOF signal is predominately, if not completely, due to diffusion of fluids into and out of the tissue.

In some embodiments, a custom tissue processing protocol was used to establish proof of concept that our TOF monitoring technology can detected changes in the tissue resulting from the diffusion of the processing reagents. Instead of subjecting tissues to a single reagent multiple times, a custom protocol in accordance with the present disclosure subjects tissues to each reagent once for a prolonged amount of time to enable detection of a continuous signal related the diffusion rate of each particular reagent. In sequential order, TOF monitoring was used for each tissue sample in cold 10% NBF, 70% ethanol, 90% ethanol, 100% ethanol, and absolute xylene. Times and temperatures for all reagents in the custom TOF protocol are displayed below in Table 1. Tissues were fixed in formalin using a two temperature fixation method in which the tissue is initially placed in cold NBF enabling unrestricted diffusion of formaldehyde before being moved to heated NBF to quickly initiate crosslinking. No TOF signal is reported in the heated NBF because the tissue was already at diffusive equilibrium with the bulk reagent so no diffusion occurred. The TOF technology was not used to monitor paraffin embedding for practical considerations such as the wax encasing the ultrasound transducers, although in principle this approach could detect the progress of paraffin embedding based on the differential sound velocities of xylene and paraffin.

TABLE 1

| Step | Time (hours) | Temp (C) | $C_s$ (m/s) | $\Delta C_s$ (m/s) |
| --- | --- | --- | --- | --- |
| Sample Procured | — | 20 | varies | — |
| 10% NBF | 10 | 6 | 1460 | varies |
| 10% NBF | 2 | 45 | 1460 | 0 |
| 70% EtOH | 6 | 20 | 1245 | −305 |
| 90% EtOH | 6 | 20 | 1178 | −67 |
| 100% EtOH | 6 | 20 | 1144 | −34 |
| Xylene | ≥6 | 20 | 1330 | +186 |
| Paraffin | ≥1 | 65 | 1300 | −30 |

Table 1 shows the fixation and tissue processing steps for custom TOF protocol used to study the rate of diffusion of formalin, about 70% ethanol, about 90% ethanol, about 100% ethanol, and absolute xylene. $c_s$ is the speed of sound and $\Delta c_s$ is the speed of sound differential between two subsequent reagents. Sound velocities referenced from various sources (25-27), about 70% and about 90% sound velocities were calculated as a linear combination of water and absolute ethanol.

Figure 37A:
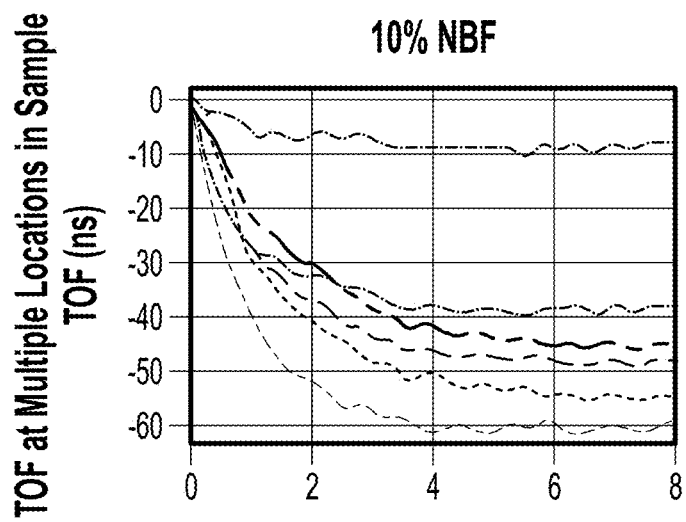
FIGS. 37A and 37B show raw (FIG. 37A) and spatially averaged (FIG. 37B) TOF signals for an about 6 mm kidney sample immersed in 10% NBF.
Figure 37B:
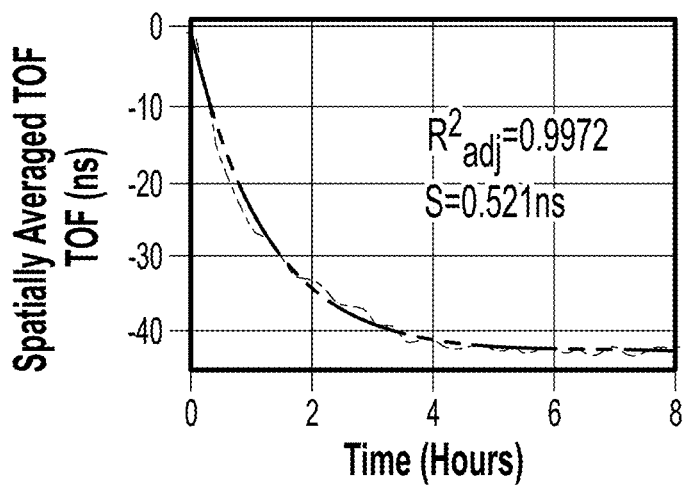
Figure 37C:
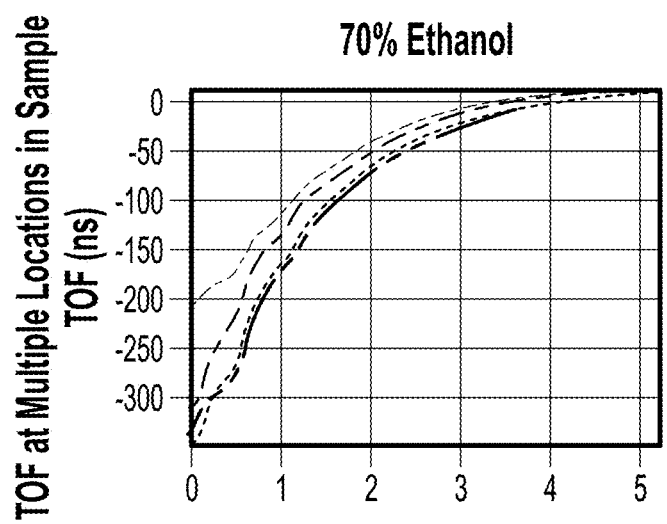
FIGS. 37C and 37D show raw (FIG. 37C) and spatially averaged (FIG. 37D) TOF signals for an about 6 mm kidney sample immersed in 70% EtOH.
Figure 37D:
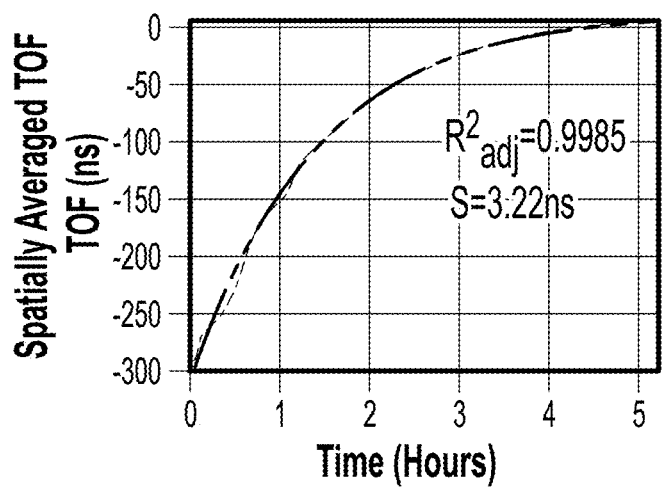
Figure 37E:
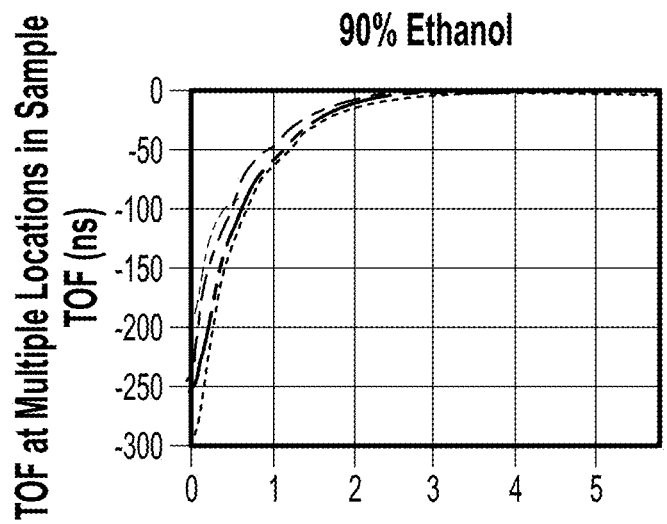
FIGS. 37E and 37F show raw (FIG. 37E) and spatially averaged (FIG. 37F) TOF signals for a 6 mm kidney sample immersed in 90% EtOH.
Figure 37F:
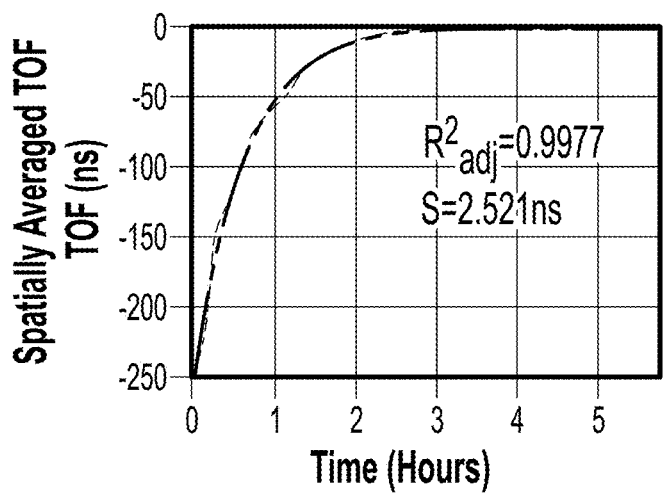
Figure 37G:
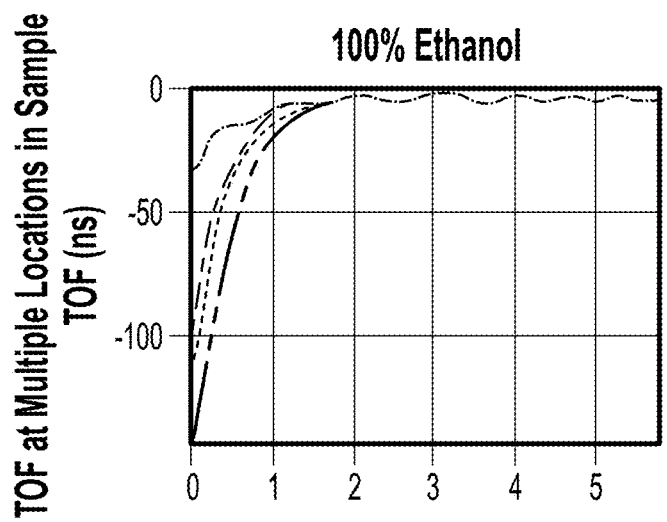
FIGS. 37G and 37H shows raw (FIG. 37G) and spatially averaged (FIG. 37H) TOF signals for an about 6 mm kidney sample immersed in 100% EtOH.
Figure 37H:
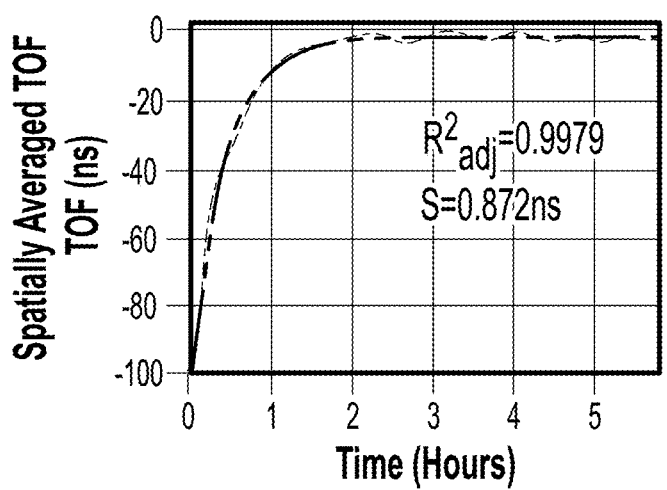
Figure 37I:
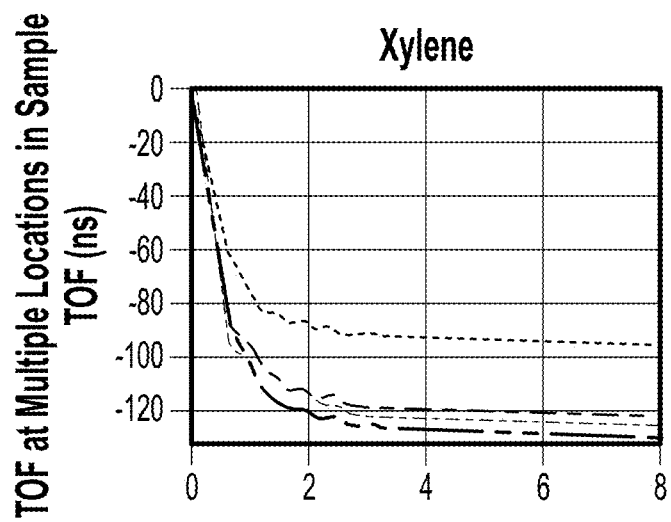
FIGS. 37I and 37J shows raw (FIG. 37I) and spatially averaged (FIG. 37J) TOF signals for an about 6 mm kidney sample immersed in Xylene.
Figure 37J:
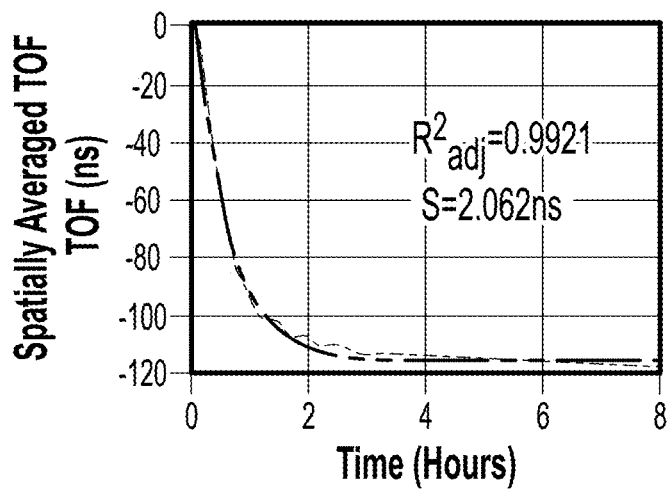
Figure 37K:
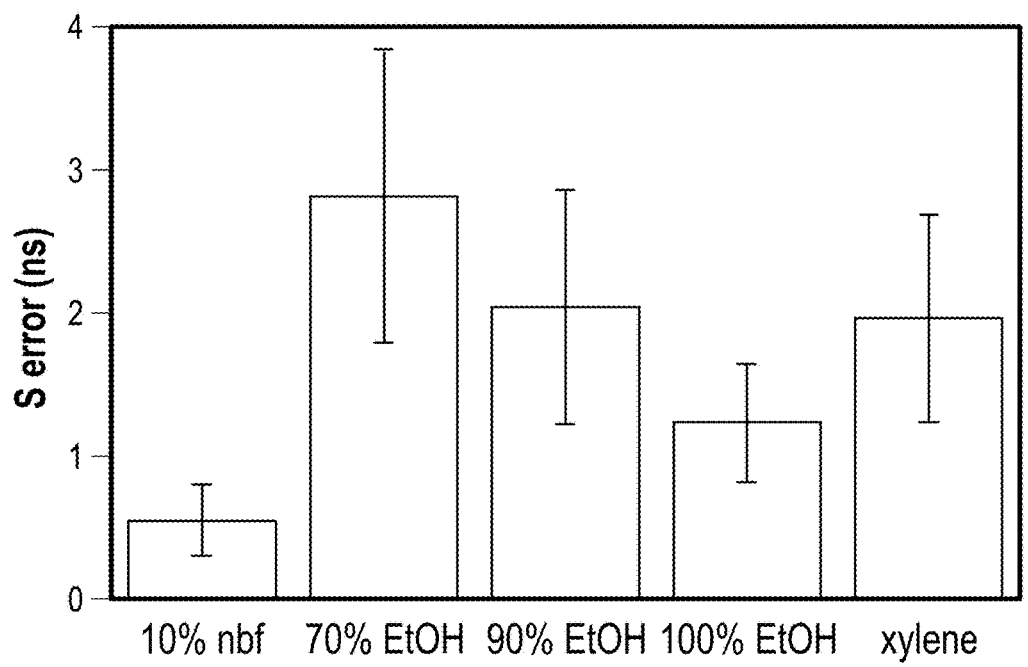
FIG. 37K shows the signal error averaged across all samples monitored in each of the processing solutions as shown on the x-axis.
Figure 37L:
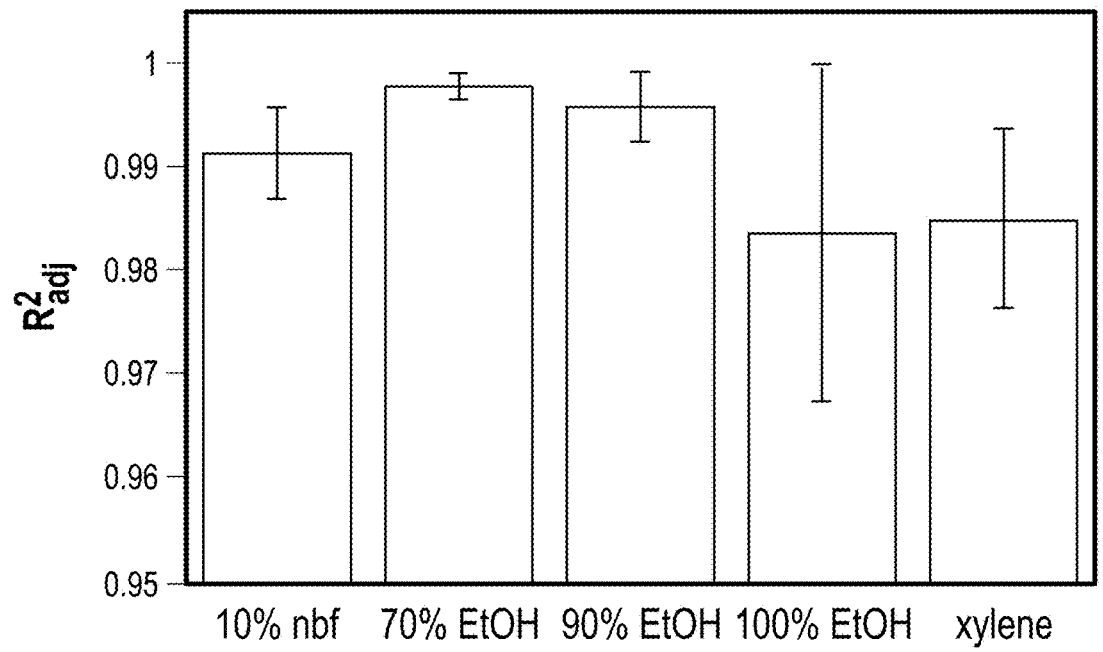
FIG. 37L shows the R-squared averaged across all samples monitored in each of the processing solutions as shown on the x-axis.
Figure 37M:
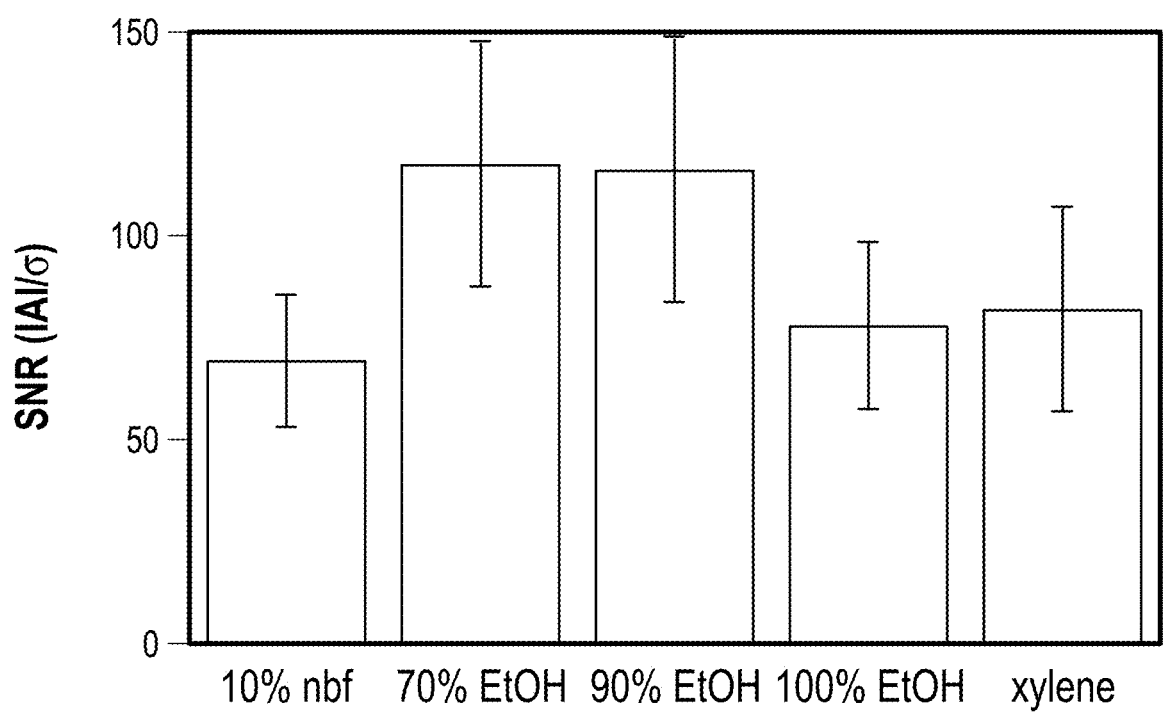
FIG. 37M shows the signal-to-noise ratio averaged across all samples monitored in each of the processing solutions as shown on the x-axis.

The TOF system was used to study the rate of fluid exchange from multiple reagents into several different types of tissue using a custom tissue processing protocol. Example TOF curves from small regions throughout a kidney sample are displayed for all five reagents that were monitored are displayed in FIGS. 37A, 37B, 37C, 37D and 37E, both raw (top panel) and spatially averaged (bottom panel) TOF signals. As the sample was moved to higher concentrations of ethanol, the TOF through the tissue continuously increased (i.e. slows down), as would be expected because ultrasound travels slower in ethanol than in formalin. The flip in polarity of the TOF with respect to NBF diffusion and the decreasing amplitude of the ethanol signal were both consistent with expectations from the sound velocities of these reagents. Finally, when the sample was moved from absolute ethanol to absolute xylene the TOF decreased because the sound velocity is larger in absolute xylene than absolute ethanol. In agreement with our previous findings in NBF, the TOF diffusion based signal from about 70% ethanol, about 90% ethanol, about 100% ethanol, and absolute xylene are all well-correlated with a single exponential function as can be seen in the bottom panels of FIGS. 37A, 37C, 37E, 37F and 37G. The average deviation from each exponential fit (S error) across all tissues and reagents was at most 3.22 ns (see FIG. 37H), and as low as hundreds of picoseconds. Adjusted R2 values from the TOF signals across all tissues and reagents were greater than 0.98 (see FIG. 37I). Signal-to-noise ratio (SNR) across all tissues and reagents is shown in FIG. 37J. Overall, the TOF signal from all tissues and reagents was very well-correlated with a single exponential function as the adjusted R2 typically was greater than 0.98 and the average deviation from fit was only 1-2% of the TOF's amplitude as indicated by the SNR being between 50 and 100 for all reagents. Of note is the high SNR for TOF measurements in about 70% ethanol, which advantageously coincides both with about 70% ethanol being the first reagent used in a typical tissue processing protocol and with the observation as shown below that the diffusion rates (and hence completion times) of subsequent tissue processing protocol steps can be predicted from the TOF measured in 70% ethanol.

Figure 38A:
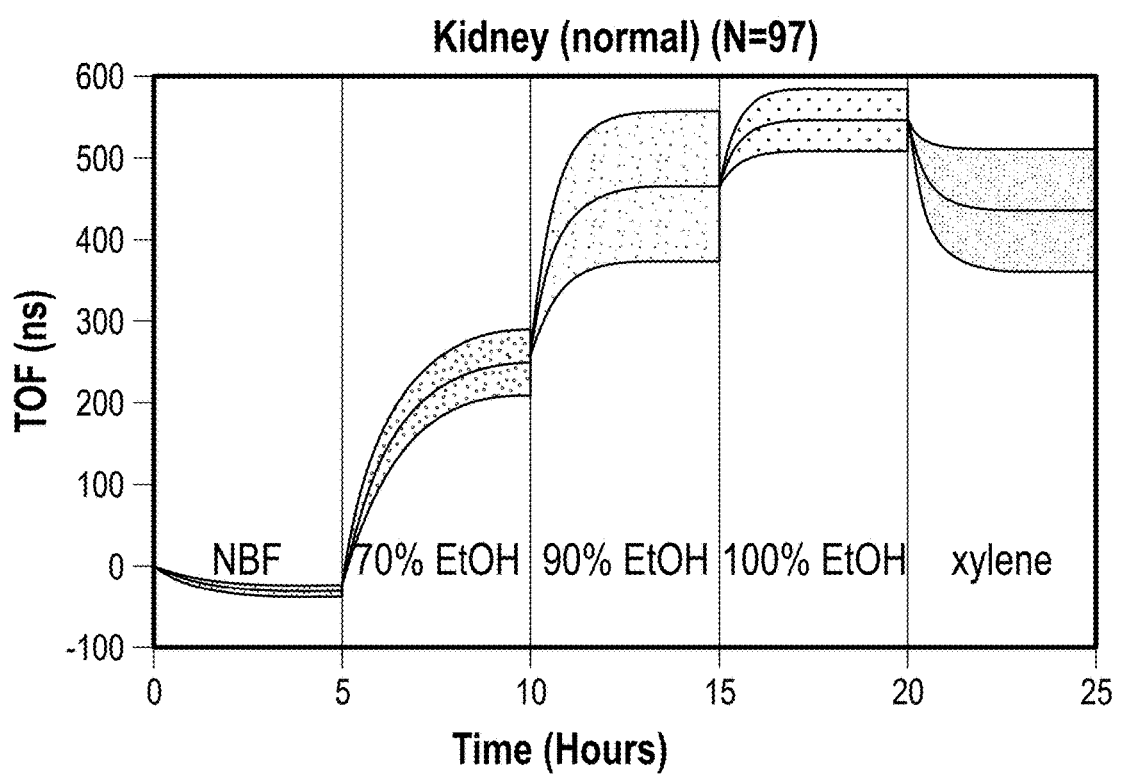
FIG. 38A shows the absolute TOF signals for normal kidney tissue over time in 10% NBF, 70% ethanol, 90% ethanol, 100% ethanol, and 100% xylene. Solid black lines represent average signal and shaded area is σ±σ.
Figure 38B:
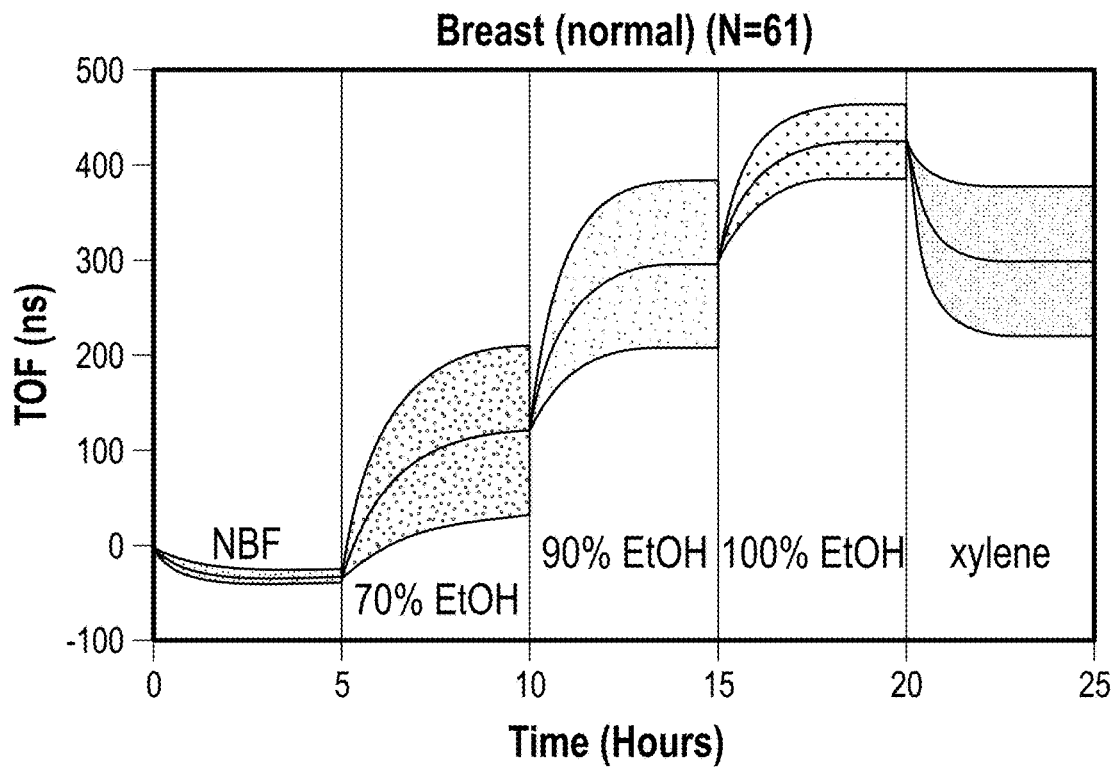
FIG. 38B shows the absolute TOF signals for normal breast tissue over time in 10% NBF, 70% ethanol, 90% ethanol, 100% ethanol, and 100% xylene. Solid black lines represent average signal and shaded area is ±σ.
Figure 38C:
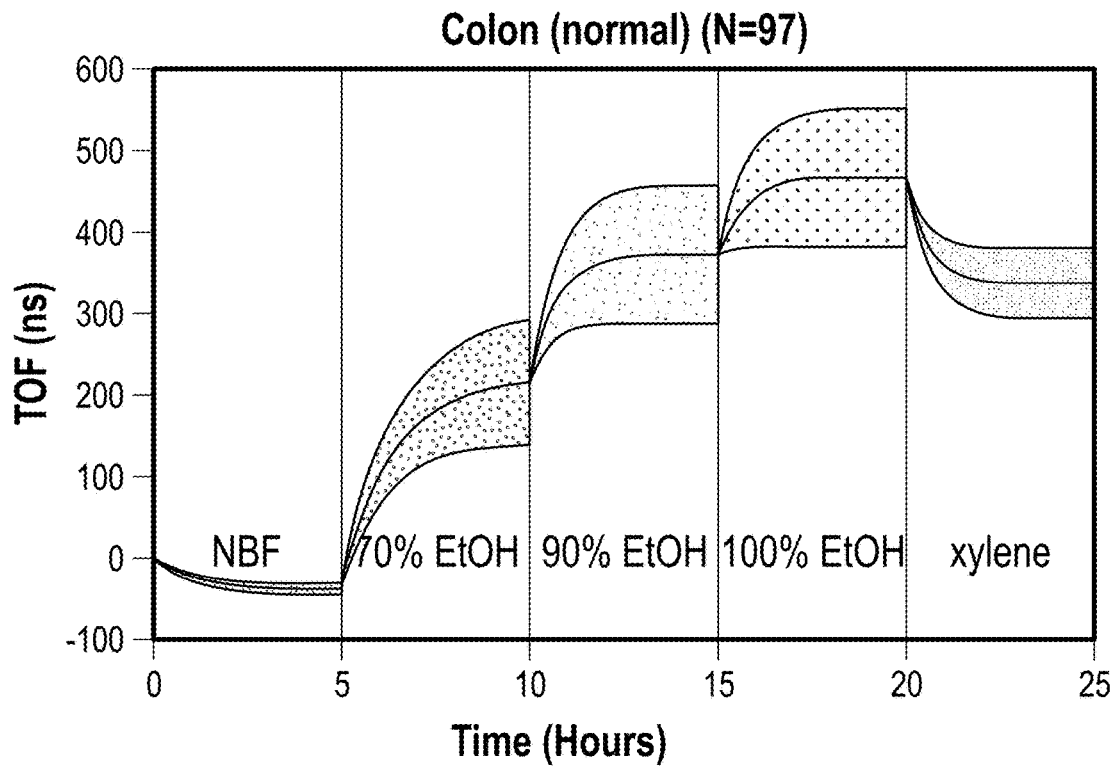
FIG. 38C shows the absolute TOF signals for normal colon tissue over time in 10% NBF, 70% ethanol, 90% ethanol, 100% ethanol, and 100% xylene. Solid black lines represent average signal and shaded area is ±σ.
Figure 38D:
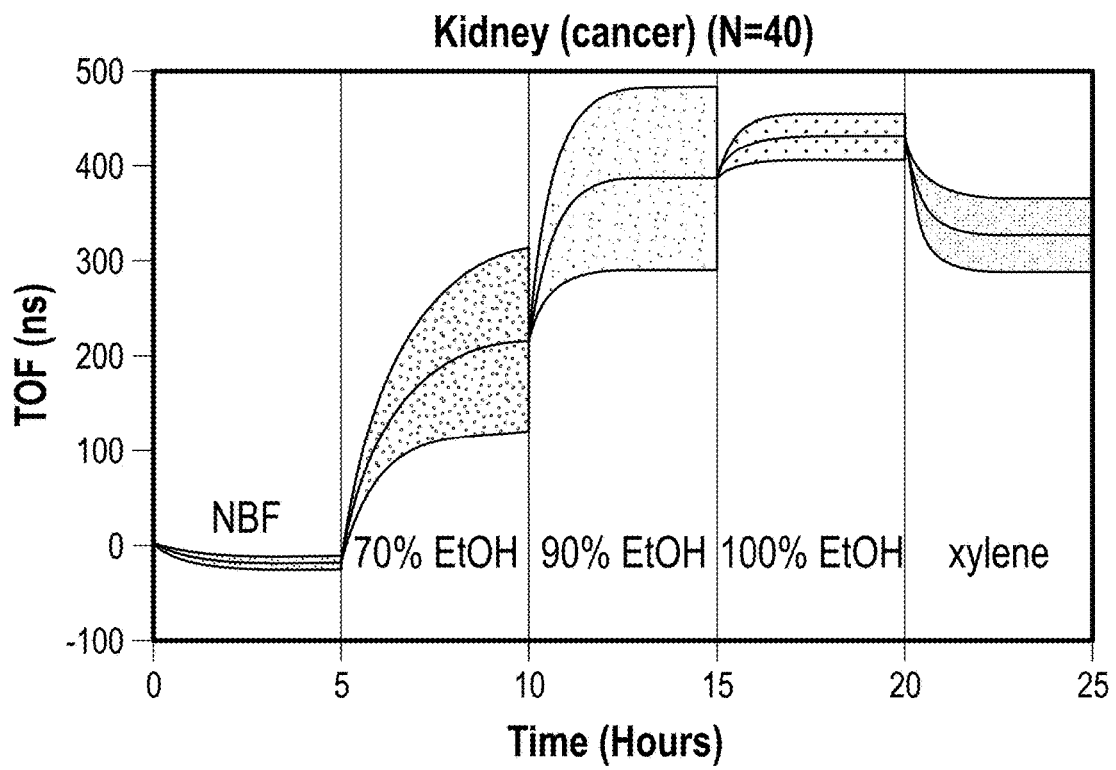
FIG. 38D shows the absolute TOF signals for kidney cancer tissue over time in 10% NBF, 70% ethanol, 90% ethanol, 100% ethanol, and 100% xylene. Solid black lines represent average signal and shaded area is ±σ.
Figure 38E:
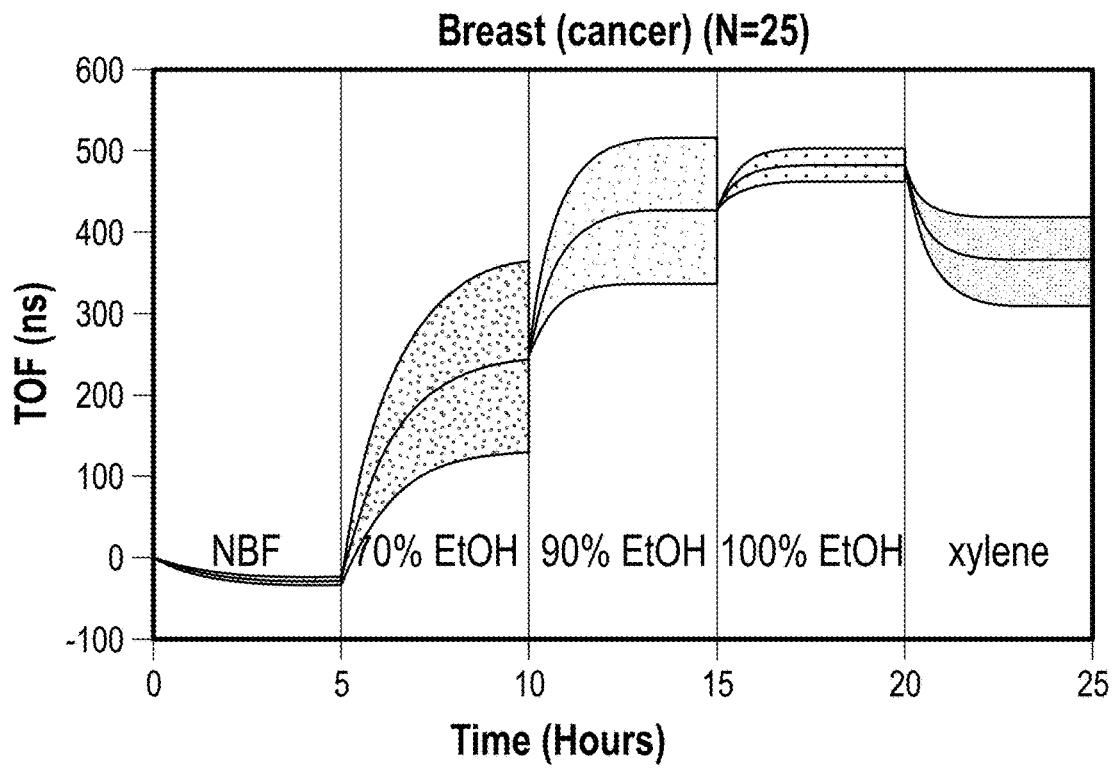
FIG. 38E shows the absolute TOF signals for breast cancer tissue over time in 10% NBF, 70% ethanol, 90% ethanol, 100% ethanol, and 100% xylene. Solid black lines represent average signal and shaded area is ±σ.
Figure 38F:
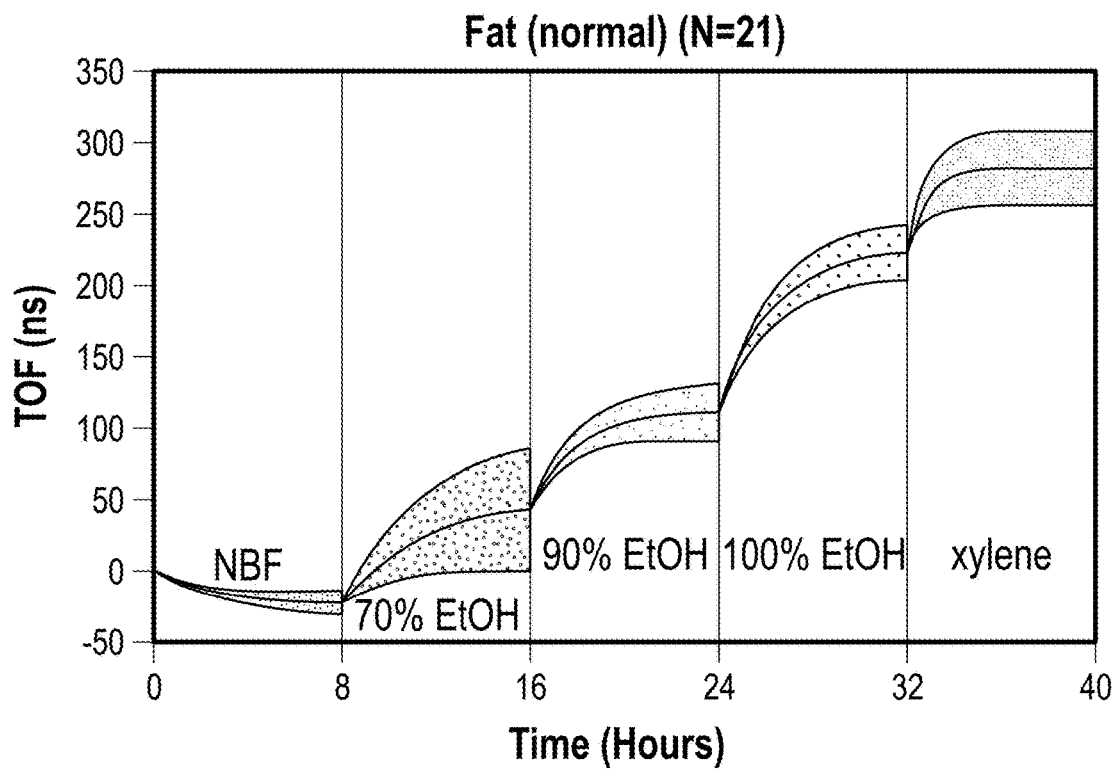
FIG. 38F shows the absolute TOF signals for adipose tissue over time in 10% NBF, 70% ethanol, 90% ethanol, 100% ethanol, and 100% xylene. Solid black lines represent average signal and shaded area is ±σ.

FIG. 38A shows the absolute TOF signals for normal kidney tissue over time in about 10% NBF, about 70% ethanol, about 90% ethanol, about 100% ethanol, and about 100% xylene. Solid black lines represent average signal and shaded area is ±σ. FIG. 38B shows the absolute TOF signals for normal breast tissue over time in about 10% NBF, about 70% ethanol, about 90% ethanol, about 100% ethanol, and about 100% xylene. Solid black lines represent average signal and shaded area is ±σ. FIG. 38C shows the absolute TOF signals for normal colon tissue over time in about 10% NBF, about 70% ethanol, about 90% ethanol, about 100% ethanol, and about 100% xylene. Solid black lines represent average signal and shaded area is ±σ. FIG. 38D shows the absolute TOF signals for kidney cancer tissue over time in about 10% NBF, about 70% ethanol, about 90% ethanol, about 100% ethanol, and about 100% xylene. Solid black lines represent average signal and shaded area is ±σ. FIG. 38E shows the absolute TOF signals for breast cancer tissue over time in about 10% NBF, about 70% ethanol, about 90% ethanol, about 100% ethanol, and about 100% xylene. Solid black lines represent average signal and shaded area is ±σ. FIG. 38F shows the absolute TOF signals for adipose tissue over time in about 10% NBF, about 70% ethanol, about 90% ethanol, about 100% ethanol, and about 100% xylene. Solid black lines represent average signal and shaded area is ±σ.

As would be expected from the sound velocities of these chemicals, the TOF decreased in about 10% NBF, progressively increased as the graded ethanol's concentration increased, and finally decreased in xylene. It should be noted that the amplitudes of the three ethanol signals also decreased as the ethanol concentration increased because replacing about 90% ethanol with about 100% generates a smaller sound velocity differential than exchanging about 70% and about 90% ethanol. Interestingly, the adipose sample in xylene consistently displayed an increasing TOF signal. Although not fully explained this counterintuitive result may be the result of xylene stripping part of the adipose sample, which has a faster sound velocity than xylene, thus decreasing the speed of sound in the sample and increasing the observed TOF. Regardless of the exact mechanism, the reliable and stable TOF signal indicates when the sample and xylene are at equilibrium. TOF monitoring enables quantitative tracking of the amount of fluid exchange that has occurred in a tissue specimen and the rate at which it is occurring.

Figure 39A:
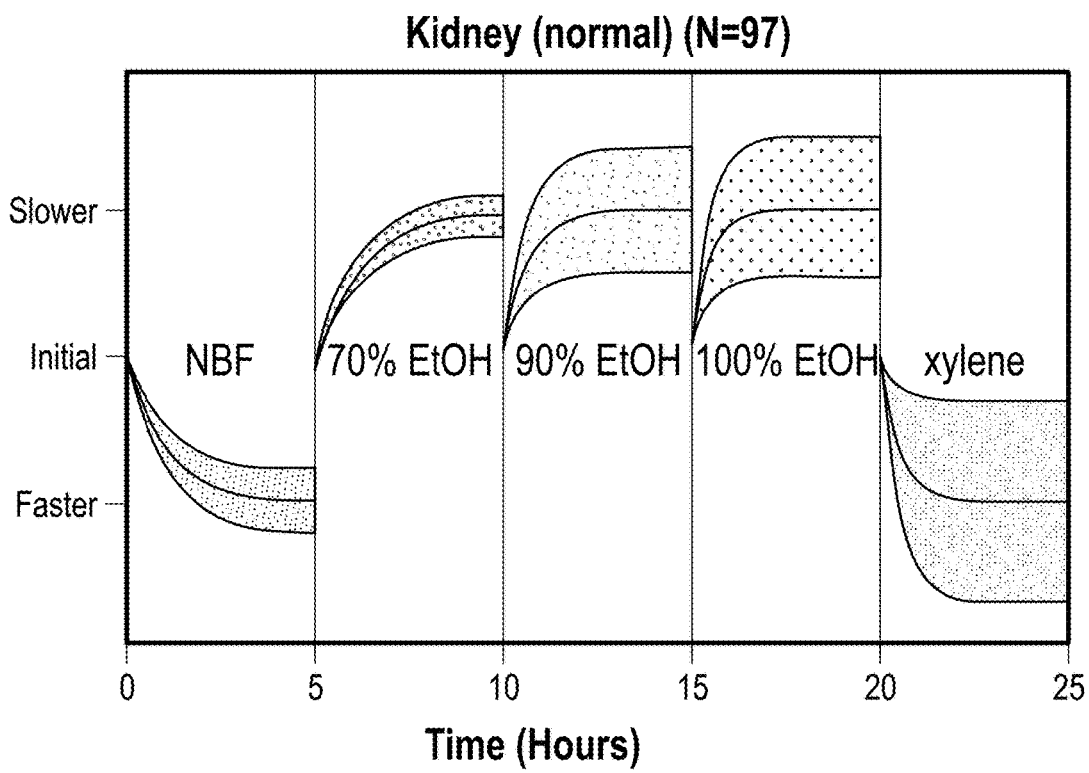
FIG. 39A shows the normalized TOF signals for normal kidney tissue over time in 10% NBF, 70% ethanol, 90% ethanol, 100% ethanol, and 100% xylene. Solid black lines represent average signal and shaded area is ±σ.
Figure 39B:
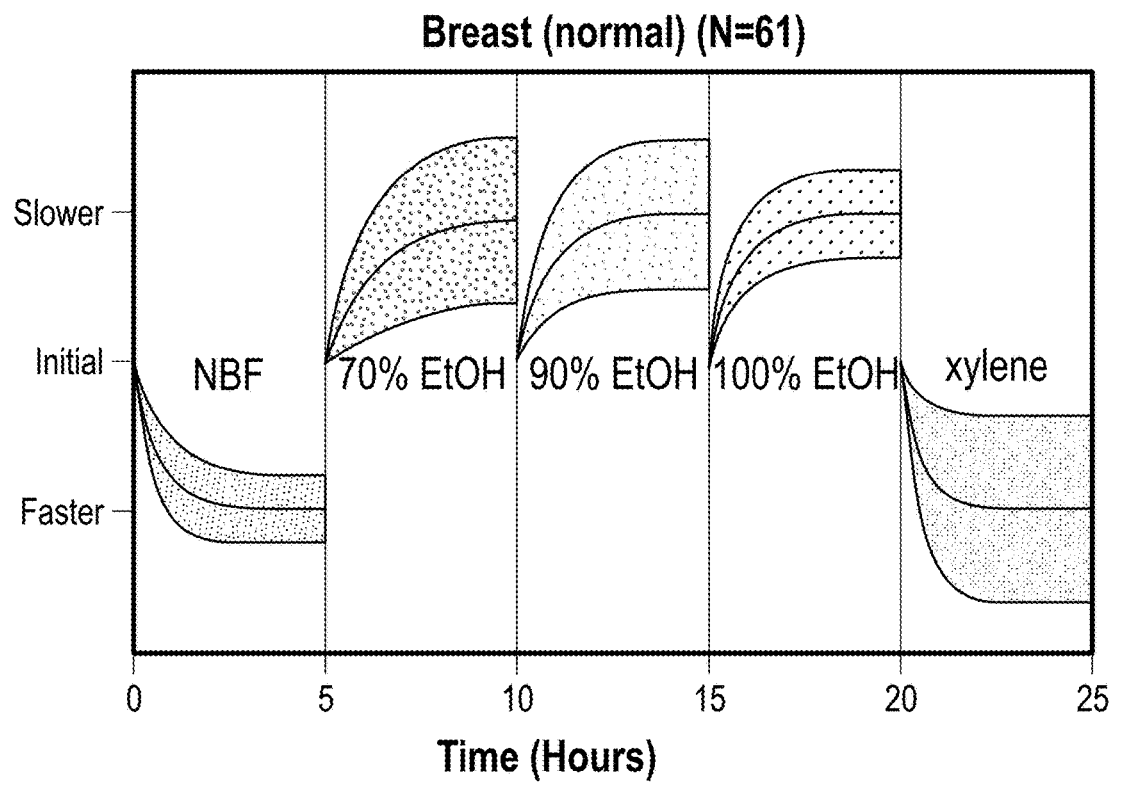
FIG. 39B shows the normalized TOF signals for normal breast tissue over time in 10% NBF, 70% ethanol, 90% ethanol, 100% ethanol, and 100% xylene. Solid black lines represent average signal and shaded area is ±σ.
Figure 39C:
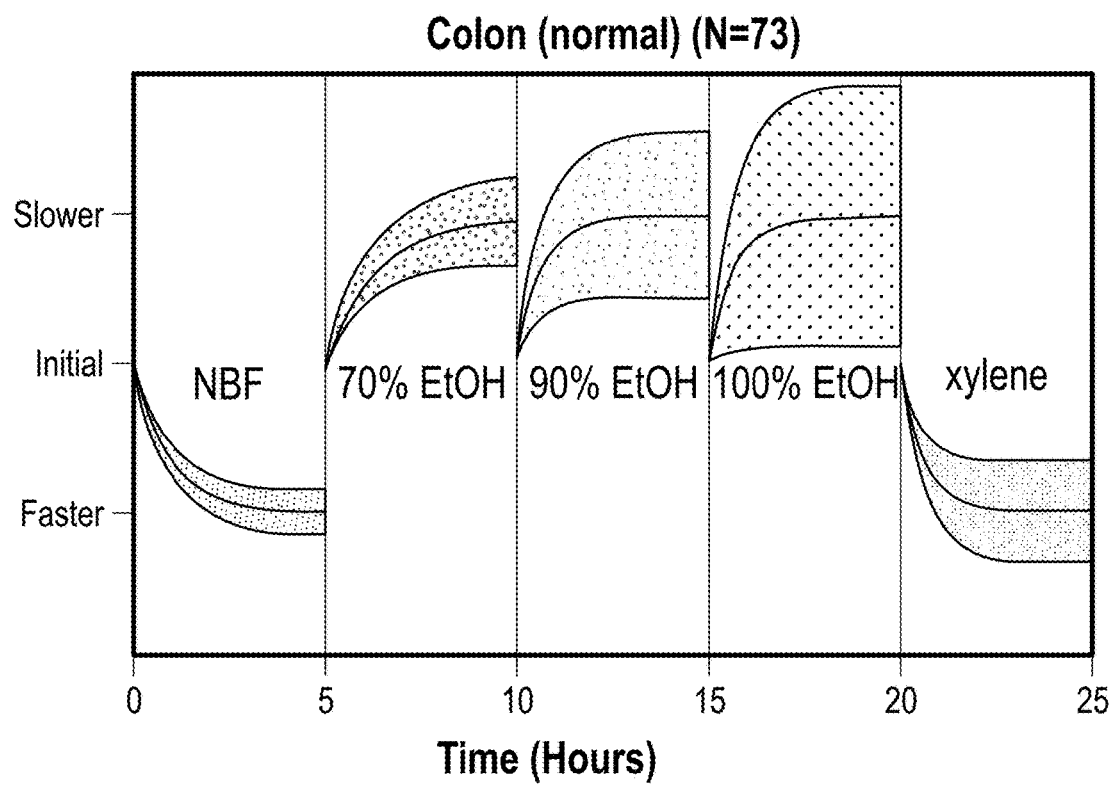
FIG. 39C shows the normalized TOF signals for normal colon tissue over time in 10% NBF, 70% ethanol, 90% ethanol, 100% ethanol, and 100% xylene. Solid black lines represent average signal and shaded area is ±σ.
Figure 39D:
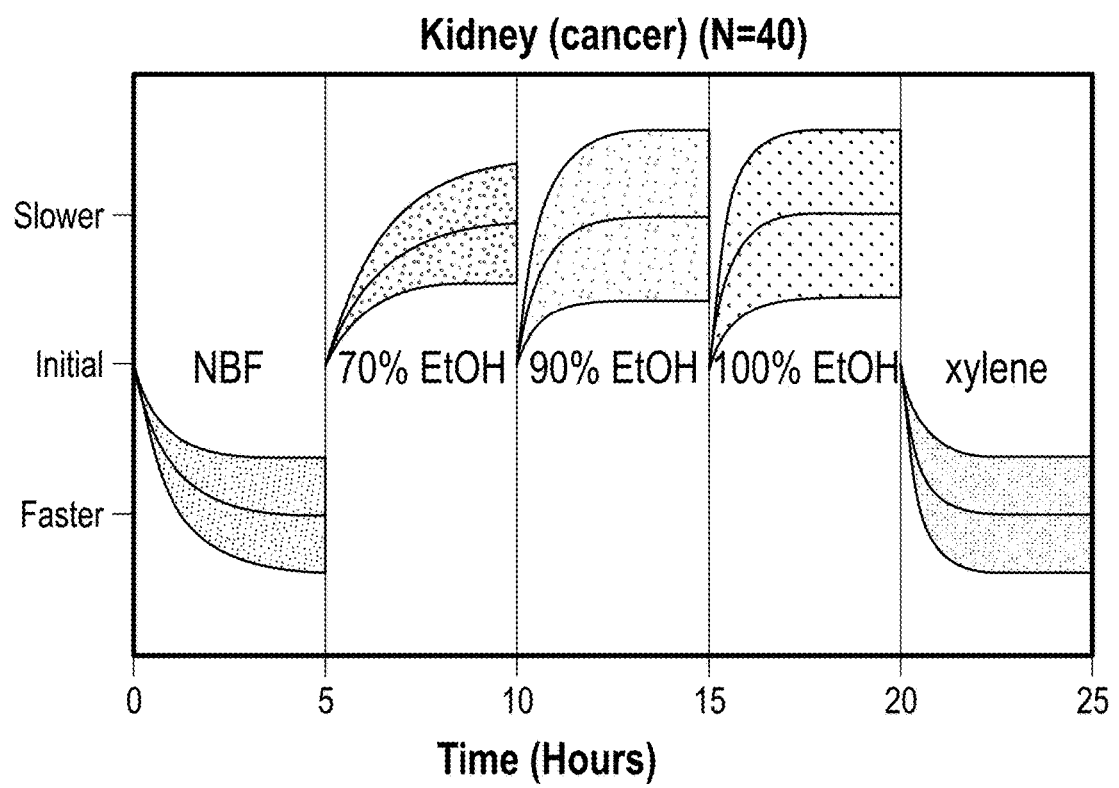
FIG. 39D shows the normalized TOF signals for kidney cancer tissue over time in 10% NBF, 70% ethanol, 90% ethanol, 100% ethanol, and 100% xylene. Solid black lines represent average signal and shaded area is ±σ.
Figure 39E:
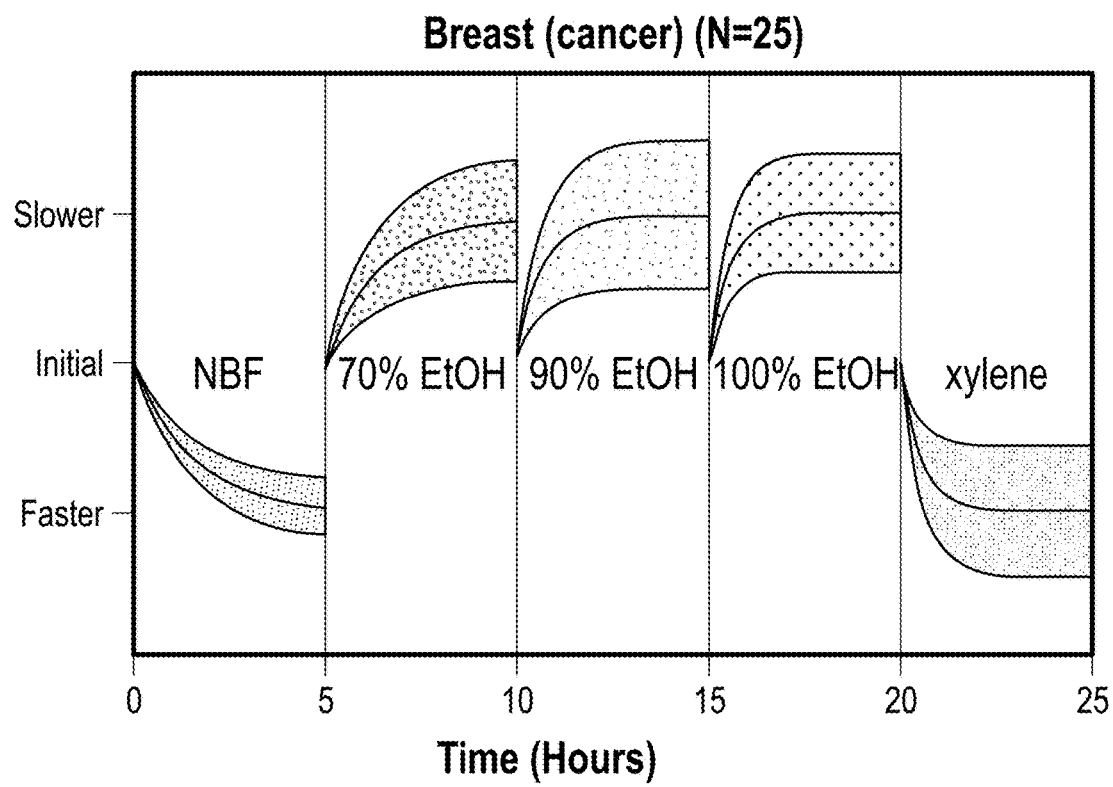
FIG. 39E shows the normalized TOF signals for breast cancer tissue over time in 10% NBF, 70% ethanol, 90% ethanol, 100% ethanol, and 100% xylene. Solid black lines represent average signal and shaded area is ±σ.
Figure 39F:
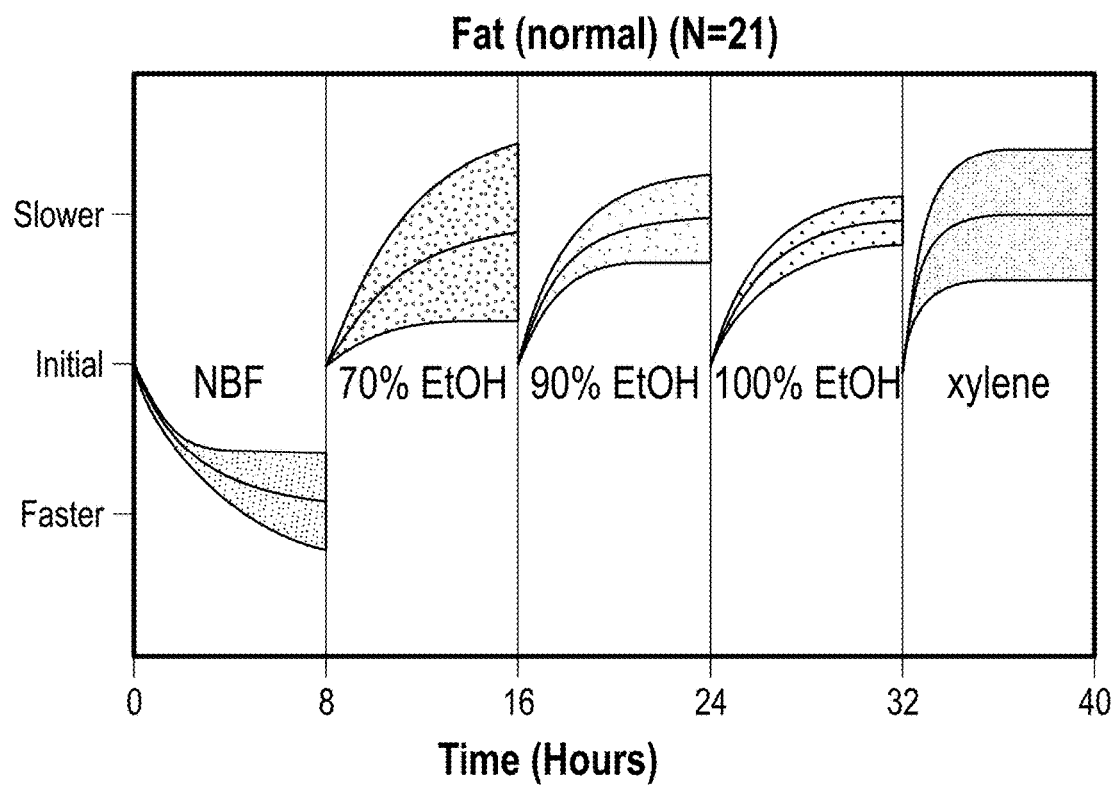
FIG. 39F shows the normalized TOF signals for adipose tissue over time in 10% NBF, 70% ethanol, 90% ethanol, 100% ethanol, and 100% xylene. Solid black lines represent average signal and shaded area is ±σ.

FIG. 39A shows the normalized TOF signals for normal kidney tissue over time in about 10% NBF, about 70% ethanol, about 90% ethanol, about 100% ethanol, and about 100% xylene. Solid black lines represent average signal and shaded area is ±σ. FIG. 39B shows the normalized TOF signals for normal breast tissue over time in about 10% NBF, about 70% ethanol, about 90% ethanol, about 100% ethanol, and about 100% xylene. Solid black lines represent average signal and shaded area is ±σ. FIG. 39C shows the normalized TOF signals for normal colon tissue over time in about 10% NBF, about 70% ethanol, about 90% ethanol, about 100% ethanol, and about 100% xylene. Solid black lines represent average signal and shaded area is ±σ. FIG. 39D shows the normalized TOF signals for kidney cancer tissue over time in about 10% NBF, about 70% ethanol, about 90% ethanol, about 100% ethanol, and about 100% xylene. Solid black lines represent average signal and shaded area is ±σ. FIG. 39E shows the normalized TOF signals for breast cancer tissue over time in about 10% NBF, about 70% ethanol, about 90% ethanol, about 100% ethanol, and about 100% xylene. Solid black lines represent average signal and shaded area is ±σ. FIG. 39F shows the normalized TOF signals for adipose tissue over time in about 10% NBF, about 70% ethanol, about 90% ethanol, about 100% ethanol, and about 100% xylene. Solid black lines represent average signal and shaded area is ±σ.

The same example tissue types are displayed FIGS. 38A-F and FIGS. 39A-F. The TOF signals normalized to the average values of each chemical in order to helps visualized the rate of fluid exchange and make it easier to see how long the process takes to complete. Visually one can depict differences in the rate at which samples diffuse chemicals, for instance both cancerous kidney and breast samples have more variable processing rates compared to their normal counterparts and, in general, the diffusion rate of ethanol appears to increase with concentration.

Figure 40A:
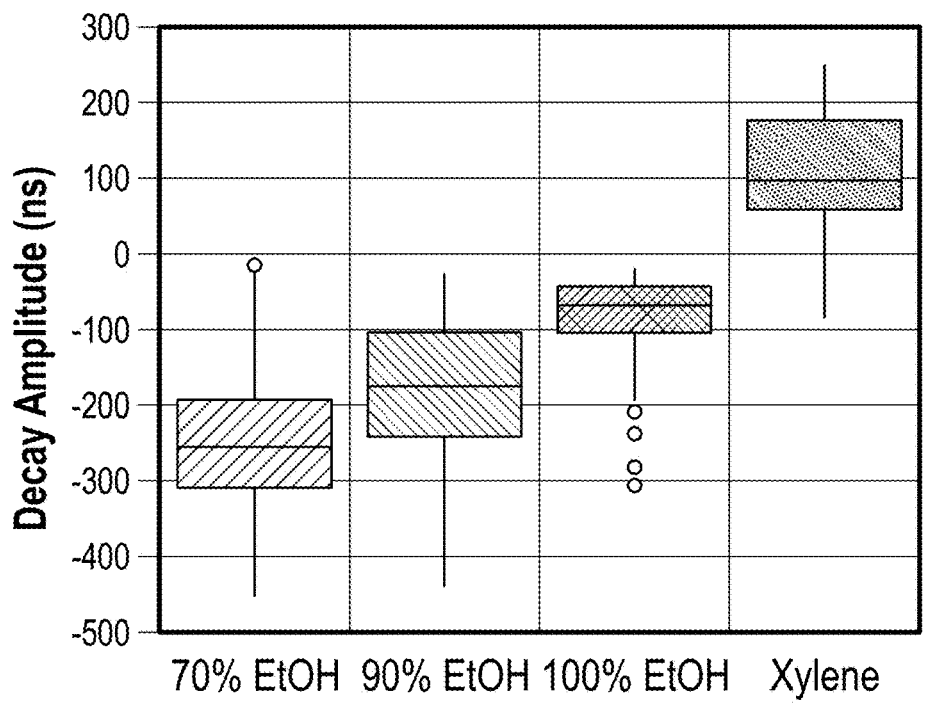
FIG. 40A shows the distribution of all decay amplitudes grouped by reagent. Solid line is median, solid box represented 25 to 75th percentiles, whiskers extend to 1.5× the interquartile range, and data outside the whiskers are represented by circles.
Figure 40B:
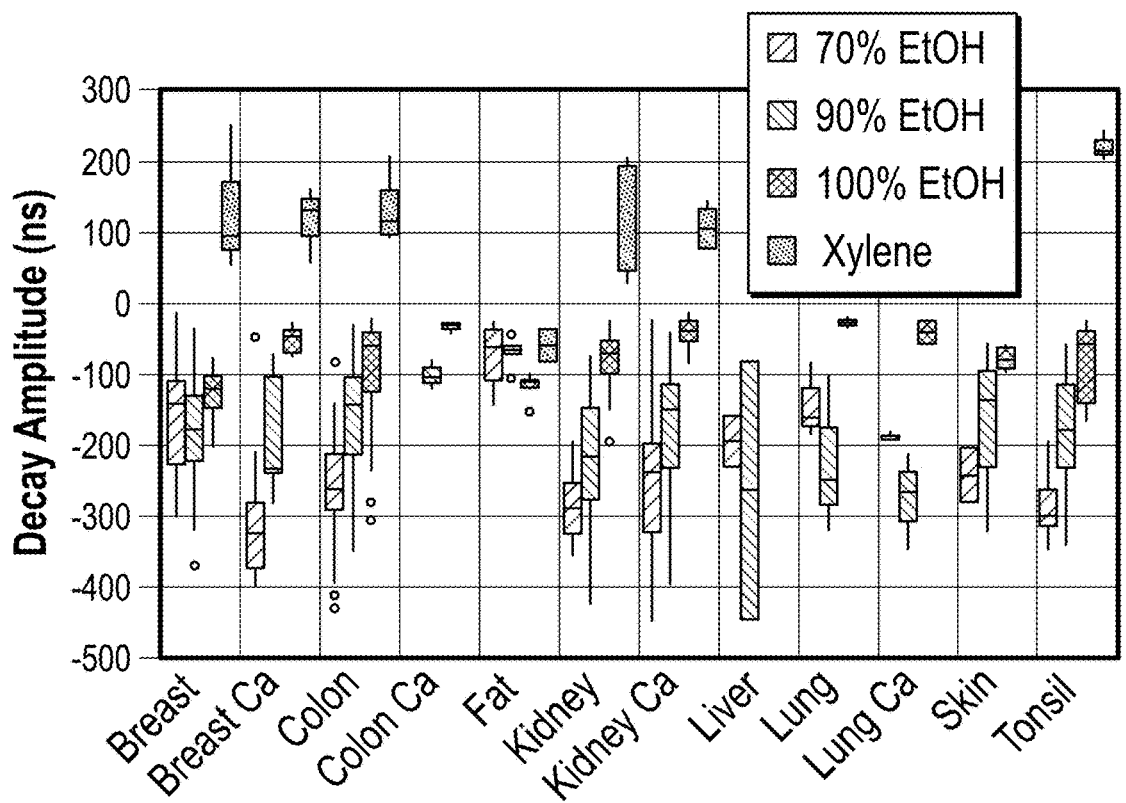
FIG. 40B shows the distributions of decay amplitudes by reagent and tissue type. Negative amplitude is increasing TOF, positive amplitude is decreasing TOF. Solid line is median, solid box represented 25 to 75th percentiles, whiskers extend to 1.5× the interquartile range, and data outside the whiskers are represented by circles. Ca=cancer.
Figure 40C:
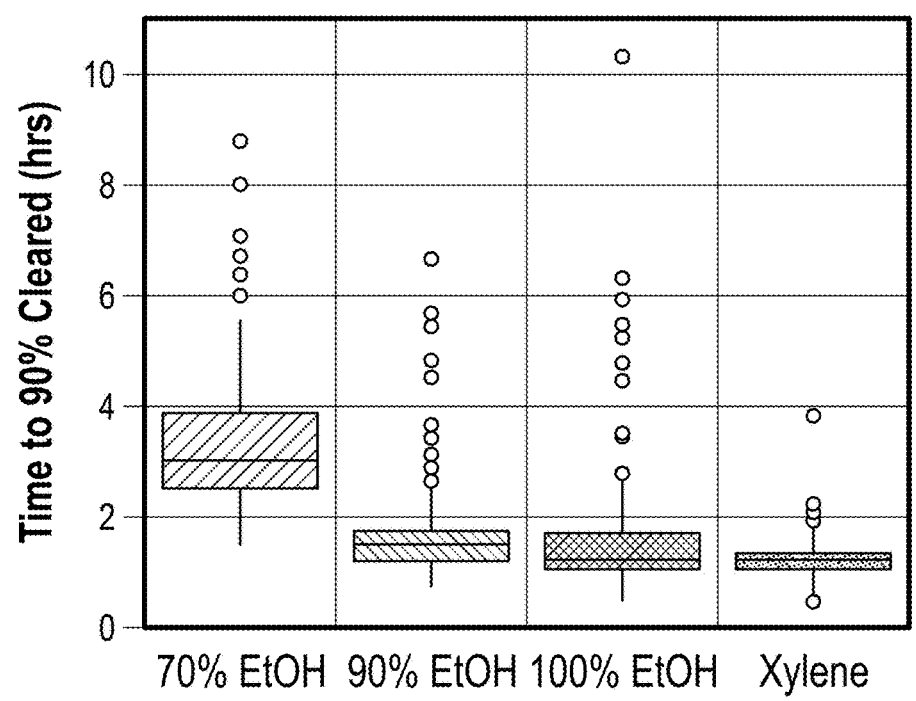
FIG. 40C shows the distribution of time required to be 90% diffused grouped by reagent. Solid line is median, solid box represented 25 to 75th percentiles, whiskers extend to 1.5× the interquartile range, and data outside the whiskers are represented by circles.
Figure 40D:
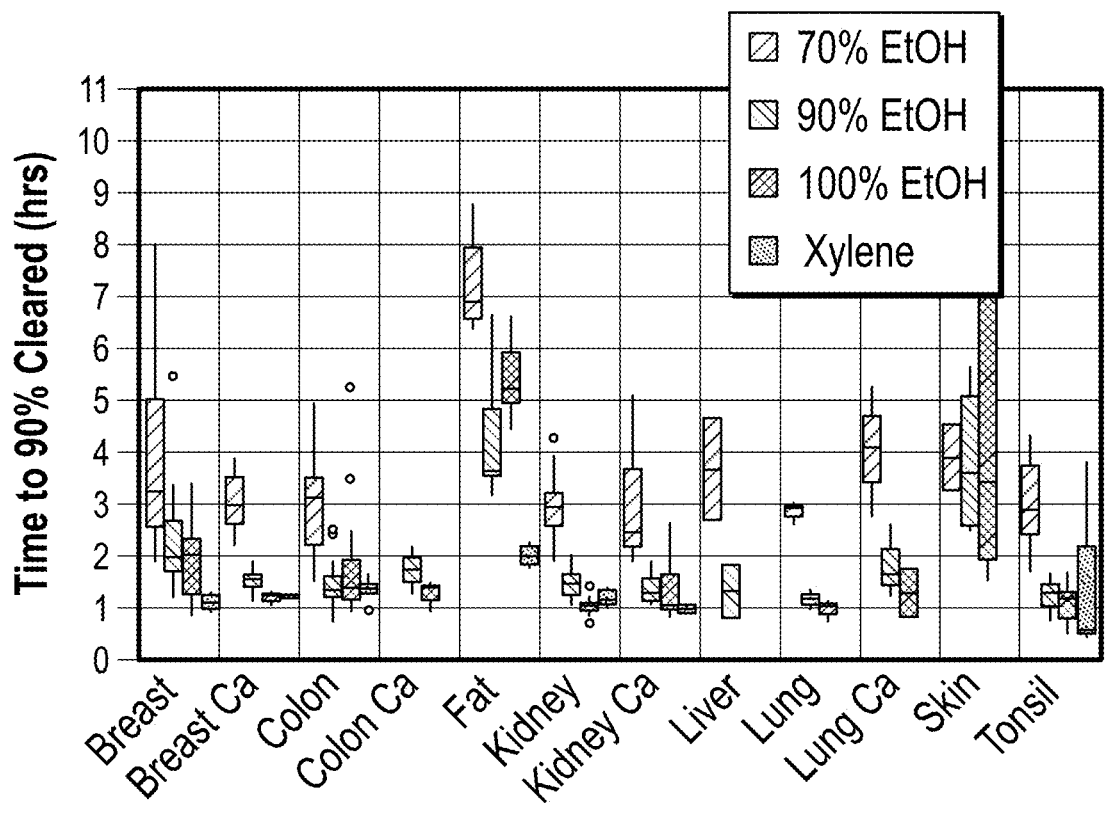
FIG. 40D shows the distribution of time required for tissue to be 90% diffused by reagent and tissue type. Solid line is median, solid box represented 25 to 75th percentiles, whiskers extend to 1.5× the interquartile range, and data outside the whiskers are represented by circles. Ca=cancer.

To summarize, all the data that was collected with the modified tissue processor and the distributions of the TOF's decay time and amplitude were calculated. FIG. 40A shows the distribution of all decay amplitudes grouped by reagent. Solid line is median, solid box represented 25 to 75th percentiles, whiskers extend to 1.5× the interquartile range, and data outside the whiskers are represented by circles. whereas FIG. 40B shows the distributions of decay amplitudes by reagent and tissue type. Negative amplitude is increasing TOF, positive amplitude is decreasing TOF. Solid line is median, solid box represented 25 to 75th percentiles, whiskers extend to 1.5× the interquartile range, and data outside the whiskers are represented by circles (Ca=cancer). Because there has not been previously provided an accepted standard for the degree or percent that a histological specimen should be dehydrated in ethanol and cleared in xylene here, we choose to display the time required for the samples to be 90% diffused. FIG. 40C shows the distribution of time required to be 90% diffused grouped by reagent. Solid line is median, solid box represented 25 to 75th percentiles, whiskers extend to 1.5× the interquartile range, and data outside the whiskers are represented by circles. FIG. 40D shows the distribution of time required for tissue to be 90% diffused by reagent and tissue type. Solid line is median, solid box represented 25 to 75th percentiles, whiskers extend to 1.5× the interquartile range, and data outside the whiskers are represented by circles. Ca=cancer. One can see that diffusion of about 70% ethanol is typically slower than that of the other three reagents although several samples take a relatively long time to clear higher ethanol concentrations and xylene, such as skin and adipose. There is once again significant variation in the rates at which different organs clear processing agents. Of note is how slowly adipose samples clear all three ethanol solutions and the extreme variability with processing of skin samples.

Figure 41A:
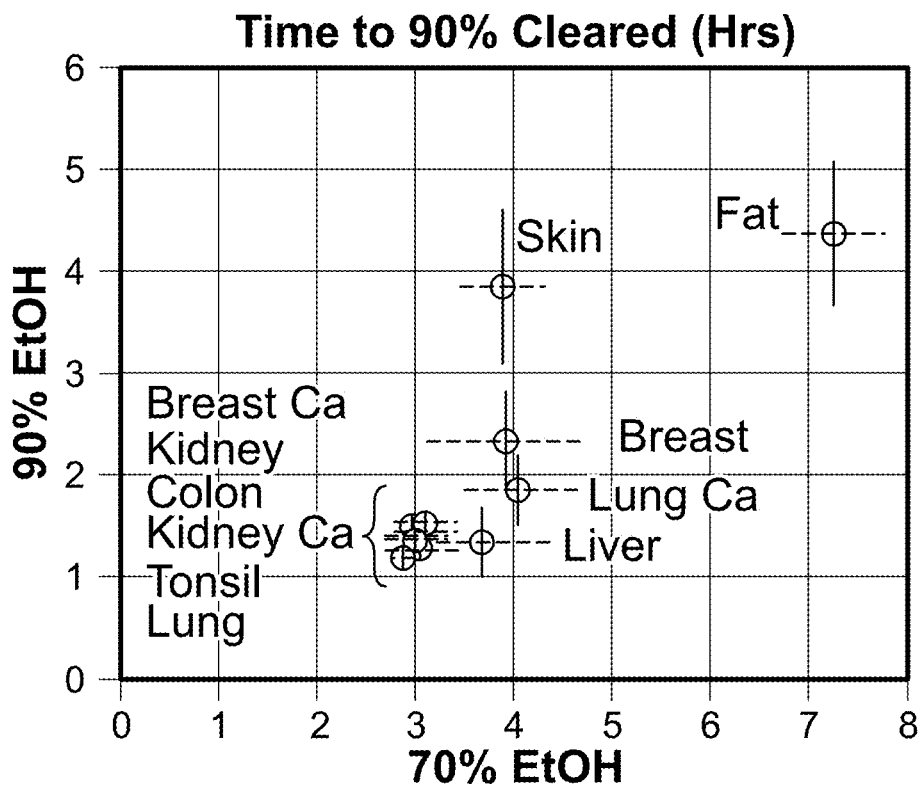
FIG. 41A shows the diffusion time of 90% ethanol versus that of 70% ethanol for several tissue types as labeled. Circles represent average diffusion time, horizontal dashed lines represent ±σ of horizontal axis, and solid vertical line represent ±σ of vertical axis and specific tissue types are labeled as such.
Figure 41B:
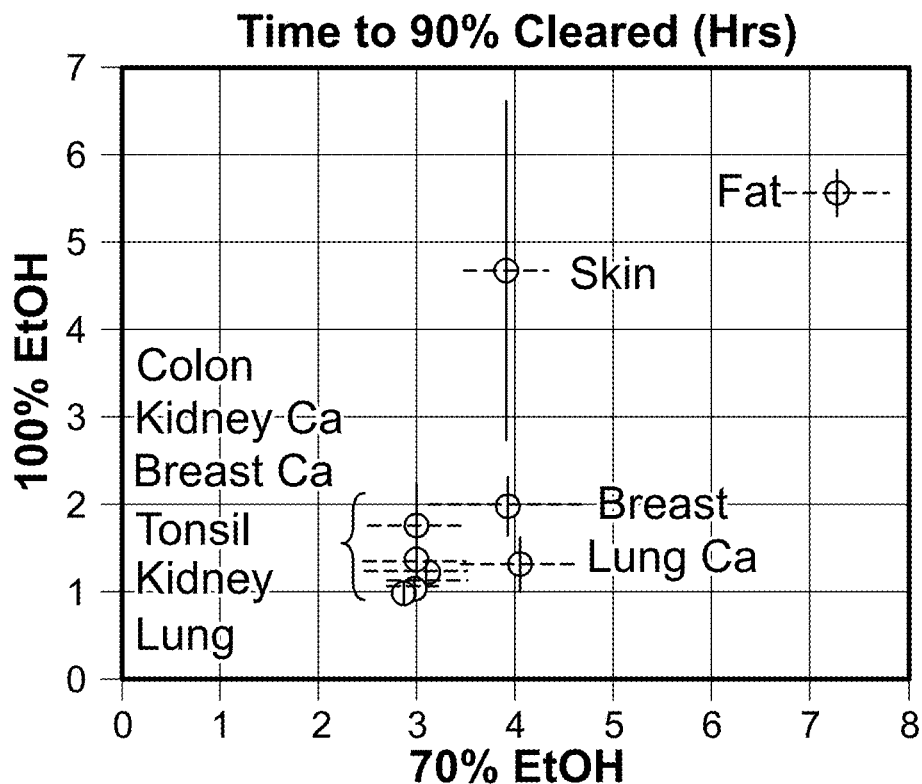
FIG. 41B shows the diffusion time of 90% ethanol versus that of 100% ethanol for several tissue types as labeled. Circles represent average diffusion time, horizontal dashed lines represent ±σ of horizontal axis, and solid vertical line represent ±σ of vertical axis.
Figure 41C:
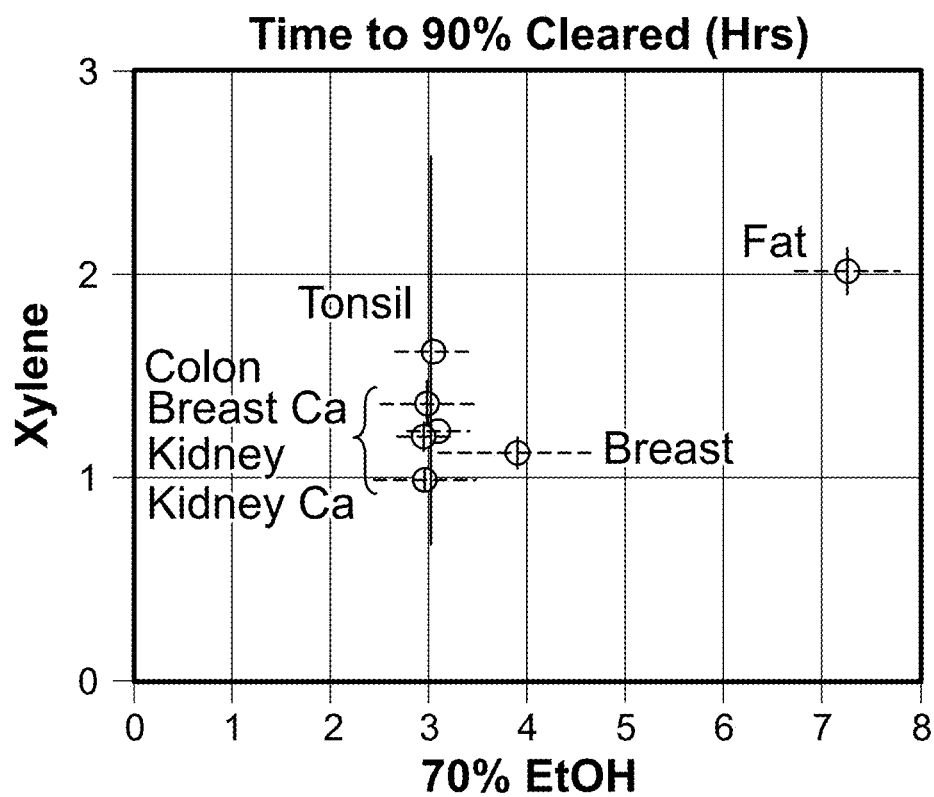
FIG. 41C shows the diffusion time of xylene versus that of 70% ethanol for several tissue types as labeled. Circles represent average diffusion time, horizontal dashed lines represent ±σ of horizontal axis, and solid vertical line represent ±σ of vertical axis.

The about 90% diffusion times for specific types of tissue in about 90% ethanol, 100% ethanol, and xylene were compared with how much time is required the sample required to become about 90% diffused with about 70% ethanol. FIG. 41A shows the diffusion time of about 90% ethanol versus that of about 70% ethanol for several tissue types as labeled. Circles represent average diffusion time, horizontal dashed lines represent ±σ of horizontal axis, and solid vertical line represent ±σ of vertical axis and specific tissue types are labeled as such. FIG. 41B shows the diffusion time of about 90% ethanol versus that of about 100% ethanol for several tissue types as labeled. Circles represent average diffusion time, horizontal dashed lines represent ±σ of horizontal axis, and solid vertical line represent ±σ of vertical axis. FIG. 41C shows the diffusion time of xylene versus that of about 70% ethanol for several tissue types as labeled. Circles represent average diffusion time, horizontal dashed lines represent ±σ of horizontal axis, and solid vertical line represent ±σ of vertical axis. Tissues that require longer times to adequately process tend to also require longer for all or most of the subsequent processing steps as well. Although not a perfect correlation, tissue types that tend to diffuse about 70% ethanol slowly, such as fat and skin, and to a lesser degree breast, also tend to take longer to diffuse about 90% ethanol, about 100% ethanol, and xylene. With this view a trend can be seen indicting the diffusion rate through the subsequent reagents is correlated with the rate of diffusion in about 70% ethanol.

Figure 42:
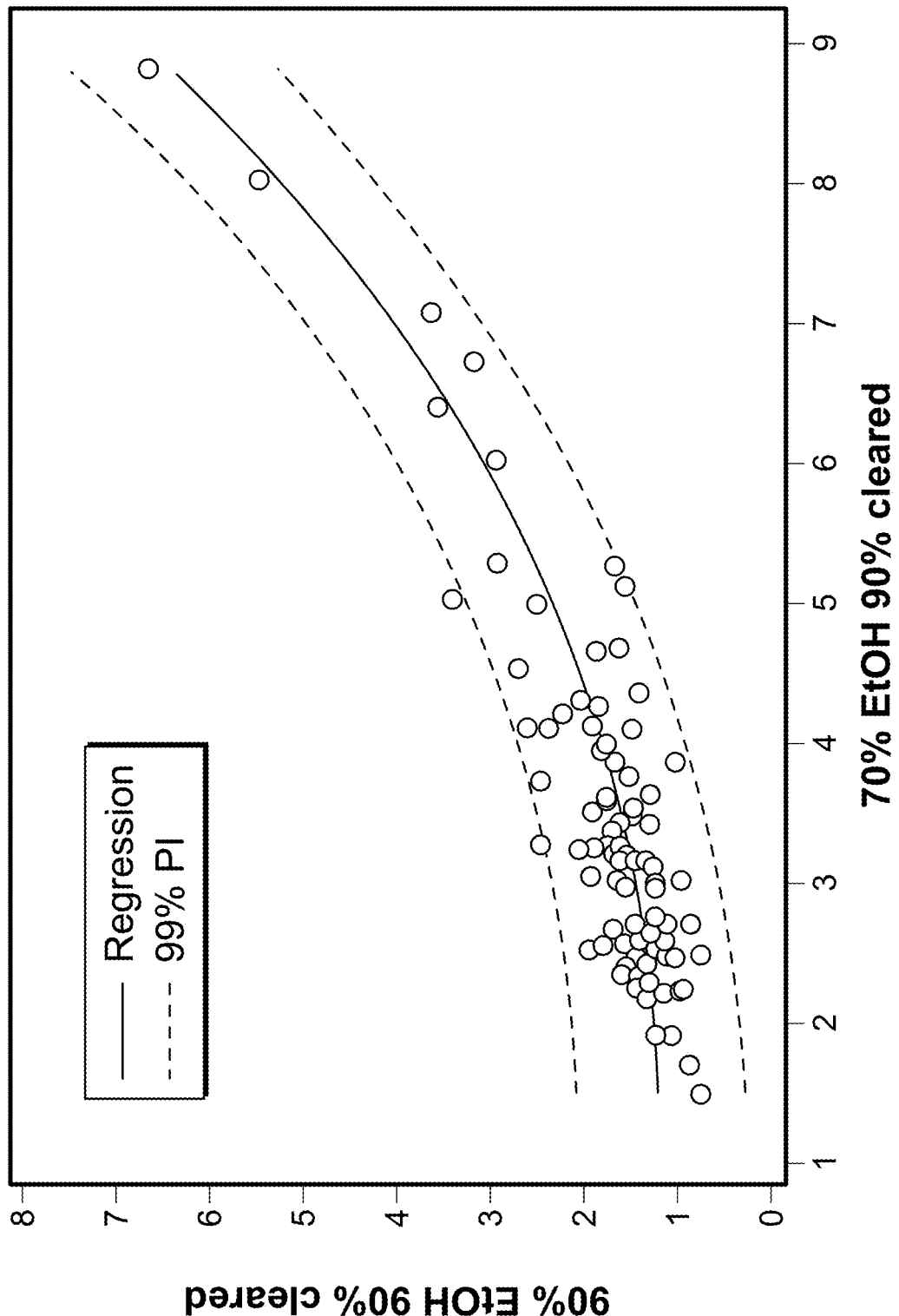
FIG. 42 shows paired data plotting time to 90% diffused for 70% ethanol versus 90% ethanol, as well as the power regression fit (solid line) and 99% predictive interval (dashed line) thereof.
Figure 43A:
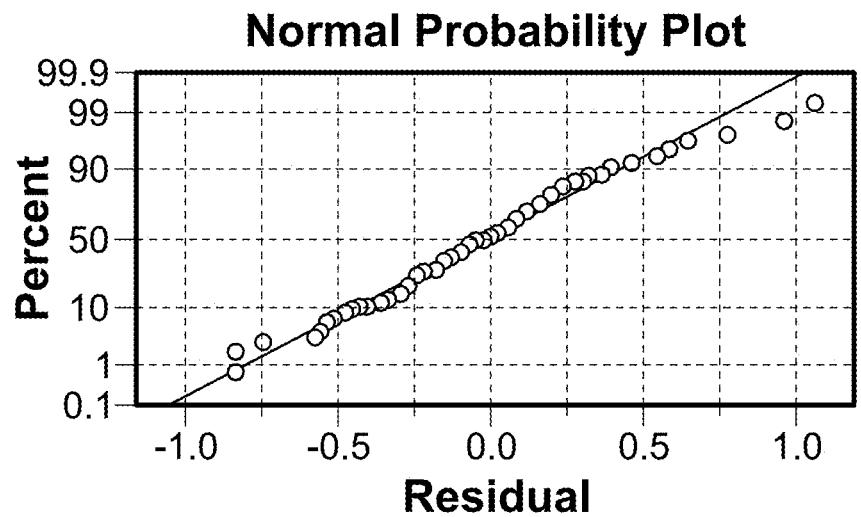
FIGS. 43A, 43B, 43C, and 43D show statistical fit quality measures as indicated for the regression shown in FIG. 42.
Figure 43B:
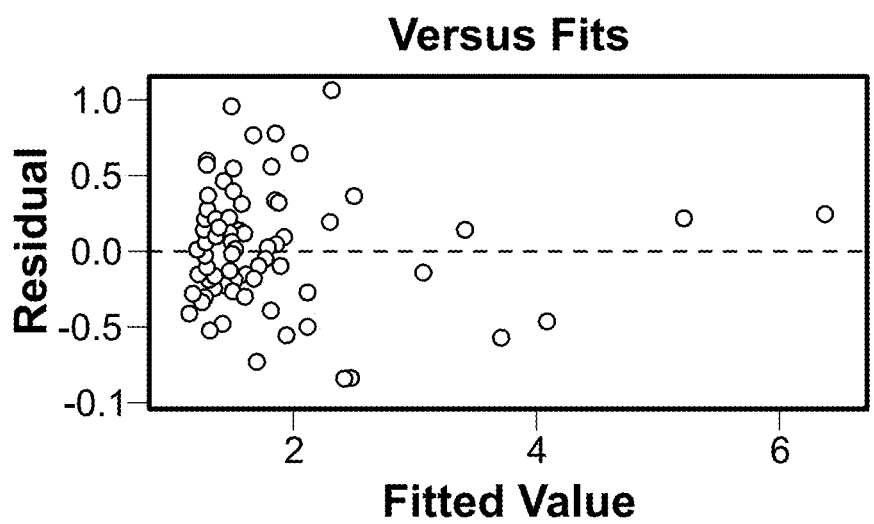
Figure 43C:
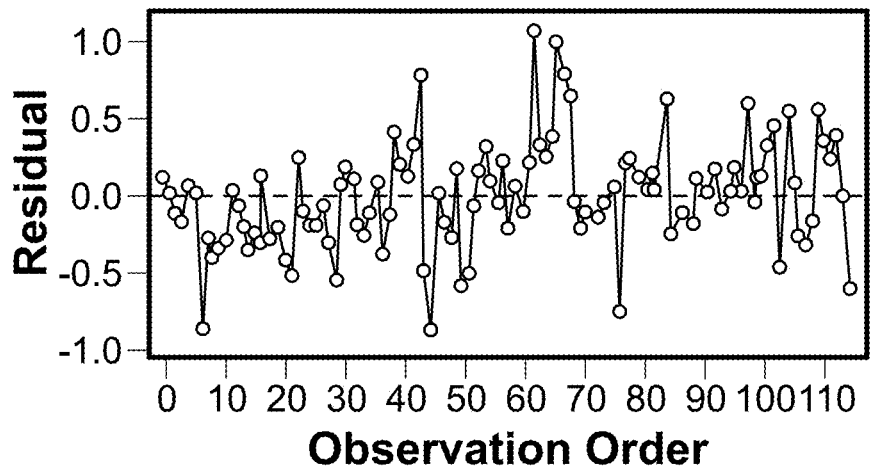
Figure 43D:
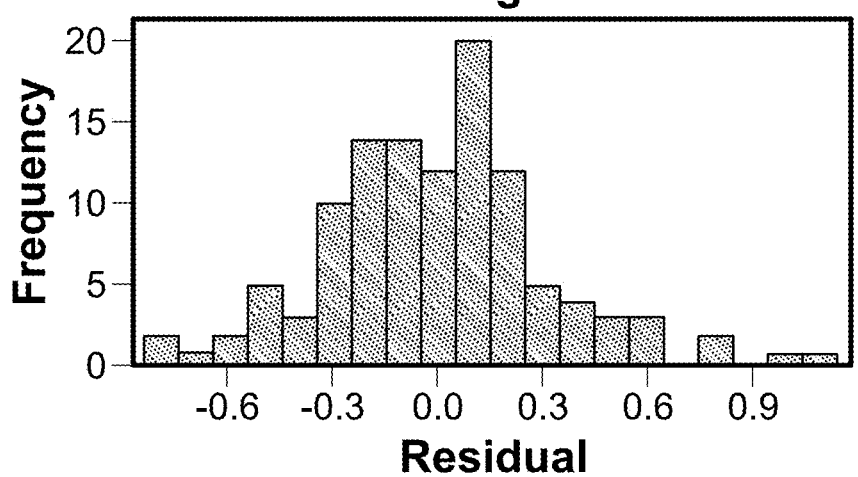
Figure 45A:
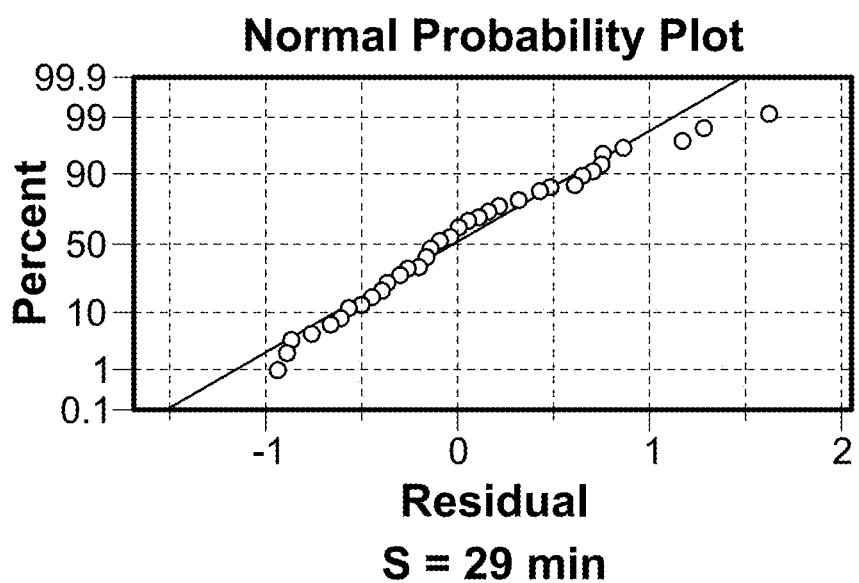
FIGS. 45A, 45B, 45C, and 45D show statistical fit quality measures as indicated for the regression show in FIG. 44.
Figure 45B:
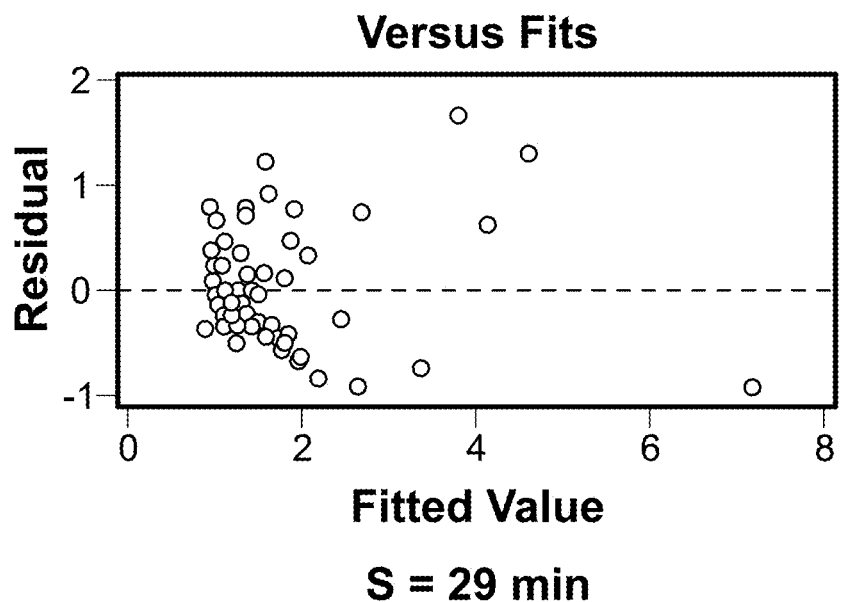
Figure 45C:
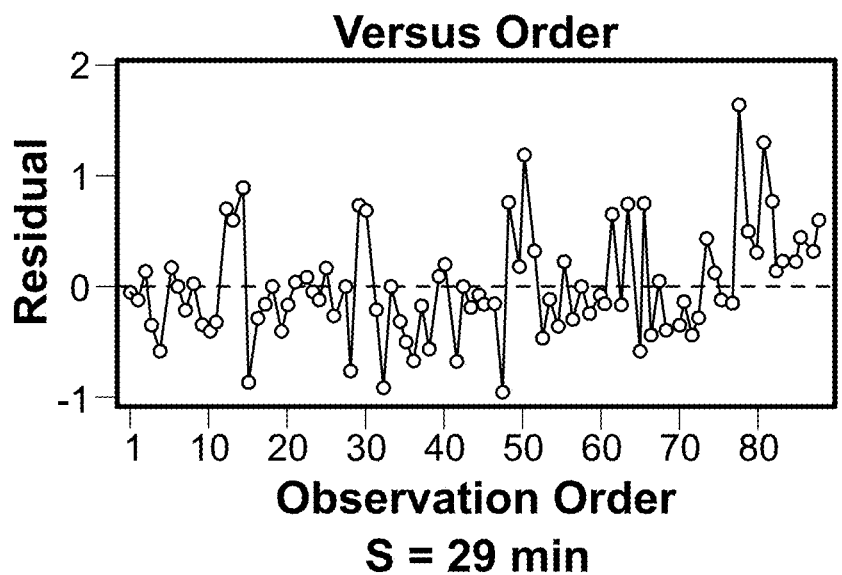
Figure 45D:
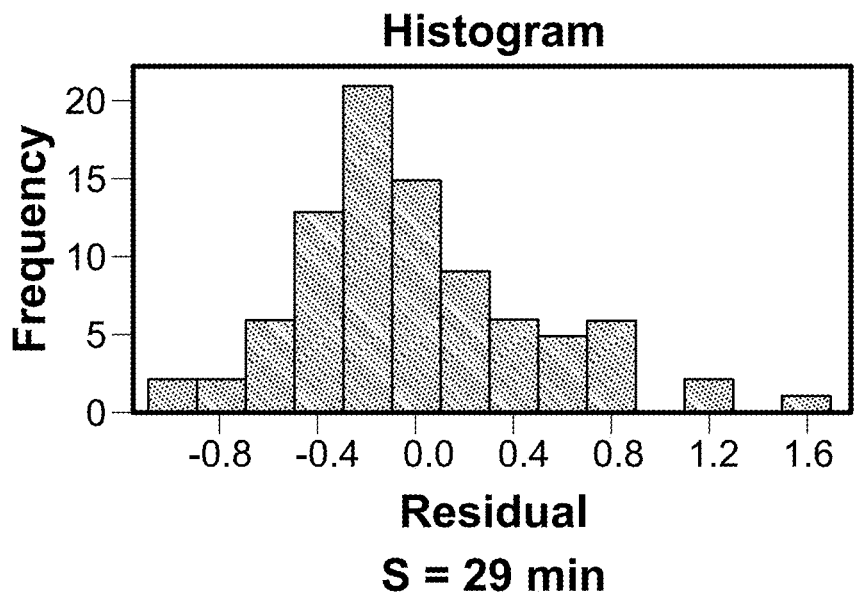
Figure 46:
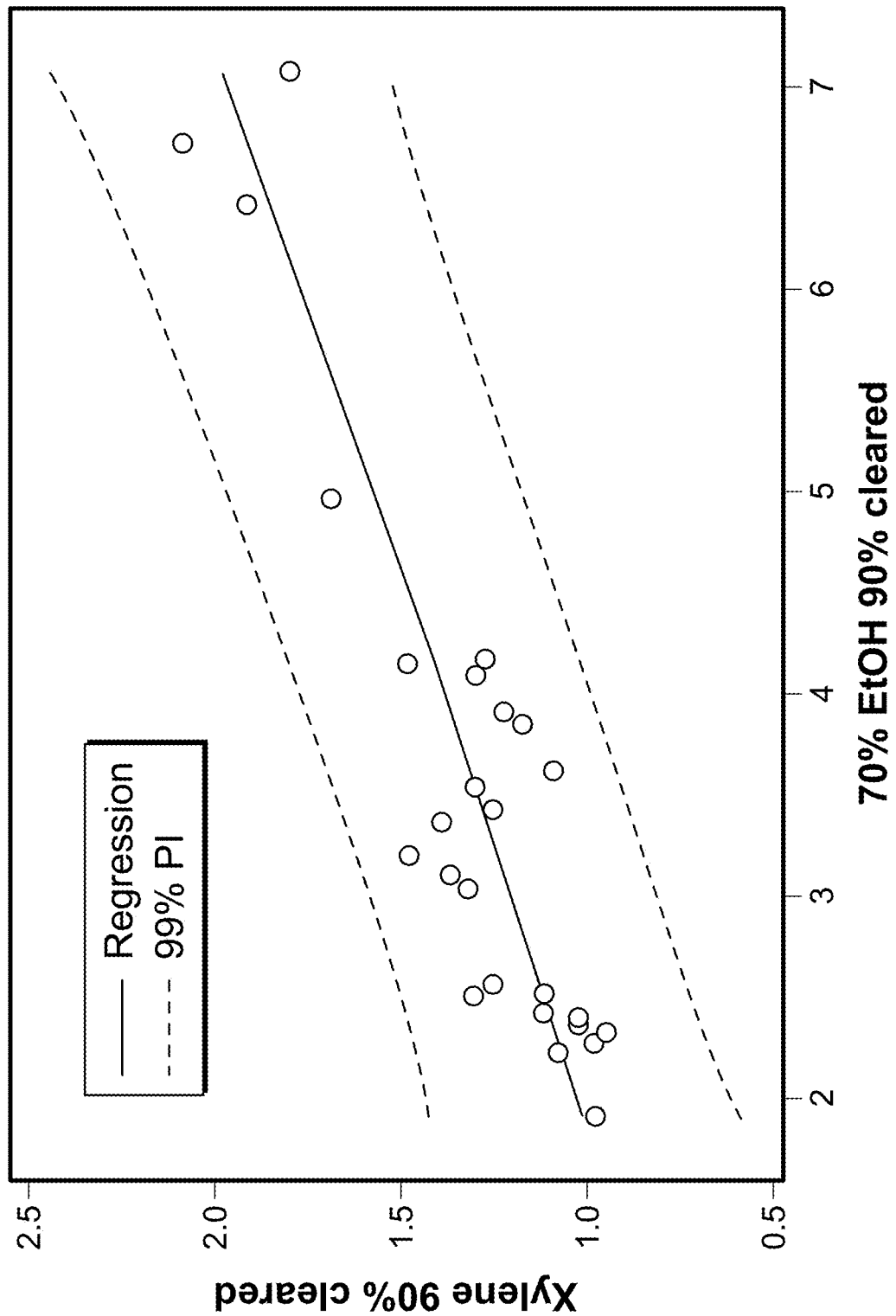
FIG. 46 shows paired data plotting time to 90% diffused for 70% ethanol versus absolute xylene, as well as the power regression fit (solid line) and 99% predictive interval (dashed line) thereof
Figure 47A:
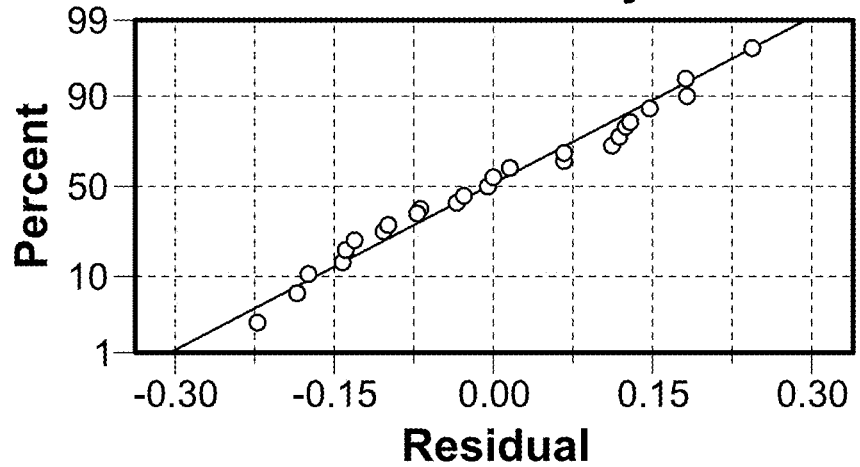
FIGS. 47A, 47B, 47C, and 47D, show statistical fit quality measures as indicated for the regression show in FIG. 46.
Figure 47B:
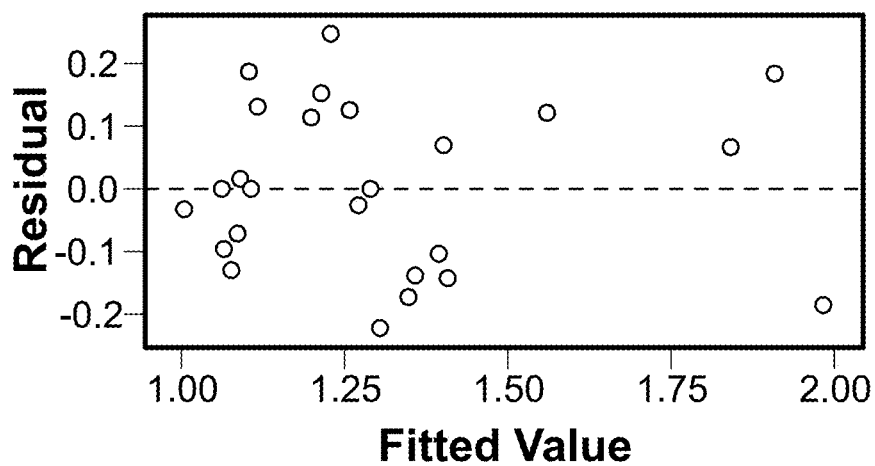
Figure 47C:
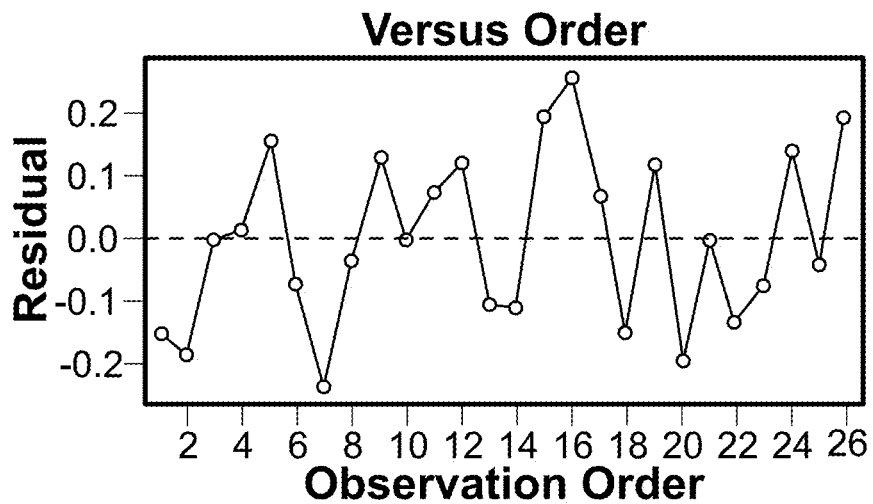
Figure 47D:
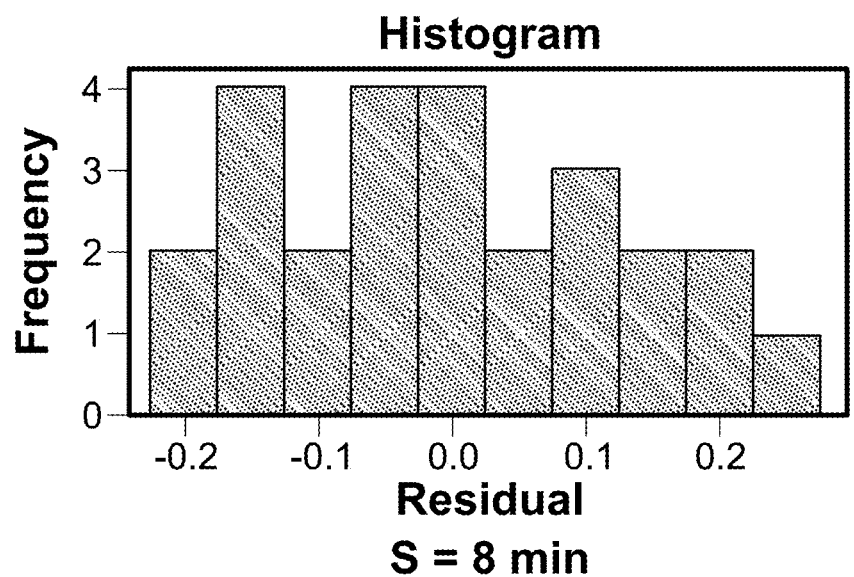

Prediction criteria for optimal processing times were developed. The plots in FIGS. 42, 44 and 46 display the average and standard deviation of all the data that was collected, but only paired data points were included in corresponding predictive statistical analyses that are depicted in FIGS. 43A-D, FIGS. 45A-D, and FIGS. 47A-D, respectively. Paired data indicates a diffusion time was successfully recorded for both reagents being studied. This is an important point because sample to sample variability, even within one tissue type, can be significant and lead to misleading results. In FIGS. 42, 44 and 46 only paired data points are plotted for each of the three reagent pairs and each set of data points was empirically determined to be best correlated with a power function with varying constants. The accuracy of the curve fits was extremely strong with variations from the fits of 20, 29 and 8 minutes for about 90% ethanol, about 100% ethanol, and xylene, respectively. This indicates that using curve fitting with a power function and knowledge of the rates at which 70% ethanol diffusion occurs one can precisely predict the rate of diffusion for the other chemicals. Furthermore, a statistical analysis was performed on each experimental paired dataset in which the predictive interval was calculated around each best-fit line. The predictive intervals are displayed on all three plots in FIGS. 42, 44 and 46 as dashed lines. In FIGS. 42 and 44 the best-fit line to the 99% confidence interval is about an hour, indicating the rate at which a sample diffuses about 70% ethanol can be used to predict to within an hour how long 99% of tissue samples will take to diffusion about 90% of about 100% ethanol. For xylene (FIG. 46), the correlation is even stronger such that with knowledge of the rate of about 70% ethanol diffusion predicting how long samples will take to diffusion xylene to within less than 30 minutes. This robust correlation indicates that once the rate of diffusion is determined for 70% ethanol the following steps can accurately be predicted.

FIGS. 43A, 43B, 43C, and 43D show statistical fit quality measures as indicated for the regression show in FIG. 42. FIGS. 45A, 45B, 45C, and 45D show statistical fit quality measures as indicated for the regression show in FIG. 44. FIGS. 47A, 47B, 47C, and 47D, show statistical fit quality measures as indicated for the regression show in FIG. 46.

Overall, 126 samples from 8 different organs were monitored in addition to cancerous breast, colon, kidney, and lung. Ethanol dehydration and xylene clearing can be robustly characterized with acoustic TOF detection and that the signal amplitude and rate of fluid exchange vary greatly from sample to sample as well as amongst different types of tissues. The functional form of fluid exchange from all processing reagents was highly correlated with a single exponential (R2adj=0.992±0.02; deviation from fit=1.5%±1 of signal amplitude). In some embodiments, technology can be used to quantitatively assess the effects that processing reagents have on overall tissue quality and downstream immunorecognition of cancer biomarkers such as FoxP3. Additionally, the disclosed method offers a way to expedite tissue processing times and provide guidance toward standardize the processing of histological specimens in a fully traceable and repeatable pre-analytics workflow. The present disclosure demonstrates the real-time monitoring of diffusion, dehydration, and clearing of formalin, graded ethanols, and xylene in ex vivo tissue samples from numerous different types of tissues with precise acoustic TOF detection. TOF diffusion trends from the processing reagents were consistent with previous results using a modified tissue processor and precise TOF calculation algorithm to monitor in real-time the diffusion of NBF in tissue. This technology in combination with empirical measures of sample quality (e.g. a pathologist scoring) enables the relative amount of fluid exchange, the rate of exchange and even the concentration profile within tissue to be correlated with the time required for a specimen to be optimally processed for a variety of sample types, sizes, shapes and the like, and extended to other shapes of tissue samples using heat equations for different shapes of samples. For example, even complicated sample shapes could be decomposed into sub-shapes based on a 3D image and calculations made for each sub-shape to determine the portion of the sample that will require the longest times in each reagent, and therefore set the overall processing time for that particular sample. Similarly, the disclosed method enables a tissue processing system with compartments for separately and simultaneously treating batches of samples that require similar processing times in different compartments. Real-time detection of fluid infiltration with this capability could for the first time enable quantification of the degree to which a sample is processed, facilitating the development of a quantitative quality metric that could be used to study the effects that processing can have on histological tissues and downstream diagnostic assays. This capability could enable faster processing of tissue specimen because the precise time tissues are finished diffusing can be determined. Even with batch mode processing this technique could be used to develop faster, more consistent, and standardized processing protocols for clinical tissue samples to improve the repeatability and quality assurance of the process. Although not demonstrated in the examples above, given the differential sound velocities of xylene and paraffin, this technology could be extended to monitor paraffin embedding, which would enable the entire fixation and processing of histological specimens to be quantitatively tracked and studied. In some embodiments, the disclosed system and method can be used to optimize decalcification of bone segments, which could prove useful because poorly decalcified samples are not suitable for IHC while overexposure to decalcification agents can compromise tissue morphology, nuclear chromatin, and nucleic acid.

Furthermore, although all tissue processing TOF studies described were discussed with reference to decay times and amplitudes, TOF monitoring can be based on other measures of the extent of diffusion of a reagent into a sample can be used. For example, percent diffusion, reagent concentration at the center of the tissue, or any other TOF derived measure of the extent of reagent diffusion into a sample, can be used to provide time to completion information.

Additionally, the TOF technology can be used to determine the correlation between exposure to processing reagents and the quality of a histological specimen and/or downstream assay results. For example, the correlation between over- and under-processed samples and the microscopy artifacts resulting from histological tissues that are either too soft or excessively brittle can be determined. With this information, best practices and tissue processing criteria can be developed for ideally processing samples so that artifacts could be avoided. Furthermore, quantitative studies to understand the impact that processing can have on staining or epitope retrieval and the can be used to elucidate why, and to what extent, poorly fixed samples are more susceptible to artifacts arising from exposing to processing reagents.

IV. Further Embodiments

In another embodiment, a method is disclosed wherein a first sample of a particular type, size and shape is subjected to TOF analysis to determine a time for which optimal diffusion of about 70% ethanol can be accomplished and the optimal times for all other steps in tissue processing are calculated. The method can further include subjecting a second sample have substantially the same shape as the first sample to a processing protocol based on the experimentally determined 7 about 0% ethanol time and the calculated times for other steps in tissue processing. For example, adjacent cores from a tumor sample could be obtained, and one examined by TOF analysis to obtain the optimal time for diffusion of about 70% ethanol, and then the second could be subjected to processing based on the experimentally determined protocol for infusion of about 70% ethanol and the corresponding calculated protocols for the other reagents, such as about 90% ethanol, about 100% ethanol, xylene and paraffin.

In yet another embodiment, a tissue processing system is disclosed wherein the system includes a controller (e.g. a microprocessor) having stored thereon (or retrievable from external storage) a database of protocol instructions including tissue processing steps and times for particular types, shapes and sizes of tissue samples, or groups of particular types, sizes and shapes of tissue samples that share a particular optimized processing protocol, a user interface providing a user with a selectable protocol corresponding to each of the particular types, shapes and sizes of tissue samples, wherein upon selection of a particular type, shape and size of sample by the user, the controller will control the tissue processing system to process the tissue according to the selected protocol. In a particular embodiment, the disclosed tissue processing system includes multiple chambers that can process different groups of tissue samples according to different user selectable protocols that correspond to particular types, sizes and shapes of tissue samples or groups of particular types, sizes and shapes of tissue samples that share a particular optimized processing protocol. In another particular embodiment, the system can include a first portion of the instrument that comprises a TOF measurement chamber and a second portion of the instrument can include a tissue processor, wherein experimental TOF results obtained in the first portion for a first sample having a particular type, size and shape are used to automatically select (or displayed and selected by a user) the tissue processing protocol for a sample of corresponding type, size and shape, or a group of samples of types, sizes and shapes for which the first sample is representative. Alternatively, the disclosed tissue processing system can include the hardware necessary for TOF monitoring in one or more chambers to permit real-time monitoring of the process and stop a particular step of processing once a pre-determined measure of the amount or concentration of a particular reagent is achieved in a preselected portion of the sample.

In another embodiment, a method is provided for determining a reagent concentration at a particular point(s) within a sample immersed within a reagent, at a given time, the method including simulating a spatial dependence of diffusion into the sample over a plurality of time points and for each of a plurality of candidate diffusivity constants to generate a model time-of-flight, and comparing the model time-of-flight with an experimental time-of-flight to obtain an error function, wherein a minimum of the error function yields the diffusivity constant for the sample. The method further includes providing a plurality of candidate tissue porosities to generate a model time-of-flight using the diffusivity constant and comparing the model time-of-flight with an experimental time of flight to obtain a second error function, wherein a minimum of the error function yields the porosity of the sample. From the diffusivity constant and the porosity of the sample, the concentration at a particular point or points within the sample at a particular time can be calculated.

In some embodiments, by comparing the experimental results for determined reagent concentrations achieved at the center of tissue samples using the above method it is possible to generate optimized tissue processing protocols for different sizes, shapes and types of tissue samples. Thus, in another embodiment, a modular tissue processor is provided with separate chambers for processing together samples having similar optimized processing protocols. For example, it might be possible for one chamber to contain similar sized and shaped samples of tissues exhibiting similar porosities or to contain a mixture of samples having different porosities, but different sizes. The advantage of such a tissue processor is that tissue processing time is no longer determined by the sample requiring the longest processing procedure as is current practice, rather one can speed up the process (often one of the longest steps between surgical removal of tissue to patient results) for certain groups of samples and ensure that such samples that do not require such a long processing time in the various processing reagents are not overly exposed to such reagents and thereby damaged.

The present disclosure also provides a system including an acoustic monitoring device that detects acoustic waves that have traveled through a tissue sample, and a computing device communicatively coupled to the acoustic monitoring device, the computing device is configured to evaluate a speed of the acoustic waves based on a time of flight and including instructions, when executed, for causing the processing system to perform operations comprising setting a range of candidate diffusivity constants for the tissue sample, simulating a spatial dependence of a reagent within the tissue sample for a plurality of time points and for a first of the range of candidate diffusivity points, determining a modeled time-of-flight based on the spatial dependence, repeating the spatial dependence simulation for each of the plurality of diffusivity constants, and determining an error between the modeled-time-of-flight for the plurality of diffusivity constants versus an experimental time-of-flight for the tissue sample, wherein a minimum of an error function based on the error yields a diffusivity constant for the tissue sample. The system further includes instructions, when executed, for causing the processing system to perform operations comprising setting a range of candidate porosities for the tissue sample that includes a plurality of candidate porosities (such as between about 0.05 and about 0.50, for example between about 0.05 and about 0.40 or between about 0.05 and about 0.30), determining a second modeled time-of-flight based on the diffusivity constant of the sample and a first of the plurality of candidate porosities, and determining a second error between the experimental time-of-flight and the second modeled time-of-flight, repeating the determination of the second modeled time-of-flight for others of the plurality of candidate porosities and a corresponding second error, wherein a minimum of the error identifies the porosity of the sample. In more particular embodiments, the system further includes instructions, that when executed, yield a spatial concentration distribution of the reagent within the sample at a particular time. In an even more particular embodiment, the system further includes instructions, that when executed provide a reagent concentration at the center of the sample at a particular time. In still even more particular embodiment, such a reagent concentration can be utilized to terminate infusion of the sample with the reagent when a pre-determined concentration is reached at a particular point or region within the sample, such as at the center of the sample.

The subject disclosure applies to both biological and non-biological context, providing an ability to follow diffusion of any substance based on the acoustic TOF curve. Although the operations described above provide fitting the TOF curve to a single exponential function, a summation of Bessel functions, a double exponential or quadratic function may be more appropriate, depending on the context. Therefore, the equation itself may change, while the novel features disclosed herein may maintain their inventive spirit and scope when read by a person having ordinary skill in the art.

Diffusion measures and reagent concentration calculations are known to be useful for many applications, including compositional analysis. The present systems and methods are contemplated to be used in any system that utilizes a diffusion measure or reagent concentration measurement.

In one specific embodiment, the present systems and methods are applied to the field of monitoring diffusion of fluids into porous materials.

In some embodiments, the porous material is a tissue sample. In many common tissue analysis methods, the tissue sample is diffused with a fluid solution. For example, Hine (Stain Technol. 1981 March; 56(2):119-23) discloses a method of staining whole tissue blocks by immersing a tissue sample in a hematoxylin solution and eosin solution after fixation and prior to embedding and sectioning. Additionally, fixation is frequently performed by immersing an unfixed tissue sample into a volume of fixative solution, and the fixative solution is allowed to diffuse into the tissue sample. As demonstrated by Chafin et al., (PLoS ONE 8(1): e54138. doi:10.1371/journal.pone. 0054138 (2013)), a failure to ensure that a fixative has sufficiently diffused into the tissue can compromise the integrity of the tissue sample. Thus, in one embodiment, the present systems and methods are applied to determine a sufficient time of diffusion of a fixative into a tissue sample. In such a method, the user selects a minimum fixative concentration to be achieved at a particular point in the tissue sample (such as the center of the thickness of the tissue sample). Knowing at least the tissue thickness, tissue geometry, and the calculated true diffusivity a minimum time to reach the minimum relative (to the surrounding fluid) fixative concentration at the center of the tissue sample can be determined. The fixative will thus be allowed to diffuse into the tissue sample for at least the minimum time. However, to extend this to methods that can be used for real-time monitoring, determination of the tissue sample porosity as disclosed herein permits determination of an actual fixative concentration that needs to be achieved to ensure sample integrity. Thus, based on the system and method disclosed herein, other techniques such as radiolabel tracing, mid-IR evaluation and MRI can be used to determine appropriate times for particular treatments with particular reagents, such as fixatives.

In some embodiments, the presently disclosed systems and methods are used to run a two-temperature immersion fixation method on a tissue sample. As used herein, a "two-temperature fixation method" is a fixation method in which tissue is first immersed in cold fixative solution for a first period of time, followed by heating the tissue for the second period of time. The cold step permits the fixative solution to diffuse throughout the tissue without substantially causing cross-linking. Then, once the tissue has adequately diffused throughout the tissue, the heating step leads to cross-linking by the fixative. In some embodiments, the combination of a cold diffusion followed by a heating step leads to a tissue sample that is more completely fixed than by using standard methods. In some embodiments, a tissue sample is fixed by: (1) immersing an unfixed tissue sample in a cold fixative solution and monitoring diffusion of the fixative into the tissue sample by monitoring TOF in the tissue sample using the systems and methods as disclosed herein (diffusion step); and (2) allowing the temperature of the tissue sample to raise after a threshold TOF has been measured (fixation step). In some embodiments, the diffusion step is performed in a fixative solution that is below 20° C., below 15° C., below 12° C., below 10° C., in the range of about 0° C. to about 10° C., in the range of about 0° C. to about 12° C., in the range of about 0° C. to about 15° C., in the range of about 2° C. to about 10° C., in the range of about 2° C. to about 12° C., in the range of about 2° C. to about 15° C., in the range of about 5° C. to about 10° C., in the range of about 5° C. to about 12° C., in the range of about 5° C. to about 15° C. In exemplary embodiments, the environment surrounding the tissue sample is allowed to rise within the range of about 20° C. to about 55° C. during the fixation step. In certain embodiments, the fixative is an aldehyde-based cross-linking fixative, such as glutaraldehyde- and/or formalin-based solutions. Examples of aldehydes frequently used for immersion fixation include:

formaldehyde (standard working concentration of about 5 to about 10% formalin for most tissues, although concentrations as high as about 20% formalin have been used for certain tissues); glyoxal (standard working concentration 17 to 86 mM); glutaraldehyde (standard working concentration of 200 mM).

Aldehydes are often used in combination with one another. Standard aldehyde combinations include 10% formalin+1% (w/v) Glutaraldehyde. Atypical aldehydes have been used in certain specialized fixation applications, including: fumaraldehyde, 12.5% hydroxyadipaldehyde (pH 7.5), 10% crotonaldehyde (pH 7.4), 5% pyruvic aldehyde (pH 5.5), 10% acetaldehyde (pH 7.5), 10% acrolein (pH 7.6), and 5% methacrolein (pH 7.6). Other specific examples of aldehyde-based fixative solutions used for immunohistochemistry are set forth in Table 2:

TABLE 2

| Solution | Standard Composition |
|---|---|
| Neutral Buffered Formalin | 5-20% formalin + phosphate buffer (pH ~6.8) |
| Formal Calcium | 10% formalin +10 g/L calcium chloride |
| Formal Saline | 10% formalin + 9 g/L sodium chloride |
| Zinc Formalin | 10% formalin + 1 g/L zinc sulphate |
| Helly's Fixative | 50 mL 100% formalin + 1 L aqueous solution containing 25 g/L potassium dichromate + 10 g/L sodium sulfate + 50 g/L mercuric chloride |
| B-5 Fixative | 2 mL 100% formalin + 20 mL aqueous solution containing 6 g/L mercuric chloride + 12.5 g/L sodium acetate (anhydrous) |
| Hollande's Solution | 100 mL 100% formalin +15 mL Acetic acid + 1 L aqueous solution comprising 25 g copper acetate and 40 g picric acid |
| Bouin's Solution | 250 mL 100% formalin + 750 mL saturated aqueous picric acid + 50 mL glacial acetic acid |

In some embodiments, the fixative solution is selected from Table 2. In some embodiments, the aldehyde concentration used is higher than the above-mentioned standard concentrations. For example, a high-concentration aldehyde-based fixative solution can be used having an aldehyde concentration that is at least 1.25-times higher than the standard concentration used to fix a selected tissue for immunohistochemistry with a substantially similar composition. In some examples, the high-concentration aldehyde-based fixative solution is selected from: greater than about 20% formalin, about 25% formalin or greater, about 27.5% formalin or greater, about 30% formalin or greater, from about 25% to about 50% formalin, from about 27.5% to about 50% formalin, from about 30% to about 50% formalin, from about 25% to about 40% formalin, from about 27.5% to about 40% formalin, and from about 30% to about 40% formalin. As used in this context, the term "about" shall encompass concentrations that do not result in a statistically significant difference in diffusion at 4° C. as measured by Bauer et al., *Dynamic Subnanosecond Time-of-Flight Detection for Ultra-precise Diffusion Monitoring and Optimization of Biomarker Preservation*, Proceedings of SPIE, Vol. 9040, 90400B-1 (2014 Mar. 20).

In some embodiments, two-temperature fixation processes are especially useful for methods of detecting certain labile biomarkers in tissue samples, including, for example, phosphorylated proteins, DNA, and RNA molecules (such as miRNA and mRNA). See PCT/EP2012/052800 (incorporated herein by reference). Thus, in certain embodiments, the fixed tissue samples obtained using these methods can be analyzed for the presence of such labile markers. In some embodiments, a method of detecting a labile marker is a sample is provided, the method comprising fixing the tissue according to a two-temperature fixation as disclosed herein and contacting the fixed tissue sample with an analyte binding entity capable of binding specifically to the labile marker, such as FOXP3. Examples of analyte-binding entities include: antibodies and antibody fragments (including single chain antibodies), which bind to target antigens; t-cell receptors (including single chain receptors), which bind to MHC:antigen complexes; MHC:peptide multimers (which bind to specific T-cell receptors); aptamers, which bind to specific nucleic acid or peptide targets; zinc fingers, which bind to specific nucleic acids, peptides, and other molecules; receptor complexes (including single chain receptors and chimeric receptors), which bind to receptor ligands; receptor ligands, which bind to receptor complexes; and nucleic acid probes, which hybridize to specific nucleic acids. For example, an immunohistochemical method of detecting a phosphorylated protein in a tissue sample is provided, the method comprising contacting the fixed tissue obtained according to the foregoing two-temperature fixation method with an antibody specific for the phosphorylated protein and detecting binding of the antibody to the phosphorylated protein. In some embodiments, an in situ hybridization method of detecting a nucleic acid molecule is provided, the method comprising contacting the fixed tissue obtained according to the foregoing two-temperature fixation method with a nucleic acid probe specific for the nucleic acid of interest and detecting binding of the probe to the nucleic acid of interest.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

REFERENCES

1. Dapson, R. W. (2007) Macromolecular changes caused by formalin fixation and antigen retrieval. *Biotech Histochem* 82, 133-140

2. Rastogi, V., Puri, N., Arora, S., Kaur, G., Yadav, L., and Sharma, R. (2013) Artefacts: a diagnostic dilemma—a review. *J Clin Diagn Res* 7, 2408-2413
3. Bancroft, J. D., Suvarna, K. S., and Layton, C. (2012) *Bancroft's Theory and Practice of Histological Techniques*, Churchill Livingstone
4. Farmer, N. J., Hall, J. B. l., and Rolls, G. O. (2008) *Artifacts in Histological and Cytological Preparations*, Leica Microsystems
5. Leu, F. J., Chen, C. F., and Sun, A. M. (1993) A new method of tissue processing that causes no shrinkage or distortion. *Lab Invest* 69, 121-130
6. Iwadare, T., Mori, H., Ishiguro, K., and Takeishi, M. (1984) Dimensional changes of tissues in the course of processing. *J Microsc* 136, 323-327
7. Otali, D., He, Q., Stockard, C. R., and Grizzle, W. E. (2013) Preservation of immunorecognition by transferring cells from 10% neutral buffered formalin to 70% ethanol. *Biotech Histochem* 88, 170-180
8. Chafin, D., Theiss, A., Roberts, E., Borlee, G., Otter, M., and Baird, G. S. (2013) Rapid two-temperature formalin fixation. *PLoS One* 8, e54138
9. Hewitt, S. M., Lewis, F. A., Cao, Y., Conrad, R. C., Cronin, M., Danenberg, K. D., Goralski, T. J., Langmore, J. P., Raja, R. G., Williams, P. M., Palma, J. F., and Warrington, J. A. (2008) Tissue handling and specimen preparation in surgical pathology: issues concerning the recovery of nucleic acids from formalin-fixed, paraffin-embedded tissue. *Arch Pathol Lab Med* 132, 1929-1935
10. Theiss, A. P., Chafin, D., Bauer, D. R., Grogan, T. M., and Baird, G. S. (2014) Immunohistochemistry of colorectal cancer biomarker phosphorylation requires controlled tissue fixation. *PLoS One* 9, e113608
11. Werner, M., Chott, A., Fabiano, A., and Battifora, H. (2000) Effect of formalin tissue fixation and processing on immunohistochemistry. *Am J Surg Pathol* 24, 1016-1019
12. Engel, K. B., and Moore, H. M. (2011) Effects of preanalytical variables on the detection of proteins by immunohistochemistry in formalin-fixed, paraffin-embedded tissue. *Arch Pathol Lab Med* 135, 537-543
13. Otali, D. (2007) *The combined effect of formalin fixation and individual steps in tissue processing on immunorecognition.* Master of Science, The University of Alabama at Birmingham
14. Otali, D., Stockard, C. R., Oelschlager, D. K., Wan, W., Manne, U., Watts, S. A., and Grizzle, W. E. (2009) Combined effects of formalin fixation and tissue processing on immunorecognition. *Biotech Histochem* 84, 223-247
15. Williams, J. H., Mepham, B. L., and Wright, D. H. (1997) Tissue preparation for immunocytochemistry. *J Clin Pathol* 50, 422-428
16. Thompson, S. M., Craven, R. A., Nirmalan, N. J., Harnden, P., Selby, P. J., and Banks, R. E. (2013) Impact of pre-analytical factors on the proteomic analysis of formalin-fixed paraffin-embedded tissue. *Proteomics Clin Appl* 7, 241-251
17. Bass, B. P., Engel, K. B., Greytak, S. R., and Moore, H. M. (2014) A review of preanalytical factors affecting molecular, protein, and morphological analysis of formalin-fixed, paraffin-embedded (FFPE) tissue: how well do you know your FFPE specimen? *Arch Pathol Lab Med* 138, 1520-1530
18. Chung, J. Y., Braunschweig, T., Williams, R., Guerrero, N., Hoffmann, K. M., Kwon, M., Song, Y. K., Libutti, S. K., and Hewitt, S. M. (2008) Factors in Tissue Handling and Processing That Impact RNA Obtained from Formalin-fixed, Paraffin-embedded Tissue. in *J Histochem Cytochem*. pp 1033-1042
19. Xie, R., Chung, J. Y., Ylaya, K., Williams, R. L., Guerrero, N., Nakatsuka, N., Badie, C., and Hewitt, S. M. (2011) Factors influencing the degradation of archival formalin-fixed paraffin-embedded tissue sections. *J Histochem Cytochem* 59, 356-365
20. von Ahlfen, S., Missel, A., Bendrat, K., and Schlumpberger, M. (2007) Determinants of RNA Quality from FFPE Samples. in *PLoS ONE*. pp
21. O'Leary, T. J., Fowler, C. B., Evers, D. L., and Mason, J. T. (2009) Protein fixation and antigen retrieval: chemical studies. *Biotech Histochem* 84, 217-221
22. Fowler, C. B., O'Leary, T. J., and Mason, J. T. (2008) Modeling formalin fixation and histological processing with ribonuclease A: effects of ethanol dehydration on reversal of formaldehyde cross-links. *Lab Invest* 88, 785-791
23. Shi, S., and Taylor, C. R. (2011) *Antigen Retrieval Immunohistochemistry Based Research and Diagnostics*,
24. Bauer, D. R., Stevens, B., Taft, J., Chafin, D., Petre, V., Theiss, A. P., and Otter, M. (2014) Dynamic subnanosecond time-of-flight detection for ultra-precise diffusion monitoring and optimization of biomarker preservation. in *SPIE Medical Imaging*, San Diego
25. Bauer, D. R., Steven, B., Chafin, D., Theiss, A. P., and Otter, M. (2016) Active monitoring of formaldehyde diffusion into histological tissues with digital acoustic interferometry. *Journal of Medical Imaging* 3, 017002-017002
26. (2016) speed of sound in common materials for use with ultrasonic flow meters.
27. (2016) Speed of Sound in some common Liquids.
28. Alers, J. C., Krijtenburg, P. J., Vissers, K. J., and van Dekken, H. (1999) Effect of bone decalcification procedures on DNA in situ hybridization and comparative genomic hybridization. EDTA is highly preferable to a routinely used acid decalcifier. *J Histochem Cytochem* 47, 703-710
29. Neumeister, V. M. (2014) Tools to assess tissue quality. *Clin Biochem* 47, 280-287

The invention claimed is:
1. A method of processing a tissue sample, comprising:
   a. obtaining time of flight data from an acoustic device for a first tissue sample while the first tissue sample is immersed in a first processing fluid;
   b. determining a first processing time sufficient for a predetermined amount of the first processing fluid to diffuse into the first tissue sample based on the obtained time of flight data;
   c. determining a second processing time sufficient for a predetermined amount of a second processing fluid to diffuse into the first sample, wherein the second processing time is calculated based on (i) the first processing time, and (ii) a pre-determined functional relationship between the first processing time and the second processing time, wherein the pre-determined functional relationship is derived from fitting data pairs representing (i) first processing times sufficient for the pre-determined amount of the first processing fluid to diffuse into a tissue having a similar type, a similar shape, and/or a similar size to the first tissue sample, and (ii) second processing times sufficient for the pre-determined amount of the second processing fluid to diffuse into the tissue having the similar type, the similar shape, and/or the similar size of the first tissue sample; and d. immersing the first tissue sample in the second processing fluid for the second processing time.

2. The method of claim 1, wherein the determining of the first processing time sufficient for the predetermined amount of the first processing fluid to diffuse into the first tissue sample comprises determining one or more of (i) a time it takes to observe a predetermined change in the decay time of a measured TOF signal passing through the first sample while the first sample is immersed in the first processing fluid, (ii) a time it takes to observe a predetermined change in the decay amplitude of a measured TOF signal passing through the first sample while the first sample is immersed in the first processing fluid, (iii) a time it takes to observe a predetermined change in a percent diffusion calculated from a measured TOF signal passing through the first sample during while immersed in the first processing fluid, or (iv) a time it takes to observe a predetermined change in a reagent concentration at the center of the tissue calculated from a measured TOF signal passing through the first sample while immersed in the first processing fluid.

3. The method of claim 1, wherein the first processing fluid comprises about 70% ethanol.

4. The method of claim 1, wherein the second processing fluid is selected from the group consisting of about 90% ethanol, about 100% ethanol, xylene, and paraffin.

5. The method of claim 1, wherein the first processing time is used to determine second processing times for multiple second processing fluids.

6. The method of claim 4, wherein the first processing fluid comprises about 70% ethanol, and the second processing times are determined for at least 90% ethanol and xylene; wherein the method further comprises immersing the first tissue sample in about 90% ethanol for its determined second processing time.

7. The method of claim 6, further comprising immersing the first tissue sample in xylene for its determined second processing time.

8. The method of claim 4, wherein the first processing fluid comprises about 70% ethanol, and the second processing times are determined for each of about 90% ethanol, about 100% ethanol, xylene and paraffin; and wherein the method further comprises immersing the first tissue sample successively in about 90% ethanol, about 100% ethanol, xylene and paraffin for the determined second processing times for about 90% ethanol, about 100% ethanol, xylene and paraffin, respectively.

9. The method of claim 1, further comprising selecting a second tissue sample of a type, shape and/or size having diffusion properties that are substantially similar to those of the first tissue sample.

10. The method of claim 9, further comprising immersing the second tissue sample in the first processing fluid for the first processing time and in the second processing fluid for the second processing time.

11. The method of claim 1, wherein the subjecting of the first tissue sample to TOF analysis while the first tissue sample is immersed in the first processing fluid and determining the first processing time sufficient for a predetermined amount of the first processing fluid to diffuse into the first tissue sample is performed across a plurality of tissue types, a plurality of tissue sizes, and a plurality of tissue shapes to provide a look up table of first processing times for tissue samples of particular types, sizes and/or shapes.

12. The method of claim 11, further comprising:
a. selecting a second tissue sample, and
b. selecting a first processing time for the second tissue sample from the look up table, wherein selecting the first processing time is based on the type, size and/or shape of the second tissue sample.

13. The method of claim 12, further comprising batching two or more second tissue samples together for processing based on the two or more second tissue samples having substantially similar first processing times.

14. A system, comprising:
a. a tissue processing system;
b. a processor communicatively coupled to the tissue processing system and a memory, the memory having stored thereon a database of protocol instructions including tissue processing steps and times for particular types, shapes and/or sizes of tissue samples and/or one or more groups of particular types, sizes and/or shapes of tissue samples that share substantially similar processing protocols; and
c. a user interface providing a user with a data entry function, wherein the data entry function permits the user to enter at least one of a type, a shape and a size of a tissue sample or select a group to which the at least one of the type, the shape, and the size of the tissue sample belongs, wherein upon entry of the at least one of the type, the size and the shape of the tissue sample or selection of the group to which the at least one of the tissue sample type, the shape, and the size belongs, the processor will control the tissue processing system to process the tissue according to the protocol stored in the database for the entered at least one of the tissue type, the shape, and the size or the selected group, wherein the entry by a user of the at least one of the type, the shape, and the size of the tissue sample causes the processor to retrieve and display to the user on the user interface the group of the at least the one of the types, the sizes, and the shapes of tissue samples that share the substantially same processing protocol with the tissue sample.

15. The system of claim 14, wherein the tissue processing system is configured to process multiple different samples and/or multiple different groups of samples sharing substantially similar processing protocols in parallel and according to different protocol instructions.

16. A time of flight enabled tissue processing system, comprising:
a. a first bath in which a tissue sample is immersed in a first processing fluid;
b. an acoustic monitoring device configured to obtain TOF data from the tissue sample while it is immersed in the first processing fluid;
c. a processor configured to receive the TOF data and calculate a first processing time sufficient for predetermined amount of the first processing fluid to diffuse into the tissue sample, the processor further configured to calculate a second processing time sufficient for a predetermined amount of a second processing fluid to diffuse into the tissue sample, wherein the second processing time is calculated based on the first processing time and a pre-determined functional relationship between the first processing time and the second processing time, wherein the pre-determined functional relationship is derived from fitting data pairs representing (i) first processing times sufficient for the pre-determined amount of the first processing fluid to diffuse into a tissue having a similar type, a similar shape, and/or a similar size to the first tissue sample, and (ii) second processing times sufficient for the pre-determined amount of the second processing fluid to diffuse into the tissue having the similar type, the similar shape, and/or the similar size of the first tissue sample; and d. a second bath in which the tissue sample is immersed in the second processing fluid, wherein the processor monitors the time of immersion of the tissue sample in the second processing fluid and when the second processing time is reached, either alerts a user to remove the tissue sample from the second bath or causes the system to automatically remove the tissue sample from the second processing fluid of the second bath.

17. The system of claim 16, wherein the first processing fluid comprises about 70% ethanol.

18. The system of claim 16, wherein the second processing fluid is selected from the group consisting of about 90% ethanol, about 100% ethanol, xylene and paraffin.

19. The system of claim 16, wherein the calculating of the first processing time sufficient for predetermined amount of the first processing fluid to diffuse into the tissue sample comprises determining one or more of a time it takes to observe a predetermined change in the decay time of a measured TOF signal passing through the first sample during while the first sample is immersed in the first processing fluid, a time it takes to observe a predetermined change in the decay amplitude of a measured TOF signal passing through the first sample during while the first sample is immersed in the first processing fluid, a time it takes to observe a predetermined change in a percent diffusion calculated from a measured TOF signal passing through the first sample during while immersed in the first processing fluid, and a time it takes to observe a predetermined change in a reagent concentration at the center of the tissue calculated from a measured TOF signal passing through the first sample during while immersed in the first processing fluid.

* * * * *